US012444828B2

(12) United States Patent
Kim et al.

(10) Patent No.: US 12,444,828 B2
(45) Date of Patent: Oct. 14, 2025

(54) ANTENNA MODULE FOR PLACEMENT IN VEHICLE

(71) Applicant: LG ELECTRONICS INC., Seoul (KR)

(72) Inventors: Dongjin Kim, Seoul (KR); Kangjae Jung, Seoul (KR); Soyeon Lee, Seoul (KR); Kukheon Choi, Seoul (KR); Byeongyong Park, Seoul (KR); Ilnam Cho, Seoul (KR); Byungwoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/099,606

(22) PCT Filed: Aug. 3, 2022

(86) PCT No.: PCT/KR2022/011443
§ 371 (c)(1),
(2) Date: Jan. 29, 2025

(87) PCT Pub. No.: WO2024/029642
PCT Pub. Date: Feb. 8, 2024

(65) Prior Publication Data

US 2025/0260152 A1 Aug. 14, 2025

(51) Int. Cl.
*H01Q 1/12* (2006.01)
*H01Q 5/307* (2015.01)
(Continued)

(52) U.S. Cl.
CPC ........... *H01Q 1/1271* (2013.01); *H01Q 5/307* (2015.01); *H01Q 9/26* (2013.01); *H01Q 13/10* (2013.01)

(58) Field of Classification Search
CPC ........ H01Q 1/1271; H01Q 5/307; H01Q 9/26; H01Q 13/10
See application file for complete search history.

(56) References Cited

U.S. PATENT DOCUMENTS 6,542,126 B2 * 4/2003 Bahr .................... H01Q 9/0442 343/702
7,205,942 B2 * 4/2007 Wang ..................... H01Q 5/371 343/702
(Continued)

FOREIGN PATENT DOCUMENTS

CN 107275770 A * 10/2017 ............... H01Q 5/35
CN 110829000 2/2020
(Continued)

OTHER PUBLICATIONS

PCT International Application No. PCT/KR2022/011443, International Search Report dated Apr. 27, 2023, 4 pages.

*Primary Examiner* — Dimary S Lopez Cruz
*Assistant Examiner* — Bamidele A Immanuel
(74) *Attorney, Agent, or Firm* — LEE, HONG, DEGERMAN, KANG & WAIMEY

(57) ABSTRACT

A vehicle comprises: a transparent dielectric substrate; a first area including an antenna on one side of the transparent dielectric substrate; and a second area including a ground conductive pattern and a feed pattern. The antenna comprises: a first conductive pattern including a closed loop trace; a second conductive pattern electrically connected to a second portion of the ground conductive pattern; and a slot which is surrounded by the first conductive pattern and includes a first slot area and a second slot area. The closed loop trace may include a first part, a second part, a third part, a fourth part, and a fifth part. The second part and the fourth part may be disposed on opposite sides. The first part and the
(Continued)

third part may be disposed on opposite sides. The first part and the fifth part may be disposed on the same side.

20 Claims, 41 Drawing Sheets

(51) Int. Cl.
*H01Q 9/26* (2006.01)
*H01Q 13/10* (2006.01)

(56) References Cited

U.S. PATENT DOCUMENTS

| | | | | |
|---|---|---|---|---|
| 7,215,293 | B2 * | 5/2007 | Chen | H01Q 7/00 343/866 |
| 9,276,317 | B1 * | 3/2016 | Zheng | H01Q 5/364 |
| 9,350,077 | B1 * | 5/2016 | Zheng | H01Q 5/357 |
| 9,973,232 | B1 * | 5/2018 | Kuo | H04B 1/50 |
| 2007/0040756 | A1 * | 2/2007 | Song | H01Q 13/106 343/713 |
| 2011/0063180 | A1 * | 3/2011 | Su | H01Q 3/24 343/795 |
| 2012/0218723 | A1 * | 8/2012 | Kwak | H01Q 1/243 361/748 |
| 2012/0274530 | A1 * | 11/2012 | Minemura | H01Q 7/00 343/793 |
| 2015/0303551 | A1 * | 10/2015 | Su | H01Q 1/243 343/702 |
| 2017/0237147 | A1 * | 8/2017 | Song | H01Q 21/0037 343/713 |
| 2017/0324138 | A1 * | 11/2017 | Talty | H01Q 13/20 |
| 2020/0044342 | A1 * | 2/2020 | Komura | H01Q 9/40 |
| 2020/0381830 | A1 * | 12/2020 | Kim | H01Q 1/243 |
| 2021/0075108 | A1 * | 3/2021 | Lin | H01Q 5/307 |

FOREIGN PATENT DOCUMENTS

| | | | | | |
|---|---|---|---|---|---|
| CN | 113067124 | A | * | 7/2021 | H01Q 5/00 |
| JP | 2004-260343 | | | 9/2004 | |
| JP | 2004260343 | A | * | 9/2004 | |
| JP | 2020-162120 | | | 10/2020 | |
| KR | 101303153 | B1 | * | 9/2013 | H04B 1/3833 |
| WO | 2021256589 | | | 12/2021 | |

* cited by examiner (a)

(b)

(c)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(c)

ANTENNA MODULE FOR PLACEMENT IN VEHICLE

CROSS-REFERENCE TO RELATED APPLICATION

This application is the National Stage filing under 35 U.S.C. 371 of International Application No. PCT/KR2022/011443, filed on Aug. 3, 2022, the contents of which are hereby incorporated by reference herein its entirety.

TECHNICAL FIELD

The present specification relates to a transparent antenna disposed on a vehicle. One specific implementation relates to an antenna assembly made of a transparent material to suppress an antenna region from being visible on vehicle glass.

BACKGROUND ART

A vehicle may perform wireless communication services with other vehicles or nearby objects, infrastructures, or base stations. In this regard, various communication services may be provided through a wireless communication system to which an LTE communication technology or a 5G communication technology is applied. Meanwhile, some of LTE frequency bands may be allocated to provide 5G communication services.

On the other hand, there is a problem in that the body and roof of a vehicle are formed of a metallic material to block radio waves. Accordingly, a separate antenna structure may be disposed on top of the body or roof of the vehicle. Or, when the antenna structure is disposed on the bottom of the vehicle body or roof, a portion of the vehicle body or roof corresponding to a region where the antenna structure is disposed may be formed of a non-metallic material.

However, in terms of design, the vehicle body or roof needs to be integrally formed. In this case, the exterior of the vehicle body or roof may be formed of a metallic material. This may cause antenna efficiency to be drastically lowered due to the vehicle body or roof.

To increase communication capacity without changing the exterior design of a vehicle, a transparent antenna may be disposed on glass corresponding to a vehicle window. However, antenna radiation efficiency and impedance bandwidth characteristics are deteriorated due to an electrical loss of the transparent antenna. Additionally, when a transparent antenna is disposed on a glass panel of a vehicle, there is such a problem that antenna radiation efficiency may deteriorate due to loss on the glass panel at a frequency of 2 GHz or more.

Meanwhile, an antenna radiation pattern needs to be generated in a low elevation region within a certain angle range with respect to a horizontal plane of a vehicle to perform wireless communication in the vehicle. In this regard, vehicle glass may be disposed to be inclined at a predetermined angle or greater with respect to a vertical axis. As a transparent antenna is placed on a vehicle window disposed to be inclined at a predetermined angle or more, there is such a problem an antenna radiation pattern is generated in an upward direction, i.e., a vertical direction.

DISCLOSURE OF INVENTION

Technical Problem

The present disclosure is directed to solving the aforementioned problems and other drawbacks. Another aspect of the present disclosure is to provide a broadband transparent antenna assembly that may be disposed on vehicle glass.

Another aspect of the present disclosure is to improve antenna efficiency of a broadband transparent antenna assembly that may be disposed on vehicle glass.

Another aspect of the present disclosure is to improve an antenna radiation pattern in a low elevation region.

Another aspect of the present disclosure is to provide a broadband antenna structure made of a transparent material and capable of reducing a feed loss and improving antenna efficiency while operating in a broad band.

Another aspect of the present disclosure is to improve antenna efficiency of a feeding structure of a broadband transparent antenna assembly that may be disposed on vehicle glass, and secure reliability of a mechanical structure including the feeding structure.

Another aspect of the present disclosure is to minimize an interference between a dummy mesh grid disposed in a dielectric region and an antenna region.

Another aspect of the present disclosure is to ensure invisibility of a transparent antenna and an antenna assembly including the same without deterioration in antenna performance.

Solution to Problem

To achieve these and other advantages and in accordance with the purpose of the present specification, as embodied and broadly described herein, there is provided a vehicle including: a transparent dielectric substrate; a first area including an antenna on one side surface of the transparent dielectric substrate; and a second area including a ground conductive pattern and a feed pattern. The antenna may include: a first conductive pattern including a closed loop trace, a second conductive pattern electrically connected to a second portion of the ground conductive pattern; and a slot surrounded by the first conductive pattern and including a first slot area and a second slot area. The closed loop trace may include a first part, a second part, a third part, a fourth part, and a fifth part. The second part and the fourth part may be disposed on opposite sides. The first part and the third part may be disposed on opposite sides. The first part and the fifth part may be disposed on a same side.

According to an embodiment, a first end of the first part may be electrically connected to the feed pattern, a second end of the first part may be electrically connected to a first end of the second part, a second end of the second part may be electrically connected to a first end of the third part, a second end of the third part may be electrically connected to a first end of the fourth part, a second end of the fourth part may be electrically connected to a first end of the fifth part, and a second end of the fifth part may be electrically connected to a first portion of the ground conductive pattern.

According to an embodiment, the second conductive pattern may be disposed between the first part of the first conductive pattern and the ground conductive pattern. A first gap in the first slot area may be present between a first point on an inner side of the first part near the first end of the second part and a first point on an inner side of the third part near the second end of the second part. A second gap in the first slot area may be present between a second point on the inner side of the first part connected to the feed pattern and a second point on the inner side of the third part near an intermediate point of the third part. A distance of the second gap may be configured to be smaller than a distance of the first gap.

According to an embodiment, the first conductive pattern may operate in a folded dipole antenna mode in a first frequency band.

According to an embodiment, the first slot area may operate in a slot antenna mode in a second frequency band. The second frequency band may be configured to be wider than the first frequency band.

According to an embodiment, the second conductive pattern may operate in a third frequency band. The third frequency band may be wider than the second frequency band.

According to an embodiment, a first pattern thickness of the first point of the third part near the second end of the second part may be smaller than a second pattern thickness of the second point of the third part.

According to an embodiment, a distance value of the second gap may be configured to be λgl/20 or less. Here, λgl is a guided wavelength corresponding to a lowest frequency of an operating frequency band.

According to an embodiment, a horizontal distance value of the third part may be configured to be equal to λgl/2.

According to an embodiment, a shape of the inner side of the third part in the slot may be configured as an isosceles triangle.

According to an embodiment, a shape of the inner side of the third part in the slot may be configured as an inverted triangle.

According to an embodiment, gaps between the distance of the second gap and the distance of the first gap gradually may be disposed to increase from the distance of the second gap to the distance of the first gap.

According to an embodiment, a third gap in the first slot area may be disposed between a first point on an inner side of the second part near the first end of the second part and a first vertex on an isosceles triangle of the third part on the inner side of the third part. A fourth gap in the first slot area may be disposed between a second point on the inner side of the second part near the second end of the second part and a second vertex on the isosceles triangle of the third part on the inner side of the third part. A distance of the fourth gap may be configured to be smaller than a distance of the third gap.

According to an embodiment, gaps between the distance of the fourth gap and the distance of the third gap may be disposed gradually increase from the distance of the fourth gap to the distance of the third gap.

According to an embodiment, a fifth gap in the second slot area may be disposed between a first point on an inner side of the fifth part near the second end of the fourth part and a third point on the inner side of the third part near the first end of the fourth part. A sixth gap in the second slot area may be disposed between a second point on an inner side of the fifth part connected to the first portion of the ground conductive pattern and a fourth point of the inner side of the third part near the intermediate point of the third part. A distance of the sixth gap may be configured to be smaller than a distance of the fifth gap.

According to an embodiment, gaps between the distance of the sixth gap and the distance of the fifth gap gradually may be disposed to increase from the distance of the sixth gap to the distance of the fifth gap.

According to an embodiment, a seventh gap in the second slot area may be disposed between a first point on an inner side of the fourth part near the second end of the third part and a third vertex on an isosceles triangle of the third part inside the third part. An eighth gap in the second slot area may be present between a second point on an inner side of the fourth part near the second end of the fifth part and a first vertex on the isosceles triangle of the third part inside the third part. A distance of the eighth gap may be smaller than a distance of the seventh gap.

According to an embodiment, gaps between the distance of the eighth gap and the distance of the eighth gap may be configured to gradually increase from the distance of the seventh gap to the distance of the eighth gap.

According to an embodiment, the antenna may further include a third conductive pattern. A first end of the third conductive pattern may be electrically connected to a third point of the ground conductive pattern. A second end of the third conductive pattern may be electrically connected to a fourth point of the ground conductive pattern. The first conductive pattern may be disposed to be surrounded by the third conductive pattern.

According to an embodiment, a gap between the first conductive pattern and the third conductive pattern may be configured to be λgh/4 or greater. Here, λgh is a guided wavelength corresponding to a highest frequency of an operating frequency band.

According to an embodiment, a thickness of the third conductive pattern may be configured to be λgh/4 or greater.

According to an embodiment, the first conductive pattern and the second conductive pattern may be configured to have a metal mesh shape including a plurality of opening areas on the transparent dielectric substrate.

According to an embodiment, the first conductive pattern, the second conductive pattern, and the third conductive pattern may be configured to have a coplanar waveguide (CPW) structure on the transparent dielectric substrate.

According to an embodiment, the antenna assembly may include a plurality of dummy mesh grid patterns on an outer portion of conductive patterns on the transparent dielectric substrate. The plurality of dummy mesh grid patterns may be configured not to be connected to the feed pattern and the ground conductive pattern. The plurality of dummy mesh grid patterns may be configured to be separate from each other.

According to another aspect of the present specification, there is provided a vehicle including: a glass panel including a transparent region and an opaque region; and an antenna assembly disposed on the glass panel. The antenna assembly may include: a first transparent dielectric substrate; a first area including an antenna element on one side surface of the first transparent dielectric substrate and disposed in the transparent region of the glass panel; a second area including first connection patterns connected to the antenna element and disposed in the opaque region of the glass panel; a second dielectric substrate disposed in the opaque region of the glass panel; and a third area including a ground conductive pattern and a feed pattern each on one side surface of the second dielectric substrate. The antenna element may include: a first conductive pattern including a closed loop trace; a second conductive pattern electrically connected to a second portion of the ground conductive pattern; and a slot surrounded by the first conductive pattern and including a first slot area and a second slot area. The closed loop trace may include a first part, a second part, a third part, a fourth part, and a fifth part. The second part and the fourth part may be disposed on opposite sides. The first part and the third part may be disposed on opposite sides. The first part and the fifth part may be disposed on a same side.

In an embodiment, a first end of the first part may be electrically connected to the feed pattern, a second end of the first part may be electrically connected to a first end of the second part, a second end of the second part may be electrically connected to a first end of the third part, a second end of the third part may be electrically connected to a first end of the fourth part, a second end of the fourth part may be electrically connected to a first end of the fifth part, and a second end of the fifth part may be electrically connected to a first portion of the ground conductive pattern.

In an embodiment, the second conductive pattern may be disposed between the first part of the first conductive pattern and the ground conductive pattern. A first gap in the first slot area may be disposed between a first point on an inner side of the first part near the first end of the second part and a first point on an inner side of the third part near the second end of the second part. A second gap in the first slot area may be disposed between a second point on the inner side of the first part connected to the feed pattern and a second point on the inner side of the third part near an intermediate point of the third part. A distance of the second gap may be smaller than a distance of the first gap.

According to still another aspect of the present specification, there is provided a vehicle including: a glass panel including a transparent region and an opaque region; and an antenna assembly disposed on the glass panel. One side surface of the opaque region may include a ground conductive pattern and a feed pattern. The antenna assembly may include: a first transparent dielectric substrate; a first area including an antenna element on one side surface of the first transparent dielectric substrate and disposed in the transparent region of the glass panel; and a second area including first connection patterns connected to the antenna pattern and disposed in the opaque region of the glass panel. The antenna element may include: a first conductive pattern including a closed loop trace, a second conductive pattern electrically connected to a second portion of the ground conductive pattern; and a slot surrounded by the first conductive pattern and including a first slot area and a second slot area. The closed loop trace may include a first part, a second part, a third part, a fourth part, and a fifth part. The second part and the fourth part may be disposed on opposite sides. The first part and the third part may be disposed on opposite sides. The first part and the fifth part may be disposed on a same side.

In an embodiment, a first end of the first part may be electrically connected to the feed pattern, a second end of the first part may be electrically connected to a first end of the second part, a second end of the second part may be electrically connected to a first end of the third part, a second end of the third part may be electrically connected to a first end of the fourth part, a second end of the fourth part may be electrically connected to a first end of the fifth part, and a second end of the fifth part may be electrically connected to a first portion of the ground conductive pattern.

In an embodiment, the second conductive pattern may be disposed between the first part of the first conductive pattern and the ground conductive pattern. A first gap in the first slot area may be disposed between a first point on an inner side of the first part near the first end of the second part and a first point on an inner side of the third part near the second end of the second part. A second gap in the first slot area may be disposed between a second point on the inner side of the first part connected to the feed pattern and a second point on the inner side of the third part near an intermediate point of the third part. A distance of the second gap may be configured to be smaller than a distance of the first gap.

Advantageous Effects of Invention

Hereinafter, technical effects of a transparent antenna disposed on a vehicle are described.

According to the present specification, an antenna assembly that may be disposed on vehicle glass may be implemented to operate in a plurality of operating modes to perform broadband operation.

According to the present specification, antenna efficiency of a broadband transparent antenna assembly may be improved by optimizing shapes of conductive patterns that may be disposed in a limited space of vehicle glass.

According to the present specification, a conductive pattern operating as ground may be disposed to surround conductive patterns operating as radiators, thereby improving an antenna radiation pattern in a low elevation region.

According to the present specification, since an antenna assembly is implemented using a transparent material so that an antenna region is not identifiable on vehicle glass, the antenna assembly may be optimally configured in a transparent region and an opaque region of the vehicle glass.

According to the present specification, a difference in visibility between a region in which a transparent material antenna that may be placed on a vehicle window is disposed and other regions may be minimized through optimization with frit patterns for each metal mesh region.

According to the present specification, a height difference that occurs when an opaque substrate is bonded to a transparent electrode part may be removed to resolve deterioration in visibility and mass productivity caused by a height difference during the bonding.

According to the present specification, invisibility of a vehicle transparent antenna and an antenna assembly including the same may be secured without a feed loss and antenna performance deterioration caused by an increase in a length of a transmission line due to a separate impedance matching portion.

According to the present specification, both invisibility of a shape of an antenna pattern and a transmission line and invisibility of an antenna assembly including a transparent electrode part and an opaque substrate part and attached to vehicle glass may be secured.

According to the present specification, a broadband antenna structure made of a transparent material and capable of being implemented on a single plane to have various shapes may be provided through a plurality of conductive patterns having a metal mesh shape, a coplanar waveguide (CPW) feeding portion, and a conversion structure therebetween.

According to the present specification, a broadband antenna structure made of a transparent material and capable of reducing a feed loss and enhancing antenna efficiency while operating in a broadband may be provided through a transparent region and a frit region of vehicle glass.

MODE FOR THE INVENTION

Figure 1:
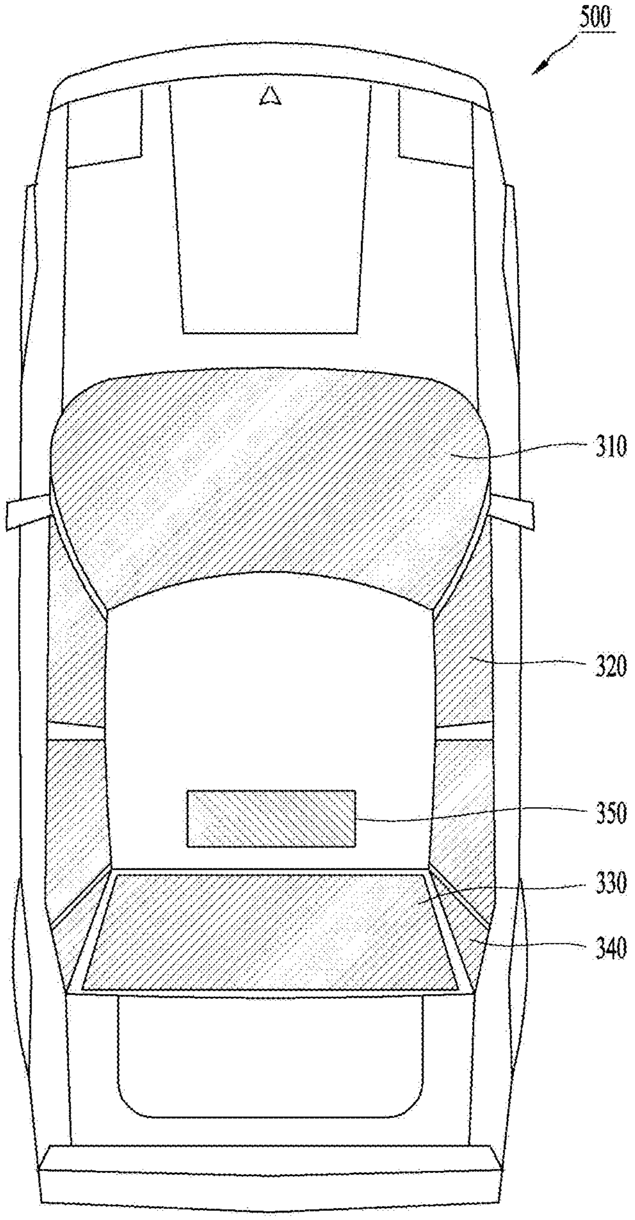
FIG. 1 is a diagram illustrating vehicle glass on which an antenna structure according to an embodiment of the present specification is to be arranged.

A description will now be given in detail according to exemplary embodiments disclosed herein, with reference to the accompanying drawings. For the sake of a brief description with reference to the drawings, the same or equivalent components may be provided with the same or similar reference numbers, and the description thereof will not be repeated. A suffix "module" or "unit" used for elements disclosed in the following description is merely intended for easy description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents, and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be connected with the another element or intervening elements may also be present. In contrast, when an element is referred to as being "directly connected with" another element, there are no intervening elements present.

A singular representation may include a plural representation unless it represents a different meaning from the context.

Terms "include" or "has" used herein should be understood that they are intended to indicate the existence of a feature, a number, a step, an element, a component, or a combination thereof disclosed in the specification, and it may also be understood that the existence or additional possibility of one or more other features, numbers, steps, elements, components, or combinations thereof are not excluded in advance.

An antenna system described herein may be mounted on a vehicle. Configurations and operations according to embodiments may also be applied to a communication system, namely, an antenna system mounted on a vehicle. In this regard, the antenna system mounted on the vehicle may include a plurality of antennas, and a transceiver circuitry and a processor that control the plurality of antennas.

Hereinafter, an antenna assembly (antenna module) that may be arranged on a window of a vehicle according to the present specification and an antenna system for a vehicle including the antenna assembly will be described. In this regard, the antenna assembly may refer to a structure in which conductive patterns are combined on a dielectric substrate, and may also be referred to as an antenna module.

In this regard, FIG. 1 illustrates vehicle glass on which an antenna structure according to an embodiment of the present specification is to be arranged. Referring to FIG. 1, a vehicle 500 may include front glass 310, door glass 320, rear glass 330, and quarter glass 340. In some examples, the vehicle 500 may further include top glass 350 that is arranged on a roof in an upper region.

Therefore, the glass constituting the window of the vehicle 500 may include the front glass 310 disposed in the front region of the vehicle, the door glass 320 disposed in the door region of the vehicle, and the rear glass 330 disposed in the rear region of the vehicle. In some examples, the glass constituting the window of the vehicle 500 may further include the quarter class 340 disposed in the partial region of the door region of the vehicle. In addition, the glass constituting the window of the vehicle 500 may further include the top glass 350 spaced apart from the rear glass 330 and disposed in the upper region of the vehicle. Accordingly, each glass constituting the window of the vehicle 500 may also be referred to as a window.

The front glass 310 may be referred to as a front windshield because it suppresses wind blown from the front side from entering the inside of the vehicle. The front glass 310 may have a two-layer bonding structure having a thickness of about 5.0 to 5.5 mm. The front glass 310 may have a bonding structure of glass/shatterproof film/glass.

The door glass 320 may have a two-layer bonding structure or may be formed of single-layer compressed glass. The rear glass 330 may have a two-layer bonding structure with a thickness of about 3.5 to 5.5 mm or may be formed of single-layer compressed glass. In the rear glass 330, a spaced distance between a transparent antenna and hot wire and AM/FM antenna is required. The quarter glass 340 may be formed of single-layer compressed glass with a thickness of about 3.5 to 4.0 mm, but is not limited thereto.

The size of the quarter glass 340 may vary depending on a type of vehicle, and may be smaller than the sizes of the front glass 310 and the rear glass 330.

Figure 2A:
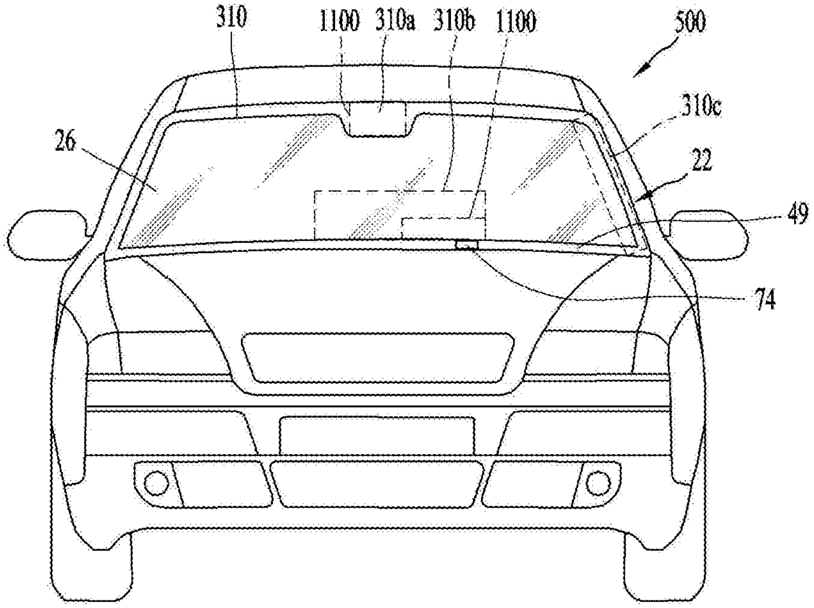
FIG. 2A is a front view of the vehicle with antenna assemblies arranged in different regions of a front glass of the vehicle of FIG. 1.
Figure 2B:
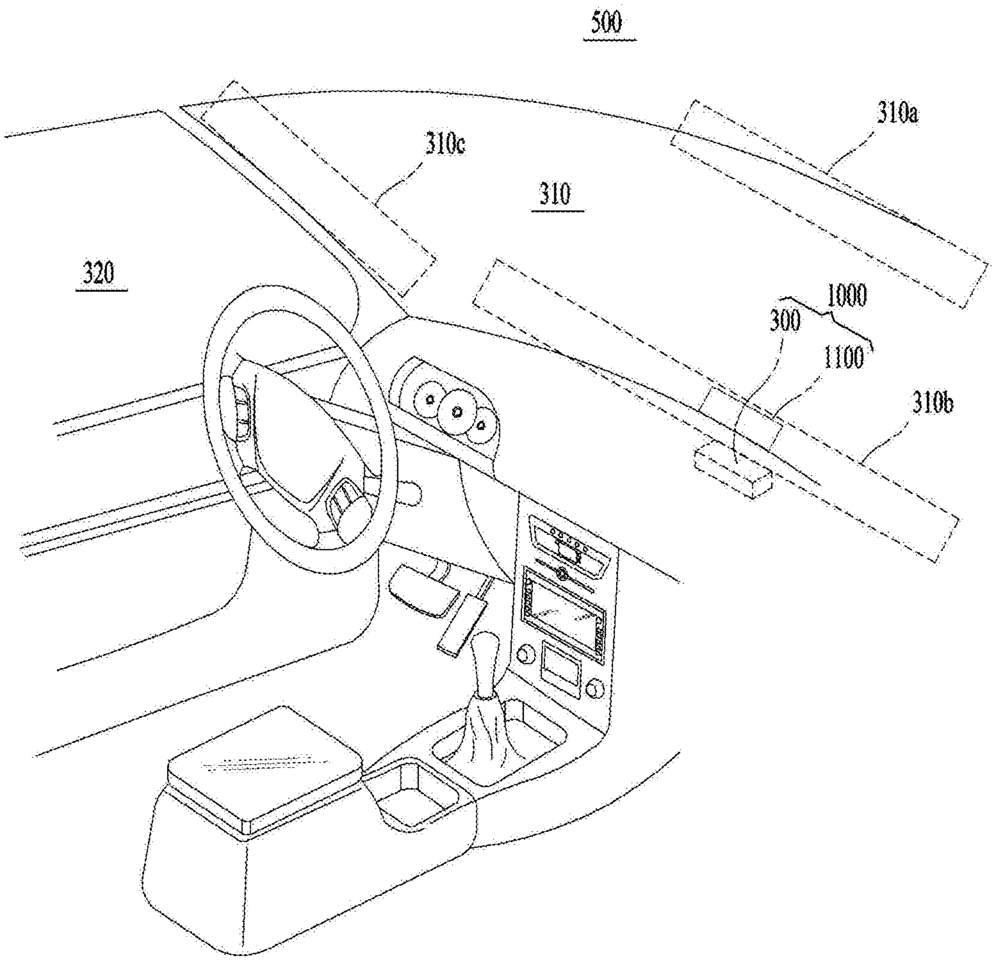
FIG. 2B is a front perspective view illustrating the inside of the vehicle with the antenna assemblies arranged in the different regions of the front glass of the vehicle of FIG. 1.
Figure 2C:
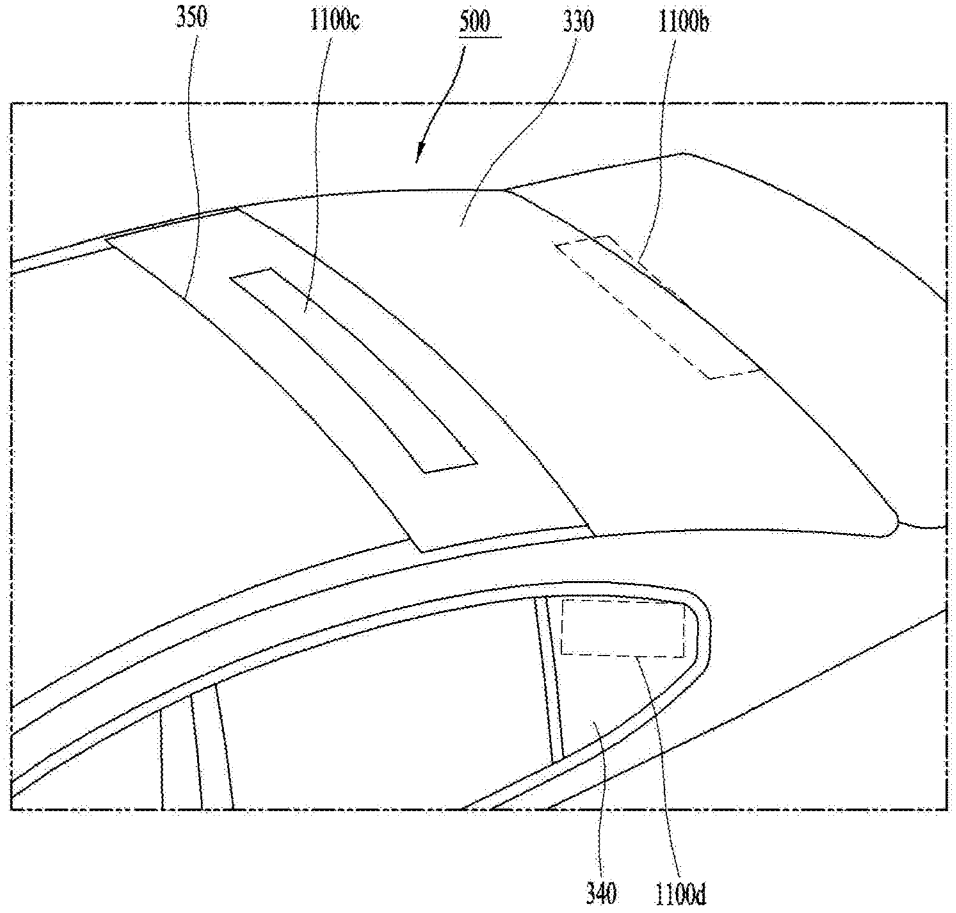
FIG. 2C is a side perspective view of the vehicle with the antenna assembly disposed on an upper glass of the vehicle of FIG. 1.

Hereinafter, a structure in which an antenna assembly according to the present specification is arranged on different regions of the front glass of a vehicle will be described. An antenna assembly attached to vehicle glass may be implemented as a transparent antenna. In this regard, FIG. 2A is a front view of the vehicle where antenna assemblies are arranged in different regions of the front glass of the vehicle of FIG. 1. FIG. 2B is an internal front perspective view of the vehicle where the antenna assemblies arranged in the different regions of the front glass of the vehicle of FIG. 1. FIG. 2C is a side perspective view of the vehicle where the antenna assembly is arranged on the upper glass of the vehicle of FIG. 1.

Referring to FIG. 2A which is the front view of the vehicle 500, a configuration in which the transparent antenna for the vehicle according to the specification may be arranged is illustrated. A pane assembly 22 may include an antenna in an upper region 310*a*. The pane assembly 22 may include an antenna in the upper region 310*a*, an antenna in a lower region 310*b*, and/or an antenna in a side region 310*c*. In addition, the pane assembly 22 may include translucent pane glass 26 formed of a dielectric substrate. The antenna in the upper region 310*a*, the antenna in the lower region 310*b*, and/or the antenna in the side region 310*c* may be configured to support any one or more of various communication systems.

An antenna module 1100 may be disposed in the upper region 310*a*, the lower region 310*b*, or the side region 310*c* of the front glass 310. When the antenna module 1100 is arranged in the lower region 310*b* of the front glass 310, the antenna module 1100 may extend to a body 49 of a lower region of the translucent pane glass 26. The body 49 of the lower region of the translucent pane glass 26 may have lower transparency than other portions. A portion of a feeder and other interface lines may be arranged on the body 49 of the lower region of the translucent pane glass 26. A connector assembly 74 may be implemented on the body 49 of the lower region of the translucent pane glass 26. The body 49 of the lower region may constitute a vehicle body made of a metal material.

Referring to FIG. 2B, an antenna assembly 1000 may include a telematics control unit (TCU) 300 and an antenna module 1100. The antenna module 1100 may be located in a different region of vehicle glass.

Referring to FIGS. 2A and 2B, the antenna assembly may be arranged in the upper region 310*a*, the lower region 310*b*, and/or the side region 310*c* of the vehicle glass. Referring to FIG. 2A to 2C, the antenna assemblies may be arranged on the front glass 310, rear glass 330, quarter glass 340, and upper glass 350 of the vehicle.

Referring to FIG. 2A to 2C, the antenna arranged in the upper region 310*a* of the front glass 310 of the vehicle may be configured to operate in a low band (LB), a mid band (MB), a high band (HB), and a 5G Sub6 band of 4G/5G communication systems. The antenna in the lower region 310*b* and/or the antenna in the side region 310*c* may also be configured to operate in the LB, MB, HB, and 5G Sub6 band of the 4G/5G communication systems. An antenna structure 1100*b* on the rear glass 330 of the vehicle may also be configured to operate in the LB, MB, HB, and 5G Sub6 band of the 4G/5G communication systems. An antenna structure 1100*c* on the upper glass 350 of the vehicle may also be configured to operate in the LB, MB, HB, and 5G Sub6 band of the 4G/5G communication systems. An antenna structure 1100*d* on the quarter glass 350 of the vehicle may also be configured to operate in the LB, MB, HB, and 5G Sub6 band of the 4G/5G communication systems.

At least a portion of an outer region of the front glass 310 of the vehicle may be defined by the translucent pane glass 26. The translucent pane glass 26 may include a first part in which an antenna and a portion of a feeder are formed, and a second part in which another portion of the feeder and a dummy structure are formed. The translucent pane glass 26 may further include a dummy region in which conductive patterns are not formed. For example, a transparent region of the translucent pane glass 22 may be transparent to secure light transmission and a field of view.

Although it is exemplarily illustrated that conductive patterns may be formed in a partial region of the front glass 310, the conductive patterns may extend to the side glass 320 and the rear glass 330 of FIG. 1, and an arbitrary glass structure. In the vehicle 500, occupants or a driver may view road and surrounding environment through the pane assembly 22. In addition, the occupants or driver may view the road and surrounding environment without interference with the antenna in the upper region 310*a*, the antenna in the lower region 310*b*, and/or the antenna in the side region 310*c*.

Figure 3:
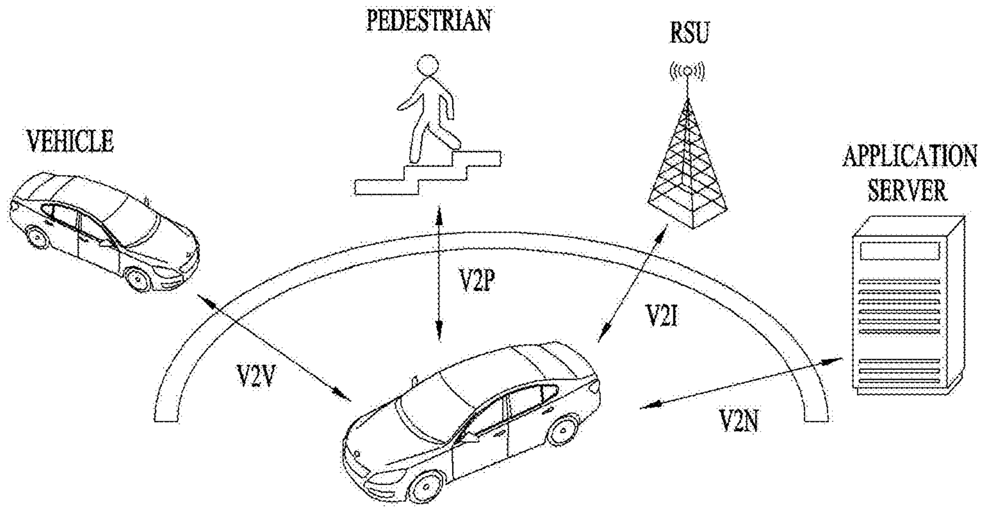
FIG. 3 illustrates types of V2X applications.

The vehicle 500 may be configured to communicate with pedestrians, surrounding infrastructures, and/or servers in addition to adjacent vehicles. FIG. 3 illustrates types of V2X applications. Referring to FIG. 3, V2X communications may include communications between a vehicle and all entities, such as V2V (Vehicle-to-Vehicle) which refers to communication between vehicles, V2I (Vehicle-to-Infrastructure) which refers to communication between a vehicle and an eNB or RSU (Road Side Unit), V2P (Vehicle-to-Pedestrian) which refers to communication between a vehicle and a terminal possessed by a person (pedestrian, cyclist, vehicle driver, or passenger), V2N (vehicle-to-network), and the like.

Figure 4:
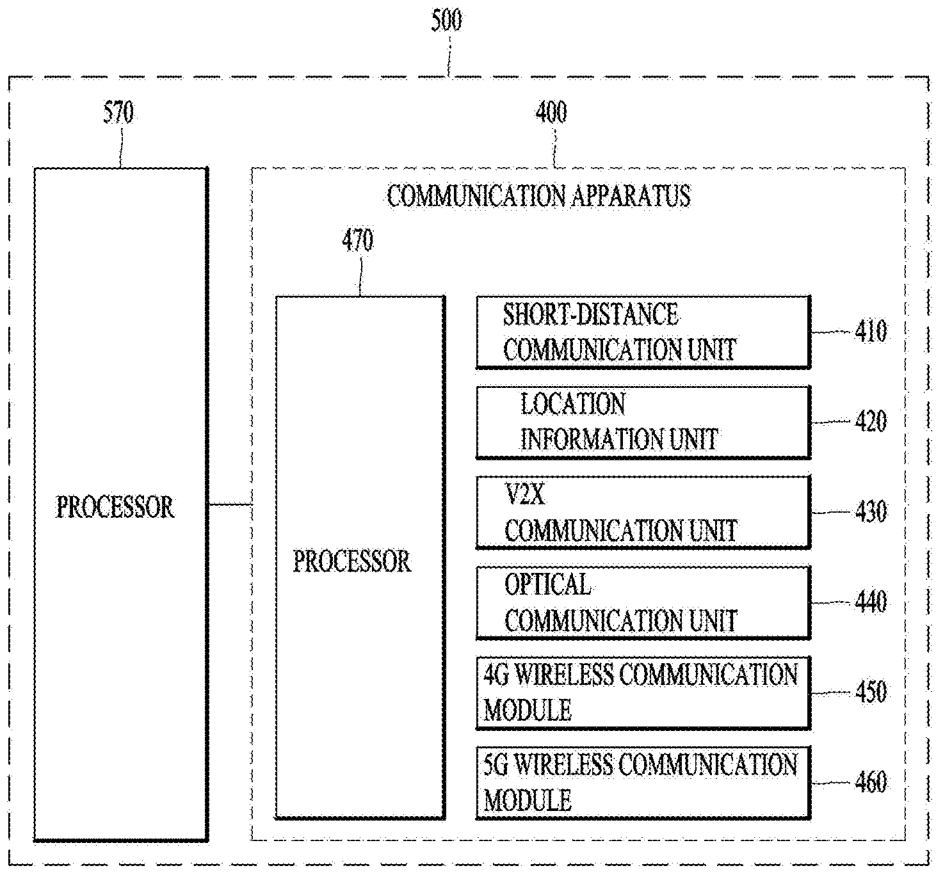
FIG. 4 is a block diagram referenced for explaining a vehicle and an antenna system mounted on the vehicle according to an embodiment of the present specification.

Meanwhile, FIG. 4 is a block diagram illustrating a vehicle and an antenna system mounted on the vehicle according to an embodiment of the specification.

The vehicle 500 may include a communication device 400 and a processor 570. The communication device 400 may correspond to the telematics control unit of the vehicle 500.

The communication device 400 may be a device for performing communication with an external device. Here, the external device may be another vehicle, a mobile terminal, or a server. The communication device 400 may perform the communication by including at least one of a transmitting antenna, a receiving antenna, and radio frequency (RF) circuit and RF device for implementing various communication protocols. In this regard, the communication device 400 may include at least one of a short-range communication unit 410, a location information unit 420, a V2X communication unit 430, an optical communication unit 440, a 4G wireless communication module 450, and a 5G wireless communication module 460. The communication device 400 may include a processor 470. According to an embodiment, the communication device 400 may further include other components in addition to the components described, or may not include some of the components described.

A 4G wireless communication module 450 and a 5G wireless communication module 460 perform wireless communication with one or more communication systems through one or more antenna modules. The 4G wireless communication module 450 may transmit and/or receive signals to and/or from a device in a first communication system through a first antenna module. In addition, the 5G wireless communication module 460 may transmit and/or receive signals to and/or from a device in a second communication system through a second antenna module. The 4G wireless communication module 450 and 5G wireless communication module 460 may also be physically implemented as one integrated communication module. For example, the first communication system and the second communication system may be an LTE communication system and a 5G communication system, respectively. However, the first communication system and the second communication system may not be limited thereto, and may change depending on applications.

The processor of the device in the vehicle 500 may be implemented as a micro control unit (MCU) or a modem. The processor 470 of the communication device 400 may correspond to a modem, and the processor 470 may be implemented as an integrated modem. The processor 470 may obtain surrounding information from other adjacent vehicles, objects, or infrastructures through wireless communication. The processor 470 may perform vehicle control using the acquired surrounding information.

The processor 570 of the vehicle 500 may be a processor of a car area network (CAN) or advanced driving assistance system (ADAS), but is not limited thereto. When the vehicle 500 is implemented in a distributed control manner, the processor 570 of the vehicle 500 may be replaced with a processor of each device.

In some examples, the antenna module arranged in the vehicle 500 may include a wireless communication unit. The 4G wireless communication module 450 may perform transmission and reception of 4G signals with a 4G base station through a 4G mobile communication network. In this case, the 4G wireless communication module 450 may transmit at least one 4G transmission signal to the 4G base station. In addition, the 4G wireless communication module 450 may receive at least one 4G reception signal from the 4G base station. In this regard, Uplink (UL) Multi-input/Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 460 may perform transmission and reception of 5G signals with a 5G base station through a 5G mobile communication network. Here, the 4G base station and the 5G base station may have a Non-Stand-Alone (NSA) architecture. The 4G base station and the 5G base station may be disposed in the Non-Stand-Alone (NSA) architecture. Alternatively, the 5G base station may be disposed in a Stand-Alone (SA) architecture at a separate location from the 4G base station. The 5G wireless communication module 460 may perform transmission and reception of 5G signals with a 5G base station through a 5G mobile communication network. In this case, the 5G wireless communication module 460 may transmit at least one 5G transmission signal to the 5G base station. In addition, the 5G wireless communication module 460 may receive at least one 5G reception signal from the 5G base station. In this instance, a 5G frequency band that is the same as a 4G frequency band may be used, and this may be referred to as LTE re-farming. In some examples, a Sub6 frequency band, which is a range of 6 GHz or less, may be used as the 5G frequency band. In contrast, a millimeter-wave (mmWave) band may be used as the 5G frequency band to perform broadband high-speed communication. When the mmWave band is used, the electronic device may perform beamforming for coverage expansion of an area where communication with a base station is possible.

Regardless of the 5G frequency band, the 5G communication system may support Multi-Input and Multi-Output (MIMO) to be performed multiple times, to improve a transmission rate. In this instance, UL MIMO may be performed by a plurality of 5G transmission signals that are transmitted to the 5G base station. In addition, DL MIMO may be performed by a plurality of 5G reception signals that are received from the 5G base station.

In some examples, a state of dual connectivity (DC) to both the 4G base station and the 5G base station may be attained through the 4G wireless communication module 450 and the 5G wireless communication module 460. As such, the dual connectivity to the 4G base station and the 5G base station may be referred to as EUTRAN NR DC (EN-DC). In some examples, when the 4G base station and the 5G base station are disposed in a co-located structure, throughput improvement may be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 450 and the 5G wireless communication module 460, respectively. Short-range communication between electronic devices (e.g., vehicles) may be performed using the 4G wireless communication module 450 and the 5G wireless communication module 460. In one embodiment, after resources are allocated, vehicles may perform wireless communication in a V2V manner without a base station.

Meanwhile, for transmission rate improvement and communication system convergence, CA may be carried out using at least one of the 4G wireless communication module 450 and the 5G wireless communication module 460 and a Wi-Fi communication module. In this regard, 4G+Wi-Fi CA may be performed using the 4G wireless communication module 450 and the Wi-Fi communication module 113. Or, 5G+Wi-Fi CA may be performed using the 5G wireless communication module 460 and the Wi-Fi communication module.

In some examples, the communication device 400 may implement a display device for a vehicle together with a user interface device. In this instance, the display device for the vehicle may be referred to as a telematics apparatus or an Audio Video Navigation (AVN) apparatus.

In some examples, a broadband transparent antenna structure that may be disposed on vehicle glass may be implemented as a single dielectric substrate on the same plane as a coplanar waveguide (CPW) feeder. In addition, the broadband transparent antenna structure that can be disposed on the vehicle glass may be implemented as a structure in which grounds are formed at both sides of a radiator to constitute a broadband structure.

Figure 5A:
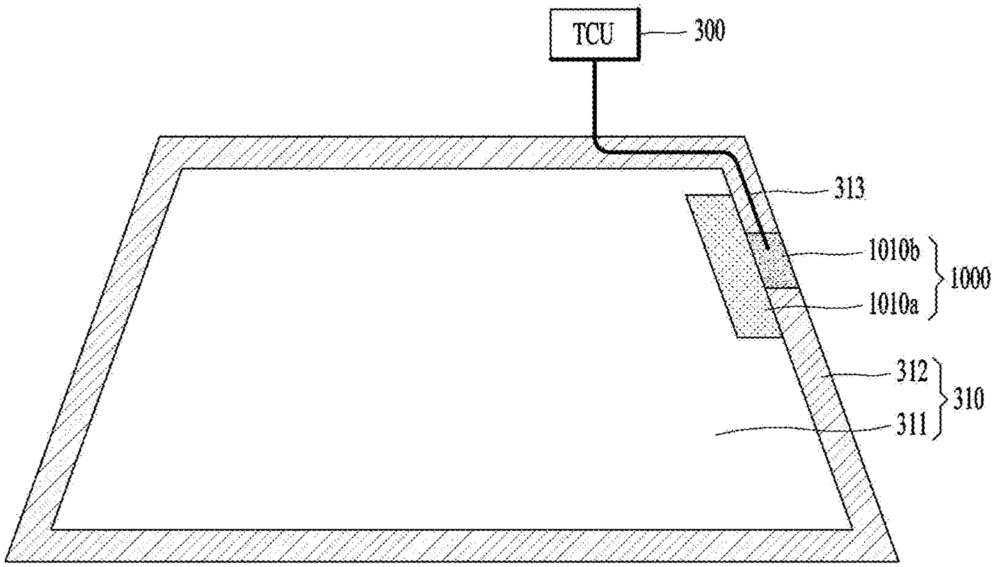
FIGS. 5A and 5C illustrate configuration where an antenna assembly according to the present specification is arranged on vehicle glass.
Figure 5B:
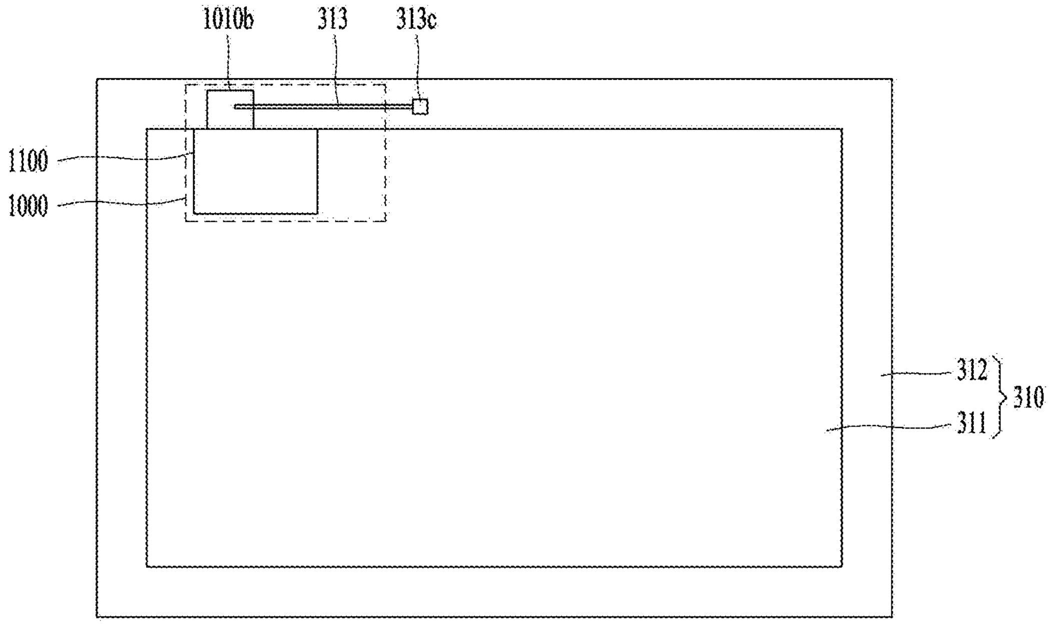

Hereinafter, an antenna assembly associated with a broadband transparent antenna structure according to the present specification will be described. In this regard, FIGS. 5A and 5B illustrate configurations that an antenna assembly according to the present specification is arranged on vehicle glass. Referring to FIG. 5A, the antenna assembly 1000 may include a first dielectric substrate 1010*a* and a second dielectric substrate 1010*b*. The first dielectric substrate 1010*a* is implemented as a transparent substrate and thus may be referred to as a transparent substrate 1010*a*. The second dielectric substrate 1010*b* may be implemented as an opaque substrate 1010*b*.

A glass panel 310 may be configured to include a transparent region 311 and an opaque region 312. The opaque region 312 of the glass panel 310 may be a frit region as a frit layer. The opaque region 312 may be formed to surround the transparent region 311. The opaque region 312 may be formed outside the transparent region 311. The opaque region 312 may form a boundary region of the glass panel 310.

A signal pattern formed on a dielectric substrate 1010 may be connected to the telematics control unit (TCU) 300 through a connector part 313 such as a coaxial cable. The telematics control unit (TCU) 300 may be mounted inside the vehicle, but is not limited thereto. The telematics control unit (TCU) 300 may be arranged on a dashboard inside the vehicle or a ceiling region inside the vehicle, but is not limited thereto.

Figure 5C:
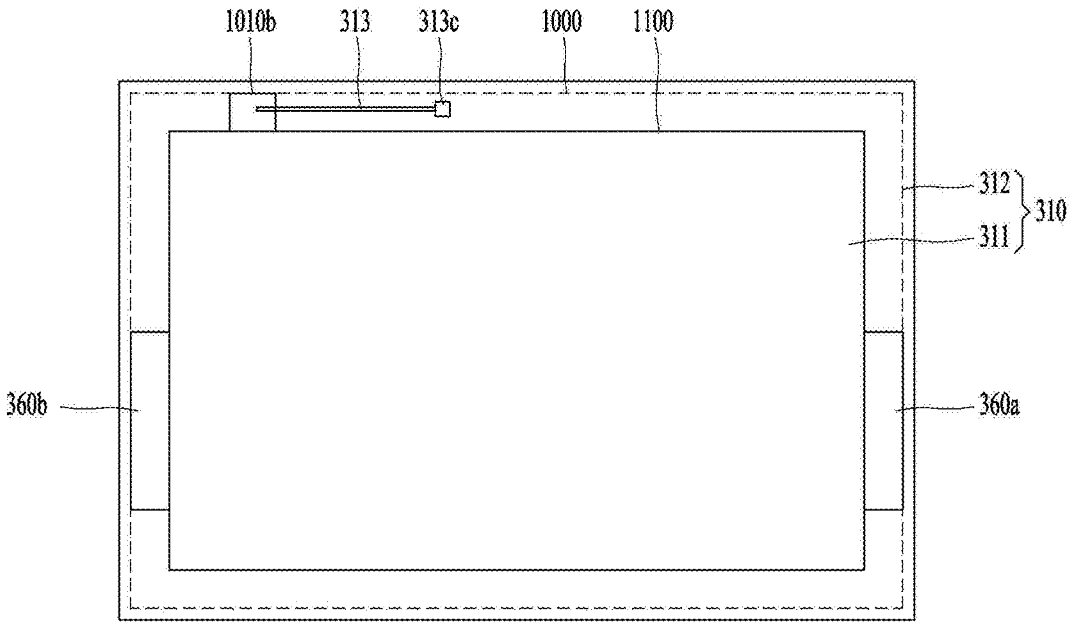

FIG. 5B illustrates a configuration in which the antenna assembly 1000 is arranged in a partial region of the glass panel 310. FIG. 5C illustrates a configuration in which the antenna assembly 1000 is arranged in an entire region of the glass panel 310.

Referring to FIGS. 5B and 5C, the glass panel 310 may include the transparent region 311 and the opaque region 312. The opaque region 312 that is a non-visible area with transparency below a certain level may be referred to as a frit region, black printing (BP) region, or black matrix (BM) region. The opaque region 312 corresponding to the non-visible area may be formed to surround the transparent region 311. The opaque region 312 may be formed in a region outside the transparent region 311. The opaque region 312 may form a boundary region of the glass panel 310. The second dielectric substrate 1010*b* or heating pads 360*a* and 360*b* corresponding to a feeding substrate may be arranged in the opaque region 312. The second dielectric substrate 1010*b* arranged in the opaque region 312 may be referred to as an opaque substrate. Even when the antenna assembly 1000 is arranged in the entire region of the glass panel 310 as illustrated in FIG. 5C, the heating pads 360*a* and 360*b* may be arranged in the opaque region 312.

Referring to FIG. 5B, the antenna assembly 1000 may include the first transparent dielectric substrate 1010*a* and the second dielectric substrate 1010*b*. Referring to FIGS. 5B and 5C, the antenna assembly 1000 may include the antenna module 1100 configured with conductive patterns, and the second dielectric substrate 1010*b*. The antenna module 1100 may include a transparent electrode part to be implemented as a transparent antenna module. The antenna module 1100 may include one or more antenna elements. The antenna module 1100 may include a MIMO antenna and/or other antenna elements for wireless communication. The other antenna elements may include at least one of GNSS/radio/broadcasting/Wi-Fi/satellite communication/UWB, and remote keyless entry (RKE) antennas for vehicle applications.

Referring to FIGS. 5A to 5C, the antenna assembly 1000 may be interfaced with the TCU 300 through the connector part 313. The connector part 313 may include a connector 313*c* on an end of a cable to be electrically connected to the TCU 300. A signal pattern formed on the second dielectric substrate 1010*b* of the antenna assembly 1000 may be connected to the TCU 300 through the connector part 313 such as a coaxial cable. The antenna module 1100 may be electrically connected to the TCU 300 through the connector part 313. The TCU 300 may be disposed inside the vehicle, but is not limited thereto. The TCU 300 may be disposed on a dashboard inside the vehicle or a ceiling region inside the vehicle, but is not limited thereto.

Meanwhile, when the transparent antenna assembly according to the present specification is attached to the inside or surface of the glass panel 310, a transparent electrode part including an antenna pattern and a dummy pattern may be arranged in the transparent region 311. On the other hand, an opaque substrate part may be arranged in the opaque region 312.

Figure 6A:
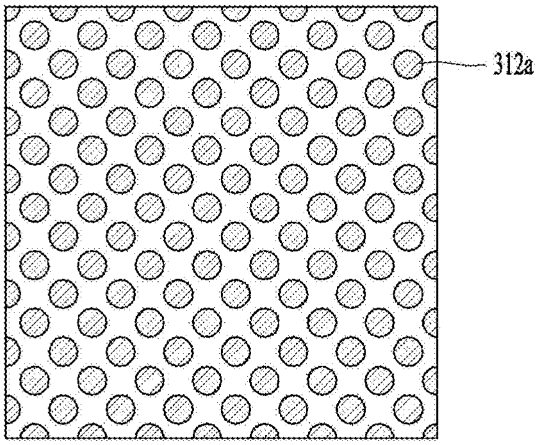
FIG. 6A illustrates various embodiments of frit patterns according to the present specification.
Figure 6A:
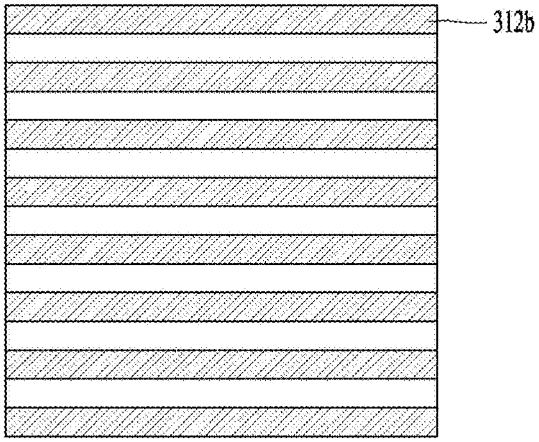
Figure 6A:
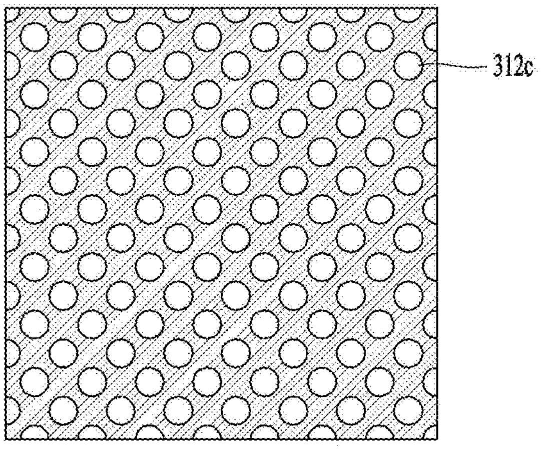
Figure 6B:
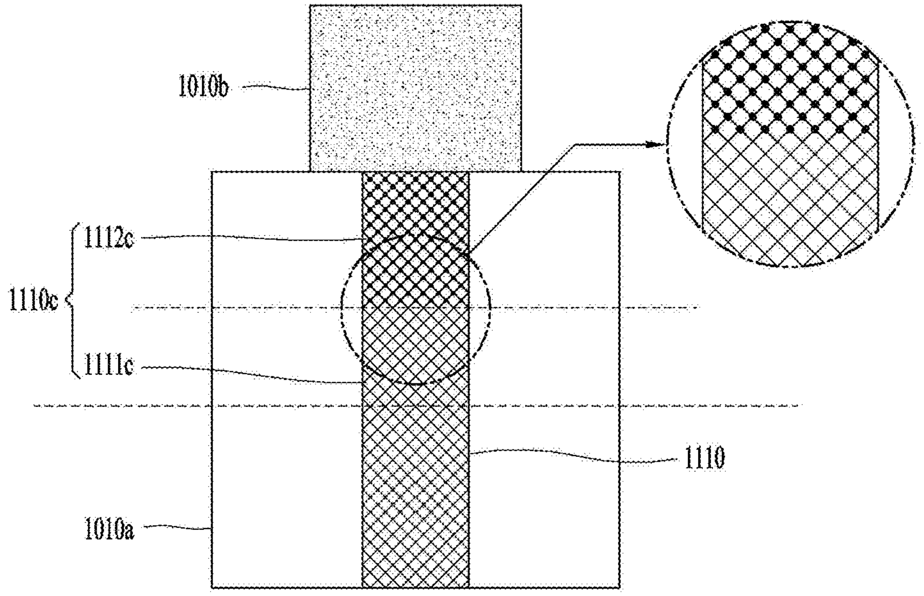
FIGS. 6B and 6C illustrate transparent antenna patterns and structures in which the transparent antenna patterns are arranged on vehicle glass according to embodiments.
Figure 6B:
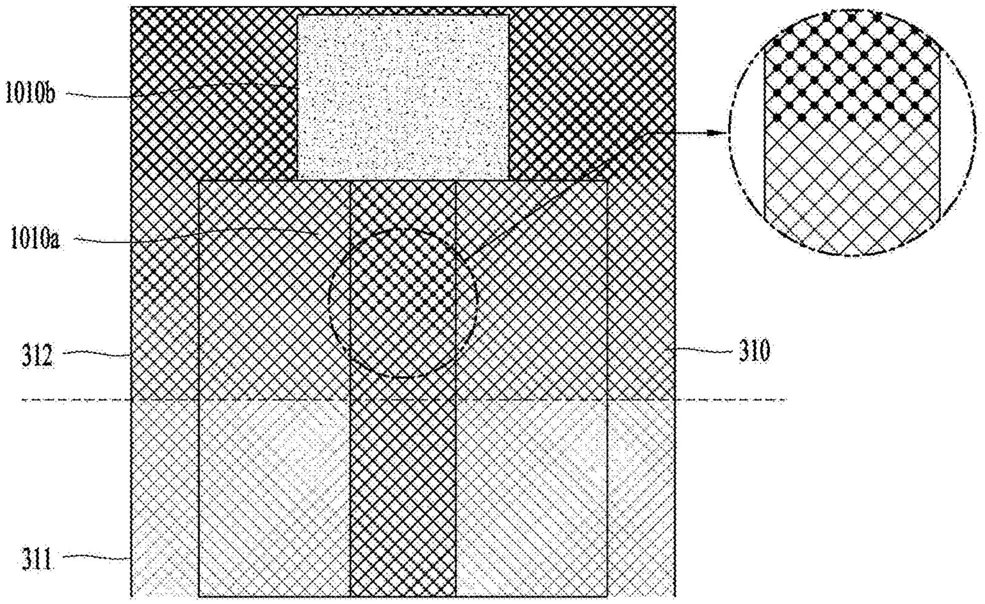
Figure 6C:
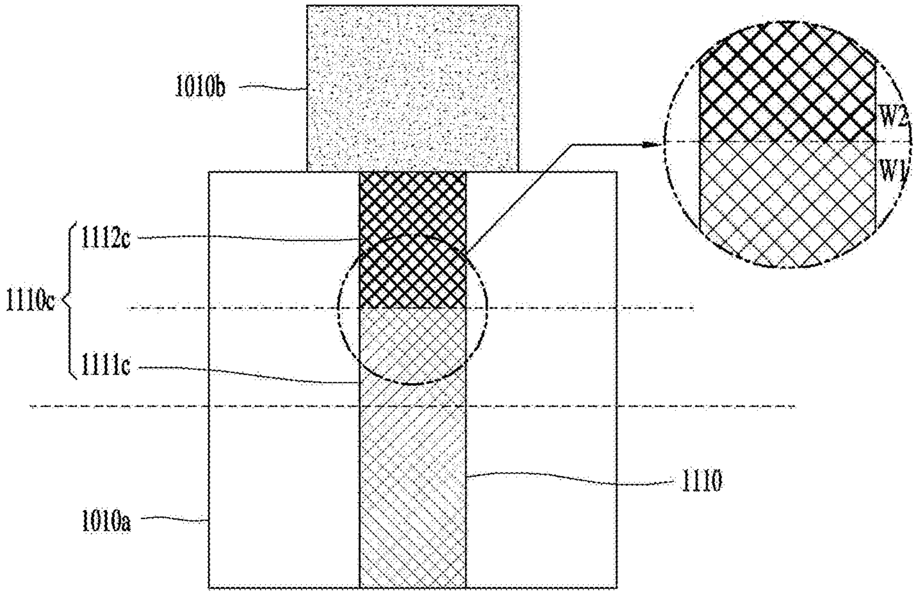
Figure 6C:
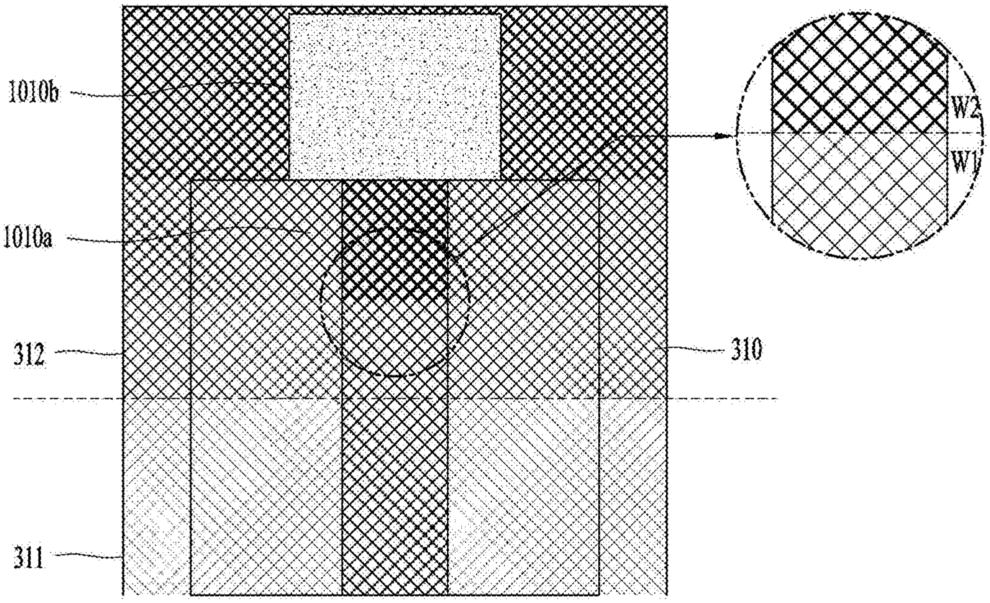

The antenna assembly formed on the vehicle glass according to the present specification may be arranged in the transparent region and the opaque region. In this regard, FIG. 6A illustrates various embodiments of frit patterns according to the present specification. FIGS. 6B and 6C illustrate transparent antenna patterns and structures in which the transparent antenna patterns are arranged on vehicle glass according to embodiments.

Referring to (a) of FIG. 6A, a frit pattern 312*a* may be a metal pattern in a circular (polygonal, or oval) shape with a certain diameter. The frit pattern 312*a* may be arranged in a two-dimensional (2D) structure in both axial directions. The frit pattern 312*a* may be formed in an offset structure where center points between patterns forming adjacent rows are spaced apart by a certain distance.

Referring to (b) of FIG. 6A, the frit pattern 312*b* may be formed as a rectangular pattern in one axial direction. The frit pattern 312*c* may be arranged in a one-dimensional structure in one axial direction or in a 2D structure in both axial directions.

Referring to (c) of FIG. 6A, the frit pattern 312*c* may be formed as a slot pattern, from which a metal pattern has been removed, in a circular (polygonal or oval) shape with a certain diameter. The frit pattern 312*b* may be arranged in a 2D structure in both axial directions. The frit pattern 312*c* may be formed in an offset structure where center points between patterns forming adjacent rows are spaced apart by a certain distance.

Referring to FIGS. 5A to 6C, the opaque substrate 1010*b* and the transparent substrate 1010*a* may be electrically connected to each other in the opaque region 312. In this regard, a dummy pattern, which is electrically very small to have a certain size or less, may be disposed adjacent to the antenna pattern to secure the invisibility of a transparent antenna pattern. Accordingly, a pattern within a transparent electrode can be made invisible to the naked eye without deterioration of antenna performance. The dummy pattern may be designed to have similar light transmittance to that of the antenna pattern within a certain range.

The transparent antenna assembly including the opaque substrate 1010*b* bonded to the transparent electrode part may be mounted on the glass panel 310. In relation to this, to ensure invisibility, the opaque substrate 1010*b* connected to an RF connector or coaxial cable is placed in the opaque region 312 of the vehicle glass. Meanwhile, the transparent electrode part may be placed in the transparent region 311 of the vehicle glass to ensure the invisibility of the antenna from the outside of the vehicle glass.

A portion of the transparent electrode part may be attached to the opaque region 312 in some cases. The frit pattern of the opaque region 312 may be gradated from the opaque region 312 to the transparent region 311. The transmission efficiency of a transmission line may be improved while improving the invisibility of the antenna when the light transmittance of the frit pattern is adjusted to match the light transmittance of the transparent electrode part within a certain range. Meanwhile, sheet resistance may be reduced while ensuring invisibility by adopting a metal mesh shape similar to the frit pattern. In addition, the risk of disconnection of the transparent electrode layer during manufacturing and assembly may be reduced by increasing the line width of a metal mesh grid in a region connected to the opaque substrate 1010*b*.

Referring to (a) of FIG. 6A and FIG. 6B, a conductive pattern 1110 of the antenna module may include metal mesh grids with the same line width in the opaque region 312. The conductive pattern 1110 may include a connection pattern 1110*c* for connecting the transparent substrate 1010*a* and the opaque substrate 1010*b*. In the opaque region 312, the connection pattern 1110*c* and the frit patterns in a certain shape on both side surfaces of the connection pattern 1110*c* may be arranged at certain distances. The connection pattern 1110*c* may include a first transmittance section 1111*c* with a first transmittance and a second transmittance section 1112*c* with a second transmittance.

The frit patterns 312*a* formed in the opaque region 312 may include metal grids with a certain diameter arranged in one axial direction and another axial direction. The metal grids of the frit patterns 312*a* which correspond to the second transmittance section 1112*c* of the connection pattern 1110*c* may be arranged at intersections of the metal mesh grids.

Referring to (b) of FIG. 6A and FIG. 6B, the frit patterns 312*b* formed in the opaque region 312 may include slot grids with a certain diameter, from which a metal region has been removed, disposed in one axial direction and another axial direction. The slot grids of the frit patterns 312*b* may be arranged between the metal mesh grids in the connection pattern 1110*c*. Accordingly, the metal regions of the frit patterns 312*b* where slot grids are not formed may be arranged at the intersections of the metal mesh grids.

Referring to FIGS. 6A and 6C, the connection pattern 1110*c* may include metal mesh grids with a first line width W1 in the first transmittance section 1111*c* adjacent to the transparent region 311. The connection pattern 1110*c* may be formed with a second line width W2 thicker than the first line width W1 in the second transmittance section 1112*c* adjacent to the opaque substrate 1010*b*. In this regard, the first transparency of the first transmittance section 1111*c* may be set to be higher than the second transparency of the second transmittance section 1112*c*.

When the transparent antenna assembly is attached to the inside of the vehicle glass as illustrated in FIGS. 5A to 5C, the transparent electrode part may be disposed in the transparent region 311 and the opaque substrate 1010*b* may be disposed in the opaque region 312. In this regard, the transparent electrode part may be arranged in the opaque region 312 in some cases.

Metal patterns of a low-penetration pattern electrode part and a high-penetration pattern electrode part located in the opaque region 312 may partially be arranged in a gradation region of the opaque region 312. When the antenna pattern and a transmission line portion of the low-penetration pattern electrode part are configured as a transparent electrode, a decrease in antenna gain may be caused by the deterioration of transmission efficiency due to an increase in sheet resistance. As a way to overcome this loss of gain, the transmittance of the frit pattern 312 where an electrode is located and the transmittance of the transparent electrode may be made equal to each other within a certain range.

Low sheet resistance may be achieved by increasing the line width of the transparent electrode located in a region where the transmittance of the frit pattern 312*a*, 312*b*, 312*c* is low or by adding the same shape as that of the frit pattern 312*a*, 312*b*, 312*c*. Accordingly, invisibility may be secured while solving the problem of deteriorated transmission efficiency. The transmittance and pattern of the opaque region 312 are not limited to those in the structure of FIG. 6A and may differ depending on a glass manufacturer or vehicle manufacturer. Accordingly, the shape and transparency (line width and separation distance) of the transparent electrode of the transmission line may change in various ways.

Figure 7A:
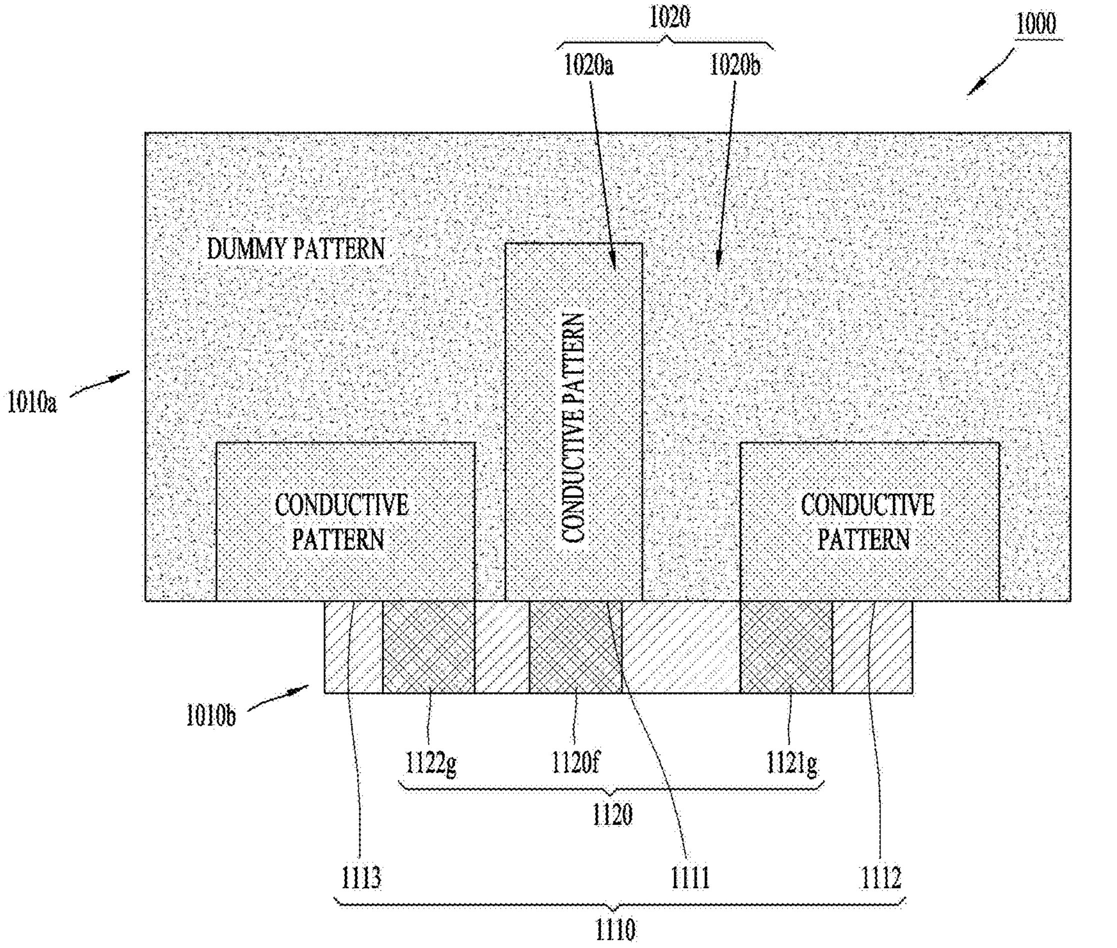
FIG. 7A shows a front view and a cross-sectional view of a transparent antenna assembly according to the present specification.
Figure 7A:
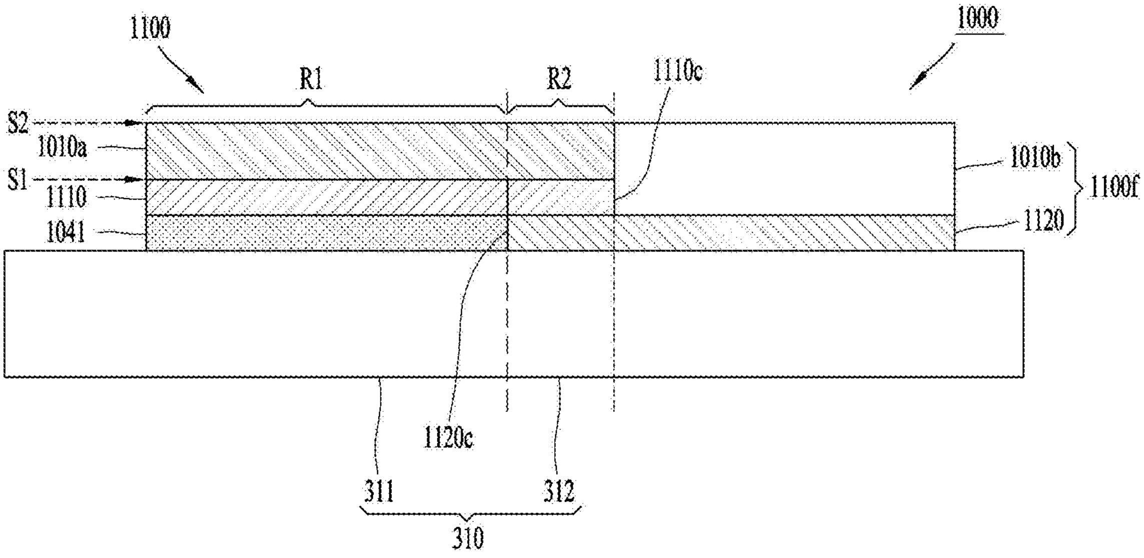
Figure 7B:
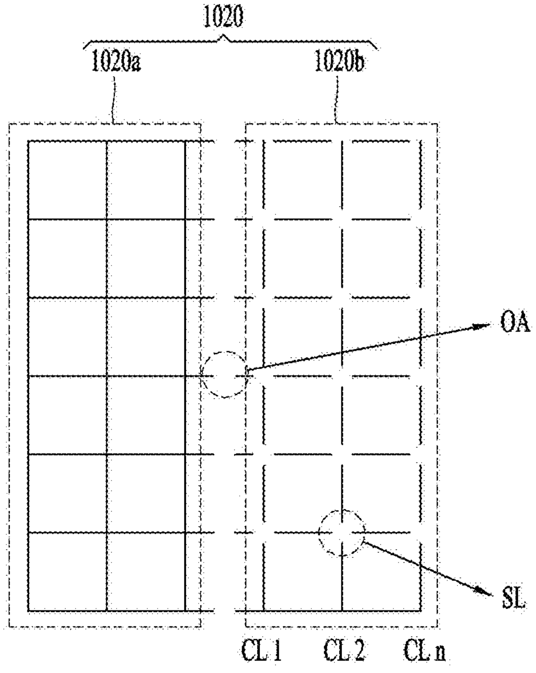
FIG. 7B illustrates a grid structure of a metal mesh radiator region and a dummy metal mesh region according to embodiments.
Figure 7B:
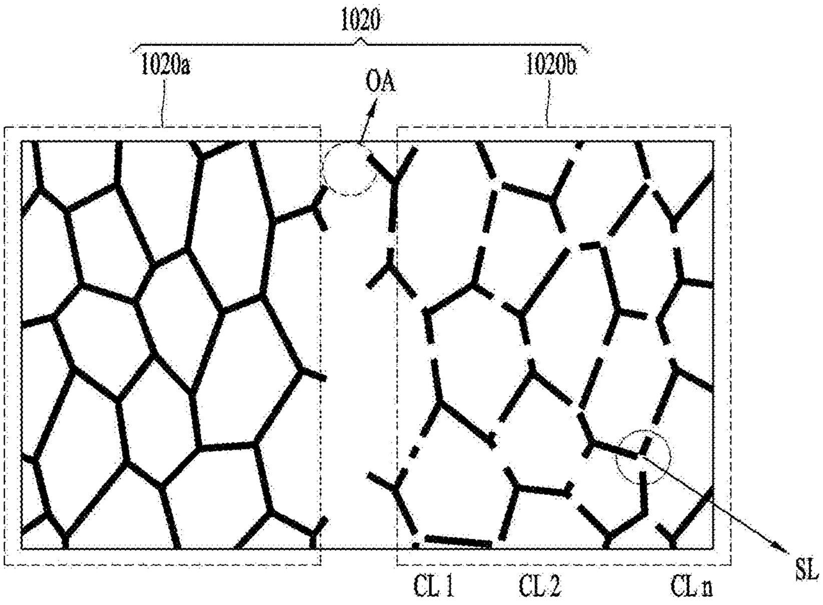

FIG. 7A shows a front view and a cross-sectional view of a transparent antenna assembly according to the specification. FIG. 7B is a diagram illustrating a grid structure of a metal mesh radiator region and a dummy metal mesh region according to embodiments.

(a) of FIG. 7A is a front view of a transparent antenna assembly 1000, and (b) of FIG. 7A is a cross-sectional view of the transparent antenna assembly 1000, showing the layered structure of the transparent antenna assembly 1000. Referring to FIG. 7A, the antenna assembly 1000 may include a first transparent dielectric substrate 1010*a* and a second dielectric substrate 1010*b*. Conductive patterns 1110 that act as a radiator may be disposed on one surface of the first transparent dielectric substrate 1010*a*. A feeding pattern 1120*f* and ground patterns 1121*g* and 1122*g* may be formed on one surface of the second dielectric substrate 1010*b*. The conductive patterns 1110 acting as the radiator may be configured to include one or more conductive patterns. The conductive patterns 1110 may include a first pattern 1111 connected to the feeding pattern 1120*f*, and a second pattern 1112 connected to the ground pattern 1121*g*. The conductive patterns 1110 may further include a third pattern 1113 connected to the ground pattern 1122*g*.

The conductive patterns 1110 constituting the antenna module may be implemented as a transparent antenna. Referring to FIG. 7B, the conductive patterns 1110 may be metal grid patterns 1020*a* with a certain line width or less to form a metal mesh radiator region. Dummy metal grid patterns 1020*b* may be formed in inner regions among or outer regions of the first to third patterns 1111, 1112, and 11113 of the conductive patterns 1100 to maintain transparency at a certain level. The metal grid patterns 1020*a* and the dummy metal grid patterns 1020*b* may form a metal mesh layer 1020.

(a) of FIG. 7B illustrates a 1 structure of the typical metal grid patterns 1020*a* and dummy metal grid patterns 1020*b*. (b) of FIG. 7 illustrates a structure of the atypical metal grid patterns 1020*a* and dummy metal grid patterns 1020*b*. As illustrated in (a) of FIG. 7B, the metal mesh layer 1020 may be formed in a transparent antenna structure by a plurality of metal mesh grids. The metal mesh layer 1020 may be formed in a typical metal mesh shape, such as a square shape, a diamond shape, or a polygonal shape. Conductive patterns may be configured such that the plurality of metal mesh grids operate as a feeding line or radiator. The metal mesh layer 1020 may constitute a transparent antenna region. As one example, the metal mesh layer 1020 may have a thickness of about 2 mm, but is not limited thereto.

The metal mesh layer 1020 may include the metal grid patterns 1020*a* and the dummy metal grid patterns 1020*b*. The metal grid patterns 1020*a* and the dummy metal grid patterns 1020*b* may have ends disconnected from each other to form opening areas OA, thereby being electrically disconnected. The dummy metal grid patterns 1020*b* may have slits SL formed so that ends of mesh grids CL1, CL2, . . . , CLn are not connected.

Referring to (b) of FIG. 7B, the metal mesh layer 1020 may be formed by a plurality of atypical metal mesh grids. The metal mesh layer 1020 may include the metal grid patterns 1020*a* and the dummy metal grid patterns 1020*b*. The metal grid patterns 1020*a* and the dummy metal grid patterns 1020*b* may have ends disconnected from each other to form the opening areas OA, thereby being electrically disconnected. The dummy metal grid patterns 1020*b* may have slits SL formed so that ends of mesh grids CL1, CL2, . . . , CLn are not connected.

Figure 8A:
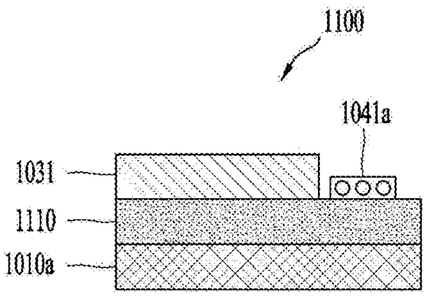
FIG. 8A illustrates the layered structure of an antenna module and a feeding module.
Figure 8A:
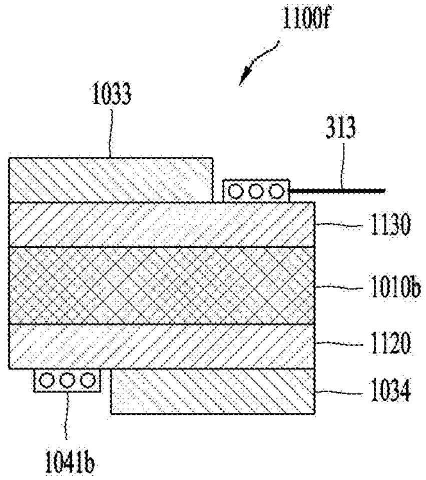
Figure 8B:
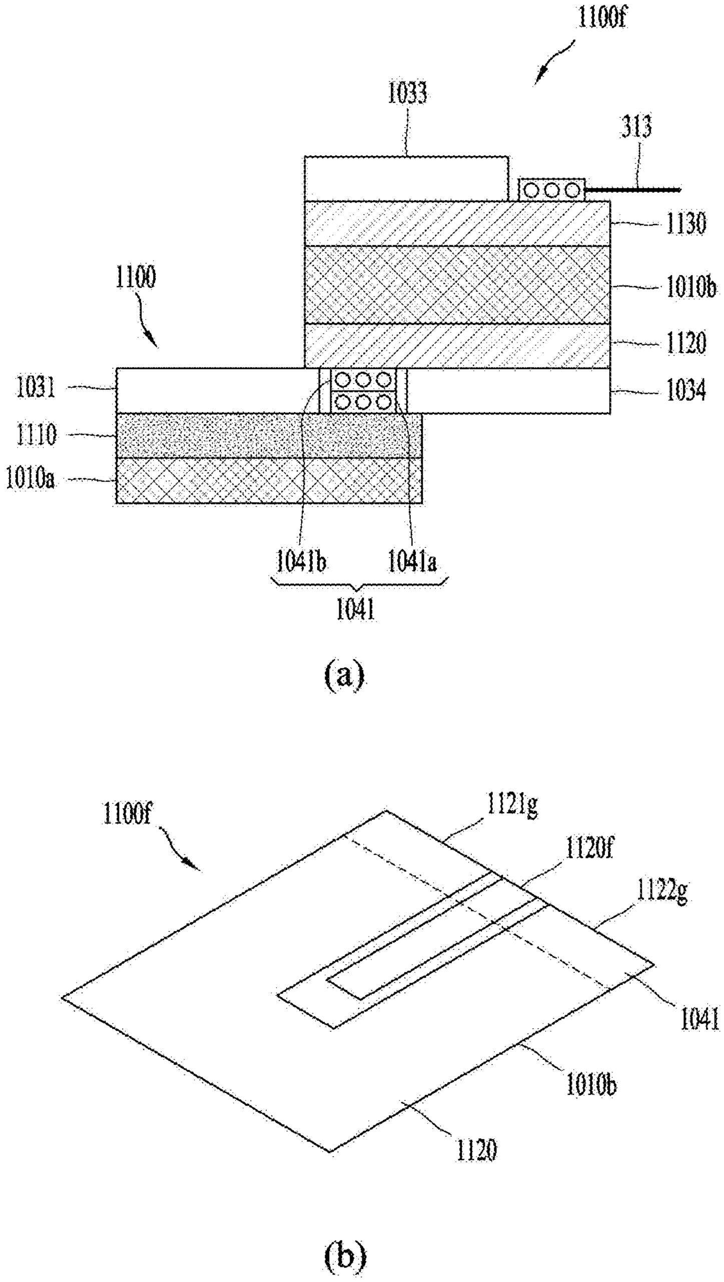
FIG. 8B illustrates an opaque substrate including the layered structure, in which the antenna module and the feeding structure are coupled to each other, and a coupling region.

Meanwhile, the transparent substrate on which the transparent antenna according to the specification is formed may be placed on the vehicle glass. In this regard, FIG. 8A illustrates the layered structure of an antenna module and a feeding pattern. FIG. 8B illustrates an opaque substrate including the layered structure, in which the antenna module and the feeding structure are coupled to each other, and a coupling region.

Referring to (a) of FIG. 8A, the antenna module 1100 may include a first transparent dielectric substrate 1010*a* formed on a first layer, and a first conductive pattern 1110 formed on a second layer arranged on the first layer. The first conductive pattern 1110 may be implemented as the metal mesh layer 1020 including the metal grid patterns 1020*a* and the dummy metal grid patterns 1020*b*, as illustrated in FIG. 7B. The antenna module 1100 may further include a protective layer 1031 and an adhesive layer 1041*a* arranged on the second layer.

Referring to (b) of FIG. 8A, a feeding structure 1100*f* may include a second dielectric substrate 1010*b*, a second conductive pattern 1120, and a third conductive pattern 1130. The feeding structure 1100*f* may further include first and second protective layers 1033 and 1034 stacked on the second conductive pattern 1120 and the third conductive pattern 1130, respectively. The feeding structure 1100*f* may further include an adhesive layer 1041*b* formed on a partial region of the second conductive pattern 1120.

The second conductive pattern 1120 may be disposed on one surface of the second dielectric substrate 1010*b* implemented as an opaque substrate. The third conductive pattern 1130 may be disposed on another surface of the second dielectric substrate 1010*b*. The first protective layer 1033 may be formed on top of the third conductive pattern 1130. The second protective layer 1034 may be formed on the bottom of the second conductive pattern 1120. Each of the first and second protective layers 1033 and 1034 may be configured to have a low permittivity below a certain value, enabling low-loss feeding to the transparent antenna region.

Referring to (a) of FIG. 8B, the antenna module 1100 may be coupled with the feeding structure 1100*f* including the second dielectric substrate 1010*b*, which is the opaque substrate. The first conductive pattern 1110 implemented as the metal mesh layer, which is the transparent electrode layer, may be formed on top of the first transparent dielectric substrate 1010*a*. The protective layer 1031 may be formed on top of the first conductive pattern 1110. The protective layer 1031 and the first adhesive layer 1041*a* may be formed on top of the first conductive pattern 1110. The first adhesive layer 1041*a* may be formed adjacent to the protective layer 1031.

The first adhesive layer 1041*a* formed on top of the first conductive pattern 1110 may be bonded to the second adhesive layer 1041*b* formed on the bottom of the second conductive layer 1120. The first transparent dielectric substrate 1010*a* and the second dielectric substrate 1010*b* may be adhered by the bonding between the first and second adhesive layers 1041*a* and 1041*b*. Accordingly, the metal mesh grids formed on the first transparent dielectric substrate 1010*a* may be electrically connected to the feeding pattern formed on the second dielectric substrate 1010*b*.

The second dielectric substrate 1010*b* may be formed as the feeding structure 1100*f* that includes the second conductive pattern 1120 and the third conductive pattern 1130 arranged on one surface and another surface thereof. The feeding structure 1100*f* may be implemented as a flexible printed circuit board (FPCB), but is not limited thereto. The first protective layer 1033 may be disposed on top of the third conductive pattern 1130, and the second protective layer 1034 may be disposed on the bottom of the second conductive pattern 1120. The adhesive layer 1041*b* on the bottom of the third conductive pattern 1130 may be bonded to the adhesive layer 1041*a* of the antenna module 1100. Accordingly, the feeding structure 1100*f* may be coupled with the antenna module 1100 and the first and second conductive patterns 1110 and 1120 may be electrically connected.

The antenna module 1100 implemented with the first transparent dielectric substrate 1010*a* may be formed to have a first thickness. The feeding structure 1100*f* implemented with the second dielectric substrate 1010*b* may be formed to have a second thickness. For example, the thicknesses of the dielectric substrate 1010*a*, the first conductive pattern 1110, and the protective layer 1031 of the antenna module 1100 may be 75 μm, 9 μm, and 25 μm, respectively. The first thickness of the antenna module 1100 may be 109 μm. The thicknesses of the second dielectric substrate 1010*b*, the second conductive pattern 1120, and the third conductive pattern 1130 of the feeding structure 1100*f* may be 50 μm, 18 μm, and 18 μm, respectively, and the thicknesses of the first and second protective layers 1033 and 1034 may be 28 μm. Accordingly, the second thickness of the feeding structure 1100*f* may be 142 μm. Since the adhesive layers 1041*a* and 1041*b* are formed on the top of the first conductive pattern 1110 and the bottom of the second conductive pattern 1120, the entire thickness of the antenna assembly may be smaller than the sum of the first thickness and the second thickness. For example, the antenna assembly 1000 including the antenna module 1100 and the feeding structure 1100*f* may have a thickness of 198 μm.

Referring to (b) of FIG. 8B, the conductive pattern 1120 may be formed on one surface of the second dielectric substrate 1010*b* forming the feeding structure 1100*f*. The conductive pattern 1120 may be formed in a CPW-type feeding structure that includes the feeding pattern 1120*f* and the ground patterns 1121*g* and 1122*g* formed on both sides of the feeding pattern 1120*f*. The feeding structure 1100*f* may be coupled with the antenna module 1100, as illustrated in (a) of FIG. 8B, through a region where the adhesive layer 1041 is formed.

The antenna module and the feeding structure constituting the antenna assembly according to the specification may be arranged on the vehicle glass and coupled through a specific coupling structure. In this regard, FIG. 9A illustrates a coupling structure of a transparent antenna that is disposed in a transparent region and a frit region of vehicle glass.

Figure 9A:
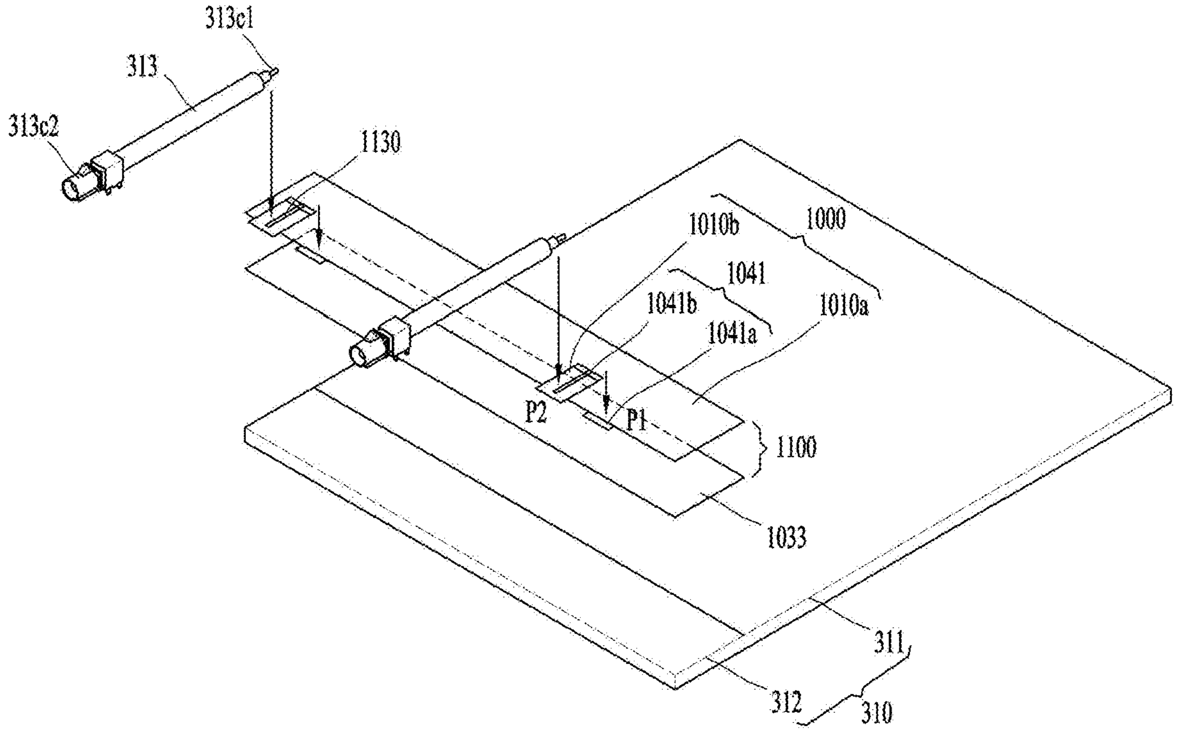
FIG. 9A illustrates a coupling structure of a transparent antenna that is disposed in a transparent region and a frit region of vehicle glass.

Referring to FIG. 9A, the first transparent dielectric substrate 1010*a* may be adhered to the glass panel 310 through the adhesive layer 1041. The conductive pattern of the first transparent dielectric substrate 1010*a* may be bonded to the conductive pattern 1130 of the second dielectric substrate 1010*b* through ACF bonding. ACF bonding involves bonding of a tape, to which metal balls are added, to a bonding surface at high temperature/high pressure (e.g., 120 to 150 degrees, 2 to 5 Mpa) for a few seconds, and may be achieved by allowing electrodes to be in contact with each other through the metal balls therebetween. ACF bonding electrically connects conductive patterns and simultaneously provides adhesive strength by thermally hardening the adhesive layer 1041.

The first transparent dielectric substrate 1010*a* on which the transparent electrode layer is formed and the second dielectric substrate 1010*b* in the form of the FPCB may be attached to each other through local soldering. The connection pattern of the FPCB and the transparent antenna electrode may be connected through the local soldering using a coil in a magnetic field induction manner. During such local soldering, the FPCB may be maintained flat without deformation due to an increase in temperature of a soldered portion. Accordingly, an electrical connection with high reliability may be achieved through the local soldering between the conductive patterns of the first transparent dielectric substrate 1010*a* and the second dielectric substrate 1010*b*.

The first transparent dielectric substrate 1010*a*, the metal mesh layer 1020 of FIG. 7A, the protective layer 1033, and the adhesive layer 1041 may form a transparent electrode. The second dielectric substrate 1010*b*, which is the opaque substrate, may be implemented as the FPCB, but is not limited thereto. The second dielectric substrate 1010*b*, which is the FPCB with the feeding pattern, may be connected to the connector part 313 and the transparent electrode.

The second dielectric substrate 1010*b*, which is the opaque substrate, may be attached to a partial region of the first transparent dielectric substrate 1010*a*. The first transparent dielectric substrate 1010*a* may be formed in the transparent region 311 of the glass panel 310. The second dielectric substrate 1010*b* may be formed in the opaque region 312 of the glass panel 310. The partial region of the first transparent dielectric substrate 1010*a* may be formed in the opaque region 312, and the first transparent dielectric substrate 1010*a* may be coupled to the second dielectric substrate 1010*b* in the opaque region 312.

The first transparent dielectric substrate 1010*a* and the second dielectric substrate 1010*b* may be adhered by the bonding between the adhesive layers 1041*a* and 1041*b*. A position at which the second dielectric substrate 1010*b* is bonded to the adhesive layer 1041 may be set to a first position P1. A position at which the connector part 313 is soldered to the opaque substrate 1010*b* may be set to a second position P2.

Figure 9B:
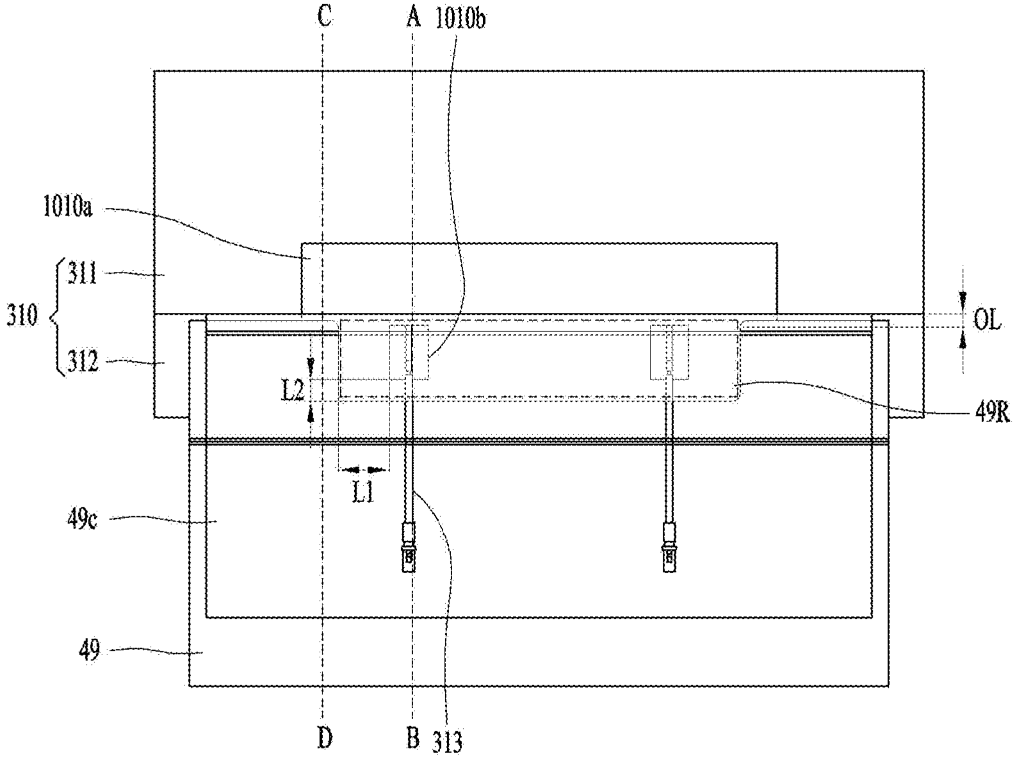
FIG. 9B is an enlarged front view of a region where glass with the transparent antenna of FIG. 9A is coupled to a body structure of the vehicle.
Figure 9C:
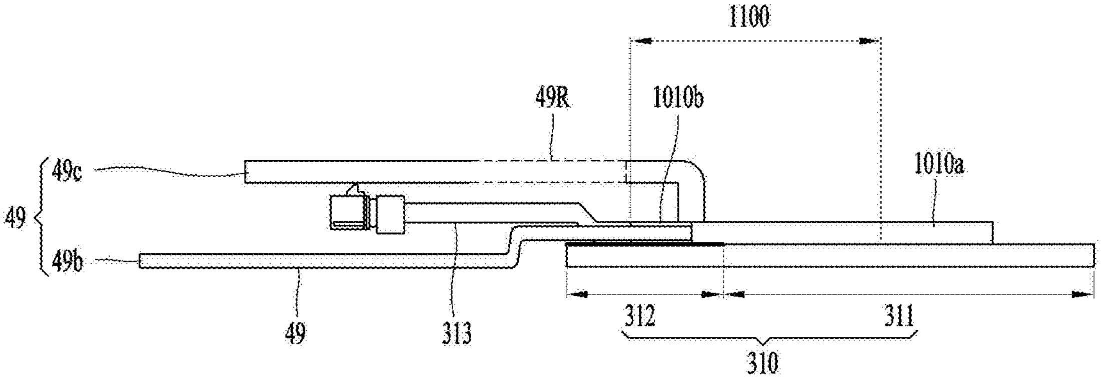
FIG. 9C is a cross-sectional view illustrating the coupling structure between the vehicle glass and the body structure of FIG. 9B, viewed from different positions.
Figure 9C:
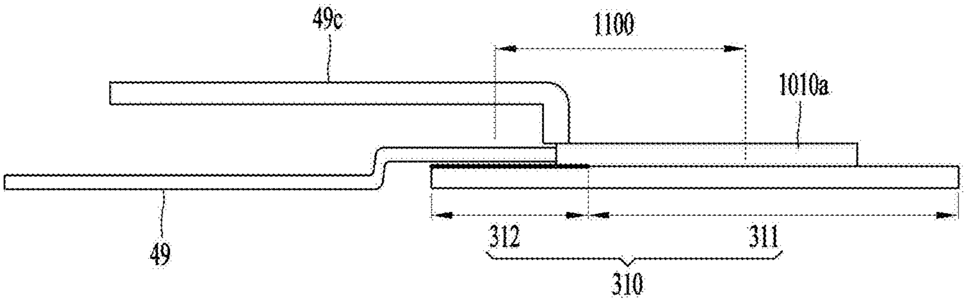

Meanwhile, the vehicle glass on which the antenna assembly according to the specification is formed may be coupled to a body structure of the vehicle. In this regard, FIG. 9B is an enlarged front view of a region where glass with the transparent antenna of FIG. 9A is coupled to a body structure of a vehicle. FIG. 9C is a cross-sectional view illustrating the coupling structure between the vehicle glass and the body structure of FIG. 9B, viewed from different positions.

Referring to FIG. 9B, the first transparent dielectric substrate 1010*a* on which a transparent antenna is formed may be disposed in the transparent region 311 of the glass panel 310. The second dielectric substrate 1010*b* may be disposed in the opaque region 312 of the glass panel 310. Since the transmittance of the opaque region 312 is lower than that of the transparent region 311, the opaque region 312 may also be referred to as a black matrix (BM) region. A portion of the first transparent dielectric substrate 1010*a* on which the transparent antenna is formed may extend up to the opaque region 312 corresponding to the BM region. The first transparent dielectric substrate 1010*a* and the opaque region 312 may be formed to overlap each other by an overlap length OL in one axial direction.

(a) of FIG. 9C is a cross-sectional view of the antenna assembly, cut along the line AB in FIG. 9B. (a) of FIG. 9C is a cross-sectional view of the antenna assembly, cut along the line CD in FIG. 9B.

Referring to FIG. 9B and (a) of FIG. 9C, the first transparent dielectric substrate 1010*a* on which the transparent antenna is formed may be disposed in the transparent region 311 of the glass panel 310. The second dielectric substrate 1010*b* may be disposed in the opaque region 312 of the glass panel 310. The partial region of the first transparent dielectric substrate 1010*a* may extend up to the opaque region 312, so that the feeding pattern formed on the second dielectric substrate 1010*b* and the metal mesh layer of the transparent antenna are bonded to each other.

An interior cover 49*c* may be configured to accommodate the connector part 313 connected to the second dielectric substrate 1010*b*. The connector part 313 may be disposed in a space between a body 49*b* made of a metal material and the interior cover 49*c*, and the connector part 313 may be coupled to an in-vehicle cable. The interior cover 49*c* may be placed in the upper region of the metal body 49*b*. The interior cover 49*c* may be formed with one end bent to be coupled to the metal body 49*b*.

The interior cover 49*c* may be made of a metal material or dielectric material. When the interior cover 49*c* is made of a metal material, the interior cover 49*c* and the body 49*b* made of the metal material constitute a metal frame 49. In this regard, the vehicle may include the metal frame 49. The opaque region 312 of the glass panel 310 may be supported by a portion of the metal frame 49. To this end, a portion of the body 49*b* of the metal frame 49 may be bent to be coupled to the opaque region 312 of the glass panel 310.

When the interior cover 49*c* is made of a metal material, at least a portion of a metal region of the interior cover 49*c* in the upper region of the second dielectric substrate 1010*b* may be cut out. A recess portion 49R from which the metal region has been cut out may be formed in the interior cover 49*c*. Accordingly, the metal frame 49 may include the recess portion 49R. The second dielectric substrate 1010*b* may be placed within the recess portion 49R of the metal frame 49.

The recess portion 49R may also be referred to as a metal cut region. One side of the recess portion 49R may be formed to be spaced apart from one side of the opaque substrate 1010*b* by a first length L1 which is equal to or greater than a threshold value. A lower boundary side of the recess portion 49R may be formed to be spaced apart from a lower boundary side of the opaque substrate 1010*b* by a second length L2 which is equal to or greater than a threshold value. As the metal is removed from the partial region of the interior cover 49*c* made of the metal material, signal loss and changes in antenna characteristics due to a surrounding metal structure can be suppressed.

Referring to FIG. 9B and (b) of FIG. 9C, a recess portion like a metal cut region may not be formed in the interior cover 49*c* in a region where the connector part and the opaque substrate are not arranged. In this regard, while protecting the internal components of the antenna module 1100 by use of the interior cover 49*c*, internal heat may be dissipated to the outside through the recess portion 49R of FIG. 9B and (a) of FIG. 9C. In addition, whether it is necessary to repair a connected portion may be immediately determined through the recess portion 49R of the interior cover 49*c*. Meanwhile, since the recess portion is formed in the interior cover 49*c* in a region where the connector part and the second dielectric substrate are not arranged, the internal components of the antenna module 1100 may be protected.

Meanwhile, an antenna assembly 1000 according to the specification may be formed in various shapes on a glass panel 310, and the glass panel 310 may be attached to a vehicle frame. In this regard, FIG. 10 illustrates a laminated structure of an antenna assembly and a region where vehicle glass is attached to a vehicle frame according to embodiments.

Figure 10:
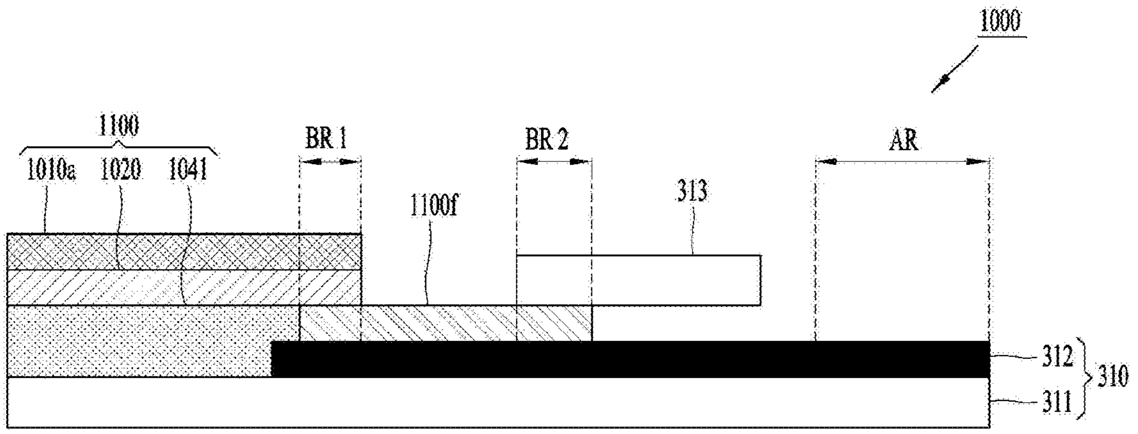
FIG. 10 is a diagram illustrating a laminated structure of an antenna assembly according to embodiments and an attachment region between vehicle glass and a vehicle frame.
Figure 10:
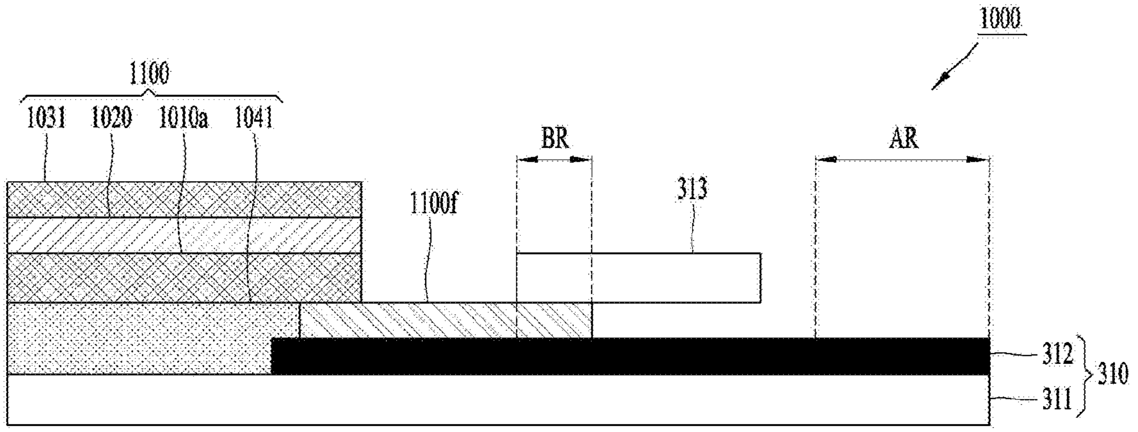

Referring to (a) of FIG. 10, the glass panel 310 may include a transparent region 311 and an opaque region 312. The antenna assembly 1000 may include an antenna module 1100 and a feeding structure 1100*f*. The antenna module 1100 may include a first transparent dielectric substrate 1010*a*, a transparent electrode layer 1020, and an adhesive layer 1041. The feeding structure 1100*f* implemented as an opaque region and the transparent electrode layer 1020 implemented as a transparent substrate may be electrically connected to each other. The feeding structure 1100*f* and the transparent electrode layer 1020 may be directly connected through a first bonding region BR1. The feeding structure 1100*f* and the connector part 313 may be directly connected through a second bonding region BR2. Heat may be applied for bonding in the first and second bonding regions BR1 and BR2. Accordingly, the bonding regions BR1 and BR2 may be referred to as heating sections. An attachment region AR corresponding to a sealant region for attachment of the glass panel 310 to the vehicle frame may be formed on a side end area in the opaque region 312 of the glass panel 310.

Referring to (b) of FIG. 10, the glass panel 310 may include a transparent region 311 and an opaque region 312. The antenna assembly 1000 may include an antenna module 1100 and a feeding structure 1100*f*. The antenna module 1100 may include a protective layer 1031, a transparent electrode layer 1020, a first transparent dielectric substrate 1010*a*, and an adhesive layer 1041. The feeding structure 1100*f* implemented as an opaque region may overlap a partial region of the antenna module 1100 implemented as a transparent substrate. The feeding structure 1100*f* and the transparent electrode layer 1020 of the antenna module 1100 may be connected in a coupling-feeding manner. The feeding structure 1100*f* and the connector part 313 may be directly connected through a bonding region BR. Heat may be applied for bonding in the bonding region BR1. Accordingly, the bonding region BR may be referred to as a heating section. An attachment region AR corresponding to a sealant region for attachment of the glass panel 310 to the vehicle frame may be formed on a side end area in the opaque region 312 of the glass panel 310.

Referring to (a) and (b) of FIG. 10, the transparent substrate 1010*a* may include a (hard) coating layer to protect the transparent electrode layer 1020 from an external environment. Meanwhile, a UV-cut component may be added to the adhesive layer 1041 to suppress yellowing due to sunlight.

Meanwhile, a broadband transparent antenna structure that may be disposed on glass of a vehicle according to the present specification may be implemented as a single dielectric substrate on a same plane as a CPW feeder. In addition, the broadband transparent antenna structure that may be disposed the vehicle glass according to the present specification may be implemented as a structure in which ground is disposed at both sides of a radiator to constitute a broadband structure.

Figure 11:
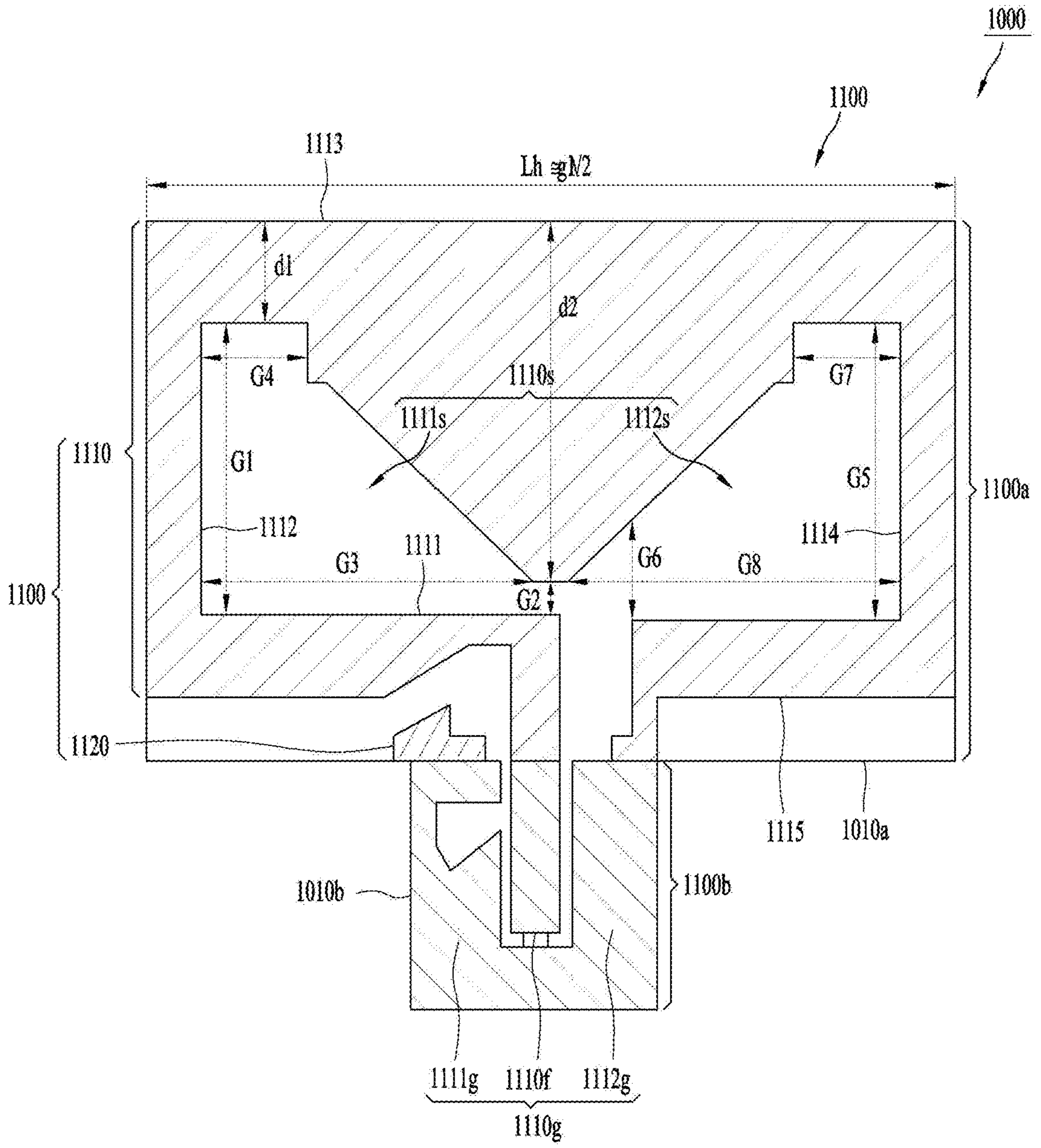
FIG. 11 is a front view illustrating a configuration of an antenna assembly according to the present specification.

Hereinafter, an antenna assembly associated with a structure of the broadband transparent antenna according to the present specification is described. In relation to this, FIG. 11 is a front view illustrating a configuration of an antenna module according to the present specification.

Referring to FIGS. 1 to 11, the vehicle 500 may include the antenna module 1000. The antenna assembly 1000 may be configured to include a dielectric substrate 1010*a*, a first area 1100*a*, and a second area 1100*b*.

The dielectric substrate 1010*a* may be made of a transparent material and referred to as the transparent dielectric substrate 1010*a*. The first area 1100*a* may be configured to include an antenna 1100 on one side surface of the dielectric substrate 1010*a*. The second area 1100*b* may be configured to include a ground conductive pattern 1110*g* and a feed pattern 1110*f*. The antenna 1100 may be configured to include the first conductive pattern 1110 and the second conductive pattern 1120. The antenna 1100 includes a plurality of conductive patterns, and may be referred to as the antenna module 1100.

The antenna assembly 1000 implemented as a transparent antenna may be designed to have a CPW antenna structure having a form of a single layer. The antenna assembly 1000 may include the first conductive pattern 1110 which is a radiator connected to the feed pattern 1110*f* and disposed in the first area 1100*a* which is a transparent region. The antenna assembly 1000 may further include the second conductive pattern 1120 which is a radiator connected to the ground conductive pattern 1110*g*.

The first conductive pattern 1110 may include a closed loop trace to radiate a wireless signal in a particular frequency band. The first conductive pattern 1110 implemented as a closed loop trace may include a plurality of conductive parts. The plurality of conductive parts implemented as the closed loop trace may be configured to include a first part 1111 to a fifth part 1115. The first part 1111 to the fourth part 1114 constitute different sides of a rectangle, and the first part 1111 and the fifth part 1115 may be arranged at both sides with respect to the feed pattern 1110*f*. The fifth part 1115 may be integrated into the first part 1111, and the first part 1111 to the fourth part 1114 may be disposed depending on the application.

A first end of the first part 1111 may be electrically connected to the feed pattern 1110*f*. A second end of the first part 1111 may be electrically connected to a first end of the second part 1112. A second end of the second part 1112 may be electrically connected to a first end of the third part 1113. A second end of the third part 1113 may be electrically connected to a first end of the fourth part 1114. A second end of the fourth part 1114 may be electrically connected to a first end of the fifth part 1115. In this regard, a meaning of "electrically connected" may include direct connection between respective conductive parts or coupling therebetween to be spaced apart from each other by a certain distance.

A second end of the fifth part 1115 may be electrically connected to a first portion 1111*g* of the ground conductive pattern 1110*g*. The second part 1112 and the fourth part 1114 may be arranged on opposite sides of the first conductive pattern 1110. The first part 1111 and the third part 1113 may be arranged on opposite sides of the first conductive pattern 1110. The first part 1111 and the fifth part 1115 may be placed on a same side of as that of the first conductive pattern 1110.

The second conductive pattern 1120 may be electrically connected to a second portion 1112*g* of the ground conductive pattern 1110*g*. The antenna 1100 may be configured to include a slot 1110*s* in the first conductive pattern 1110 as well as the first conductive pattern 1110 and the second conductive pattern 1120. The slot 1110*s* may be disposed inside the first conductive pattern 1110. The slot 1110*s* may be disposed to be surrounded by the first conductive pattern 1110. The slot 1110*s* may be configured to include a first slot area 1111*s* and a second slot area 1112*s*.

The second conductive pattern 1120 may be arranged between the first part 1111 of the first conductive pattern 1110 and the ground conductive pattern 1110*g*. The second conductive pattern 1120 may be arranged between the first part 1111 of the first conductive pattern 1110 and the second portion 1112*g* of the ground conductive pattern 1110*g*.

A first gap G1 and a second gap G2 may be disposed in the first slot area 1111*s*. The first gap G1 in the first slot area 1110*s* may be disposed between a first point on an inner side of the first part 1111 near the first end of the second part 1112 and a first point on an inner side of the third part 1113 near the second end of the second part 1112. The second gap G2 in the first slot area 1110*s* may be disposed between a second point on the inner side of the first part 1111 connected to the feed pattern 1110*f* and a second point on the inner side of the third part 1113 near an intermediate point of the third part 1113. A distance of the second gap G2 may be configured to be shorter than a distance of the first gap G1. Accordingly, since a height of the slot area 1110*s* in the first conductive pattern 1110 may be changed to be optimized at different frequencies, the antenna 1100 may perform broadband operation.

The antenna assembly according to the present specification may perform broadband operation to perform 4G wireless communication and 5G wireless communication in a vehicle. In this regard, FIGS. 12A to 12C are conceptual diagrams illustrating operations in different operation modes in different frequency bands.

Figure 12A:
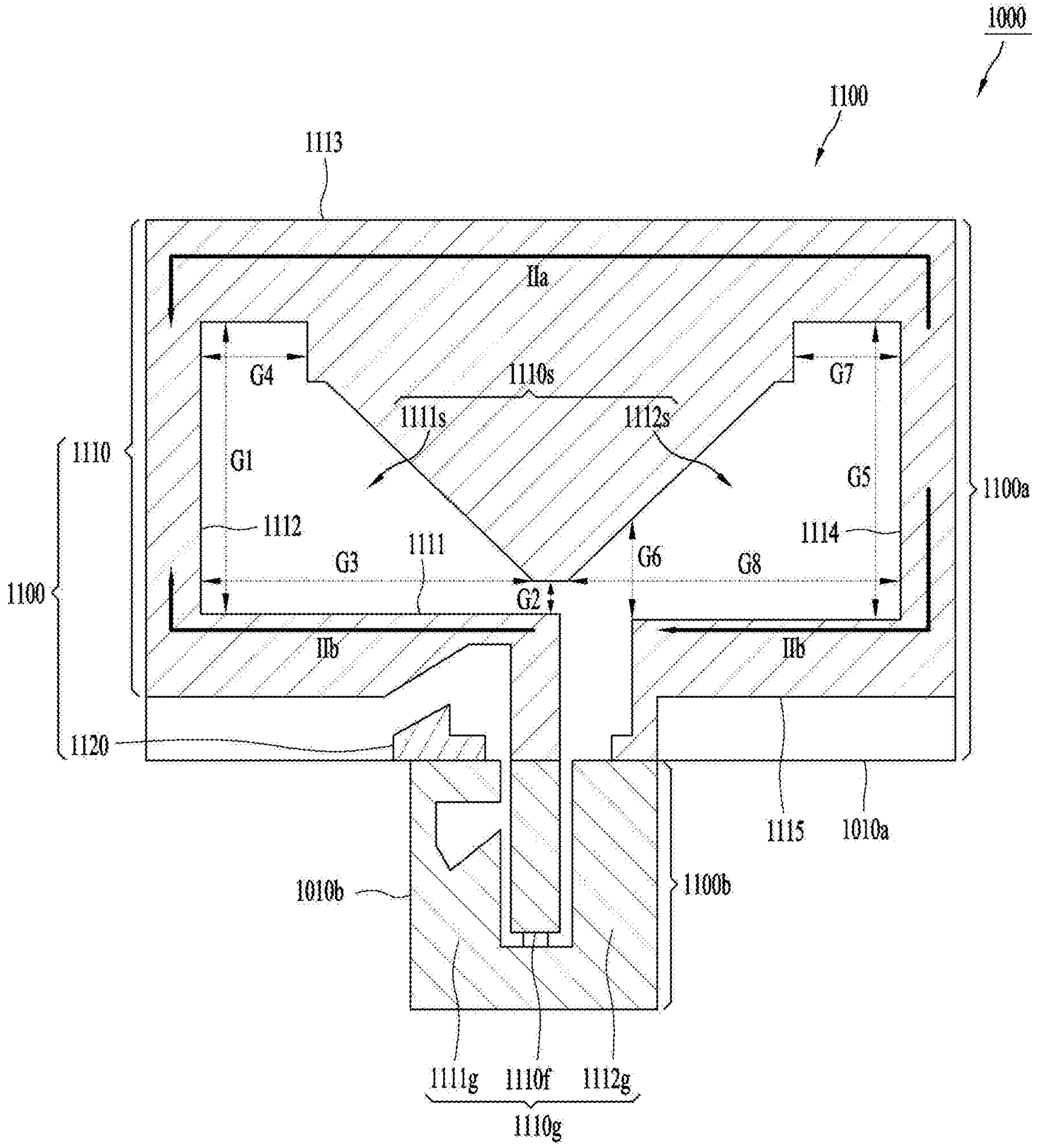
FIGS. 12A to 12C are conceptual diagrams illustrating operations in different operating modes in different frequency bands.

Referring to FIGS. 11 and 12A, the antenna 1100 may be configured to radiate a wireless signal in a first frequency band of 1500 to 2500 MHz. In this regard, the first conductive pattern 1110 may operate in a folded dipole antenna mode in the first frequency band. In detail, current may be supplied along the first part 1111 to the fifth part 1115 of the first conductive pattern 1110 to cause the first conductive pattern 1110 to operate as a radiator in the first frequency band. A first current I1*a* in a first mode may be supplied in one axial direction from the third part 1113 of the first conductive pattern 1110. A second current I1*b* in the first mode may be supplied in a same direction as that of the first current I1*a* in the first part 1113 and the fifth part 1115 of the first conductive pattern 1110.

Figure 12B:
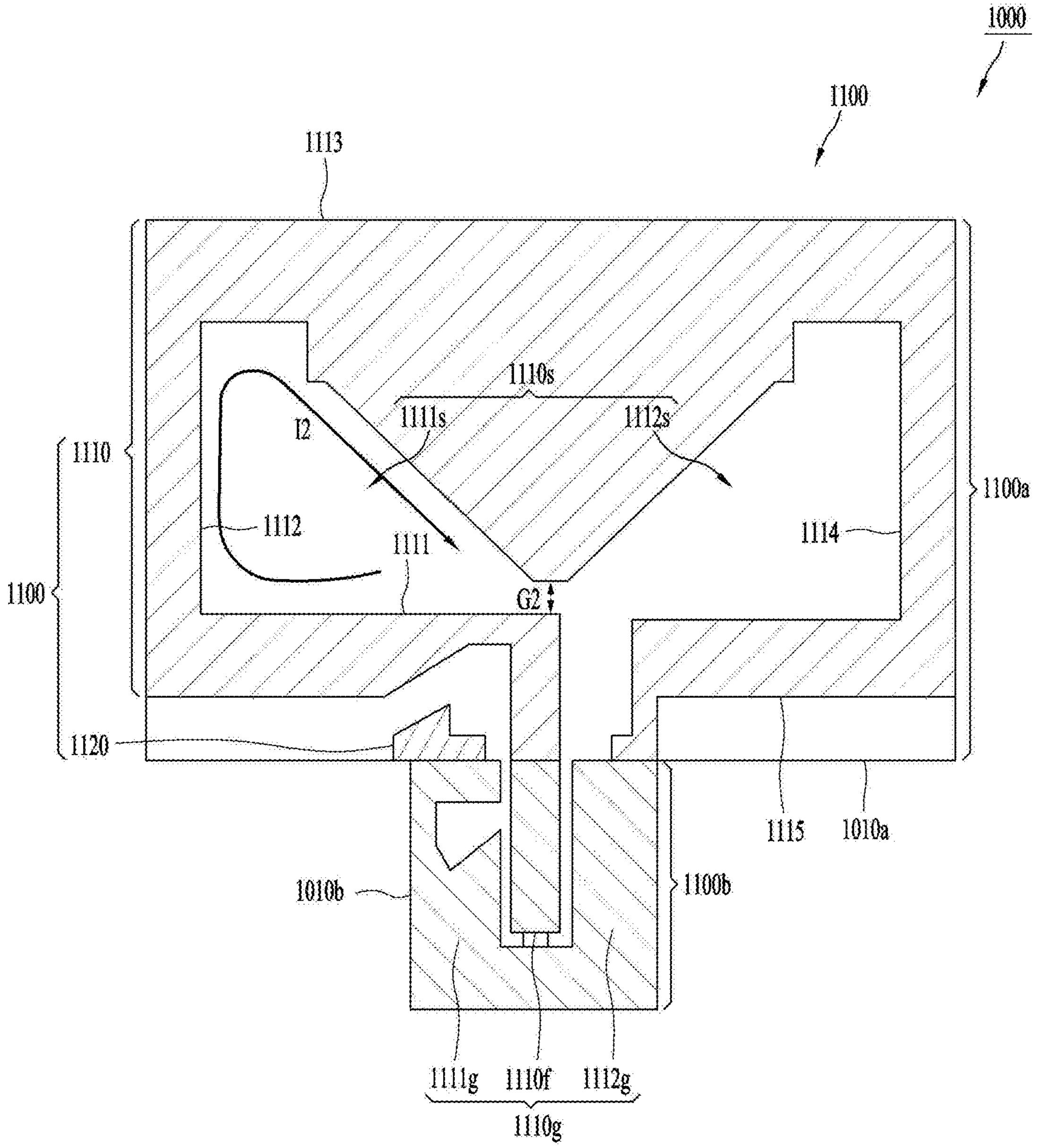

Referring to FIGS. 11 and 12B, the antenna 1100 may be configured to radiate a wireless signal in a second frequency band of 2500 to 5000 MHz. In relation to this, the first slot area 1111*s* of the first conductive pattern 1110 may operate in a slot antenna mode in the second frequency band. A current in a second mode 12 may be supplied along the second slot area 1111*s*. A length of a current path defined along the first slot area 1111*s* is configured to be shorter than a length of a current path defined along the first part 1111 to the fifth part 1115 of the first conductive pattern 1110. Accordingly, the second frequency band which is an operating frequency band by the first slot area 1111*s* may be set to be wider than the first frequency band which is an operating frequency band by the first conductive pattern 1110.

Figure 12C:
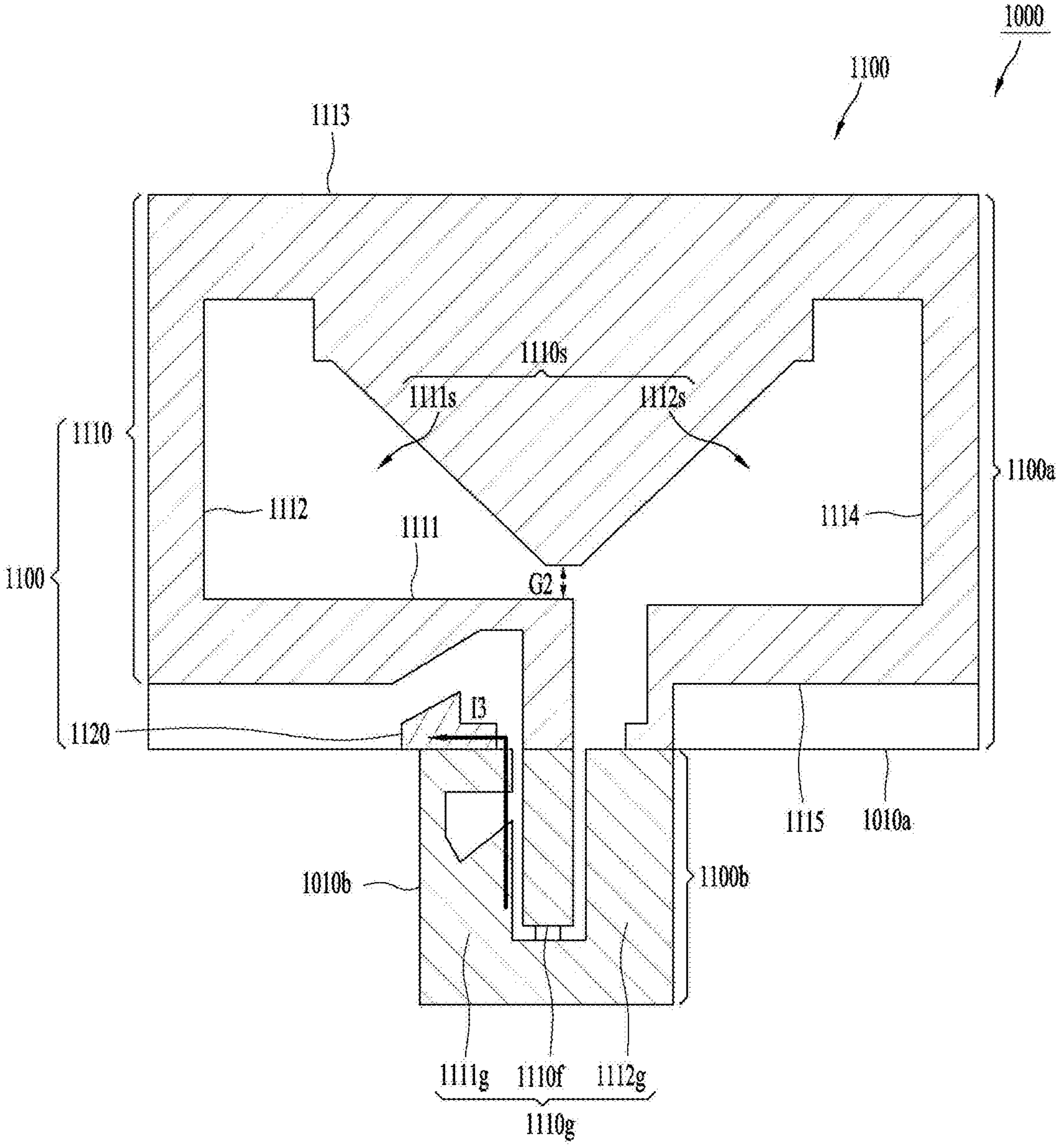

Referring to FIGS. 11 and 12C, the antenna 1100 may be configured to radiate a wireless signal in a third frequency band of 5000 to 6000 MHz. In relation to this, the second conductive pattern 1120 may operate as a radiator in the third frequency band. A current I3 in a third mode may be supplied along the second conductive pattern 1120. In detail, a wireless signal in the third frequency band may be radiated through a second conductive pattern 1120 connected to the ground conductive pattern 1110*g* and a slot of the second area 1100*b* implemented using an FPCB. A length of a current path generated along the second conductive pattern 1120 is configured to be shorter than a length of a current path generated along the first slot area 1111*s*. Accordingly, the third frequency band, which is an operating frequency band by the second conductive pattern 1120, may be set to be wider than the second frequency band, which is an operating frequency band by the first slot area 1111*s*.

Therefore, the antenna assembly according to the present specification utilizes a half-wavelength mode of a basic folded dipole antenna in the first frequency band, which is a low frequency, to design an antenna that satisfies a broad band in a limited space. In this regard, the first frequency band may be set to a band of 1000 to 2000 MHz or a band of 1500 to 2500 MHz. In the second frequency band higher than the first frequency band, a radiation structure in a slot mode having an inverted triangle structure is used. In the third frequency band higher than the second frequency band, a radiation structure may be implemented through the second conductive pattern 1120 corresponding to a ground stub, and an FPCB slot. Accordingly, the antenna assembly according to the present specification may be designed to have a multi-radiation structure satisfying a broad band in a limited space.

A design of each conductive part of the first conductive pattern 1110 in the antenna assembly according to the present specification is described in detail with reference to drawings. Referring to FIGS. 11 to 12C, the third part 1113 of the first conductive pattern 1110 may be configured to have a central portion protruding further than both side portions. One side portion and the central portion of the third part 1113 may be defined as a first point and a second point, respectively. A first pattern thickness d1 of the first point of the third part 1113 is configured to have a thickness smaller than a second pattern thickness d2 of the second point of the third part 1113. Accordingly, a distance of the second gap G2 corresponding to the second point of the third part 1113 may be configured to be shorter than a distance of the first gap G1 corresponding to the first point of the third part 1113.

A value of the distance of the second gap G2 may be set to λgl/20 or less. In this regard, λgl may be set to a guided wavelength corresponding to a lowest frequency of an operating frequency band of the antenna 1100. In this regard, a guided wavelength corresponds to a wavelength of a signal generated and guided in a conductive pattern of the dielectric substrate 1010*a*. λgl refers to a wavelength corresponding to 1500 MHz, which is a lowest frequency of the operating frequency band of the antenna 1100. A horizontal distance value Lh of the third part 1113 may be set to be equal to λgl/2 or within a predetermined range with respect to λgl/2. Accordingly, a length of the first conductive pattern 1110 corresponding to a main radiator may be configured as a half wavelength and operate in a dipole mode in the first frequency band.

The first conductive pattern 1110 may be regarded as a folded dipole pattern having a slot area with an inverted triangle structure therein. The first conductive pattern 1110 is configured to include the first part 1111 which is a connection line connected to the feed pattern 1110*f* to the fifth part 11115 connected to the second portion 1112*g* of the ground conductive pattern 1110*g*. A horizontal length of the first conductive pattern 1110 may be set to approximately a half-wavelength length (≈λgl/2) of a lowest frequency at which an antenna operates.

A shape of the inner side of the third part 1113 within the slot 1110*s* may be configured as isosceles triangle. The shape of the inner side of the third part 1113 within the slot 1110*s* may be configured as an inverted triangle so that a conductive part protrudes inwardly.

The first conductive pattern 1110 configured as the folded dipole pattern is configured so that the third part 1113 in a central region has an inverted triangle structure to have broadband characteristics. A distance between a middle vertex of the third part 1113 and the first part 1111 which is a connection line connected to the feed pattern 1110*f* may be designed to be λgl/20 or less to have a coupling effect.

Distances of gaps between the distance of the second gap G2 and the distance of the first gap G1 may be configured to be changed. The gaps present between the distance of the second gap G2 and the distance of the first gap G1 may be disposed to gradually increase from the distance of the second gap G2 to the distance of the first gap G1. To do so, the shape of the inner side of the third part 1113 within the slot 1110*s* may be configured as an inverted triangle so that a conductive part protrudes inwardly.

A third gap G3 in the first slot area 1110*s* may be disposed between a first point on the inner side of the second part 1112 near the first end of the second part 1112 and a first vertex of an isosceles triangle of the third part 1113 on the inner side of the third part 1113. A fourth gap G4 in the first slot area 1110*s* may be disposed between a second point on an inner side of the second part 1112 near the second end of the second part 1112 and a second vertex of the isosceles triangle of the third part 1113 on the inner side of the third part 1113. A distance of the fourth gap G4 may be configured to be shorter than a distance of the third gap G3.

Distances of gaps between the distance of the fourth gap G4 and the distance of the third gap G3 may be configured to be changed. The gaps present between the distance of the fourth gap G4 and the distance of the third gap G3 may be disposed to gradually increase from the distance of the fourth gap G4 to the distance of the third gap G3. To do so, the shape of the inner side of the third part 1113 within the slot 1110*s* may be configured as an inverted triangle so that a conductive part protrudes inwardly.

A plurality of gaps may also be disposed in the second slot area 1112*s* to have different distances. A fifth gap G5 in the first slot area 1112*s* may be disposed between a first point on an inner side of the fifth part 1115 near the second end of the fourth part 1114 and a third point on the inner side of the third part 1113 near the first end of the fourth part 1114. A sixth gap G6 in the second slot area 1112*s* may be disposed between a second point on the inner side of the fifth part 1115 connected to the first portion of the ground conductive pattern 1110*g* and a fourth point on the inner side of the third part 1113 near an intermediate point of the third part 1113. A distance of the sixth gap G6 may be configured to be shorter than a distance of the fifth gap G5.

Distances of gaps between the distance of the sixth gap G6 and the distance of the fifth gap G6 may be configured to be changed. The gaps present between the distance of the sixth gap G6 and the distance of the fifth gap G6 may be disposed to gradually increase from the distance of the sixth gap G6 to the distance of the fifth gap G6. To do so, the shape of the inner side of the third part 1113 within the slot 1110*s* may be configured as an inverted triangle so that a conductive part protrudes inwardly.

A seventh gap G7 in the second slot area 1112*s* may be disposed between a first point on an inner side of the fourth part 1114 near the second end of the third part 1113 and a third vertex of an isosceles triangle of the third part 1113 on the inner side of the third part 1113. An eighth gap G8 in the second slot area 1112*s* may be disposed between a second point on the inner side of the fourth part 1114 near the second end of the fifth part 1115 and a first vertex of the isosceles triangle of the third part 1113 on the inner side of the third part 1113. A distance of the eighth gap G8 may be configured to be shorter than a distance of the seventh gap G7.

Distances of gaps between the distance of the eighth gap G8 and the distance of the seventh gap G7 may be configured to be changed. The gaps present between the distance of the eighth gap G8 and the seventh gap G7 may be disposed to gradually increase from the distance of the seventh gap G7 to the distance of the eighth gap G8. To do so, the shape of the inner side of the third part 1113 within the slot 1110*s* may be configured as an inverted triangle so that a conductive part protrudes inwardly.

The ground conductive pattern 1110*g* according to the present specification may be connected to a plurality of conductive patterns so that the antenna assembly may operate in various antenna modes for each frequency band. The first conductive pattern 1110 as a main radiator pattern may be connected to the second portion 1112*g* of the ground conductive pattern 1110*g*. The second conductive pattern 1120 corresponding to a high-frequency stub may be connected to the first portion 1111*g* of the ground conductive pattern 1110*g*. An open slot may be disposed in the second dielectric substrate 1010*b* which is a region below the second conductive pattern 1120 to improve impedance matching characteristics.

Figure 13A:
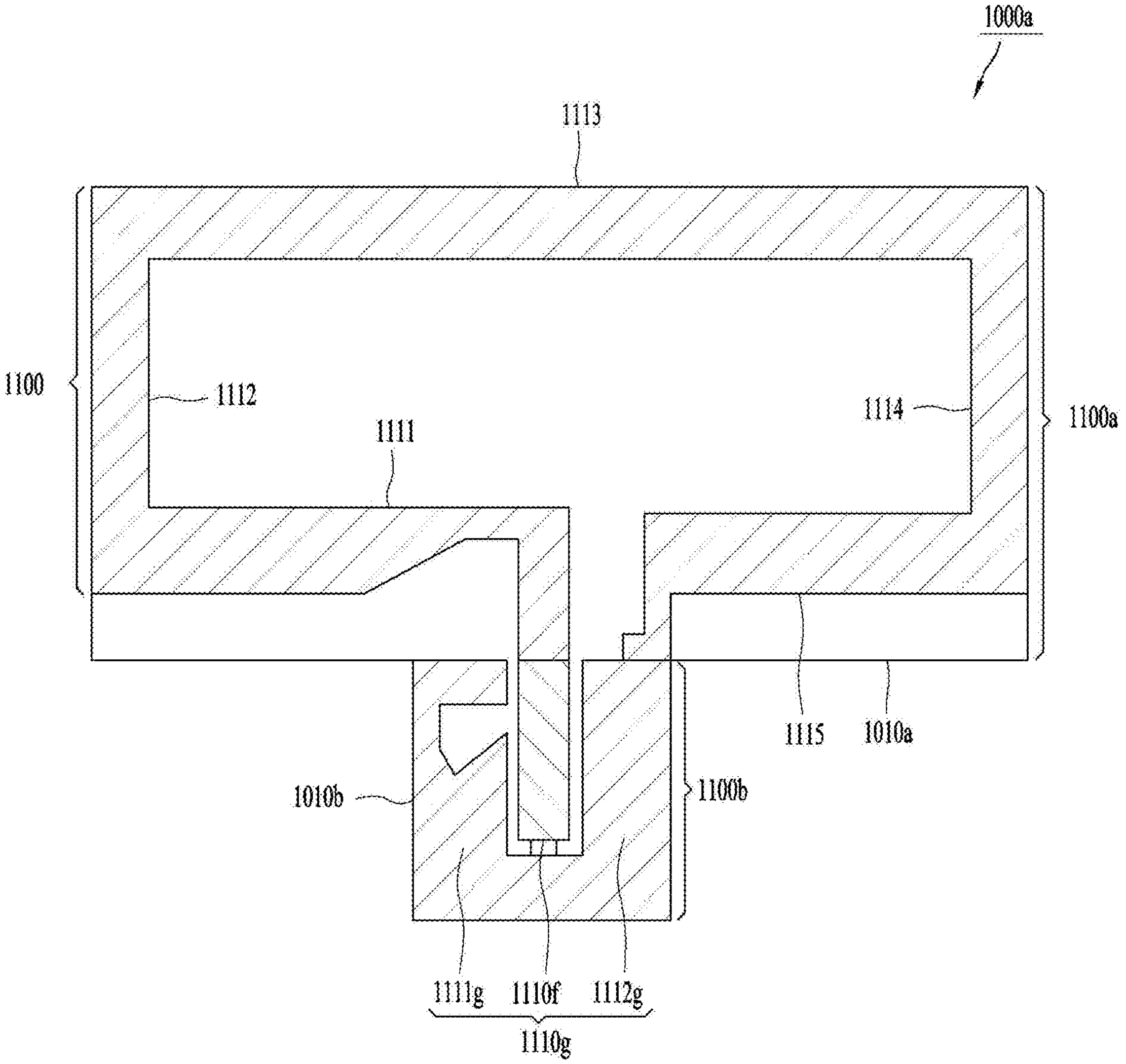
FIG. 13A illustrates an antenna assembly having a coplanar waveguide (CPW) folded dipole structure according to other embodiments.
Figure 13B:
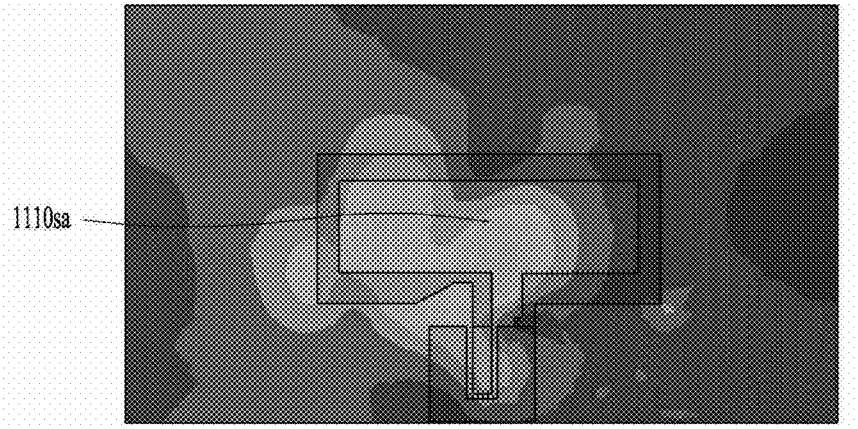
FIG. 13B shows a comparison between electric field distributions of the antenna assemblies of FIGS. 11 and 13A.
Figure 13B:
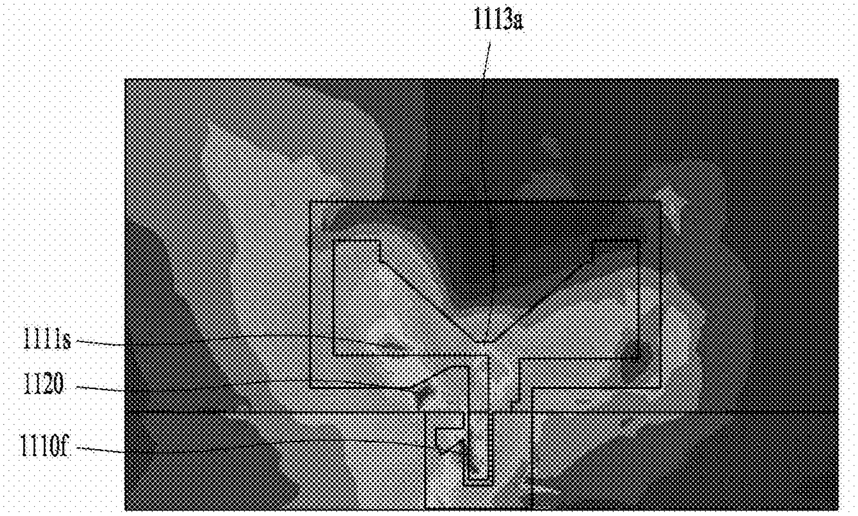
Figure 13C:
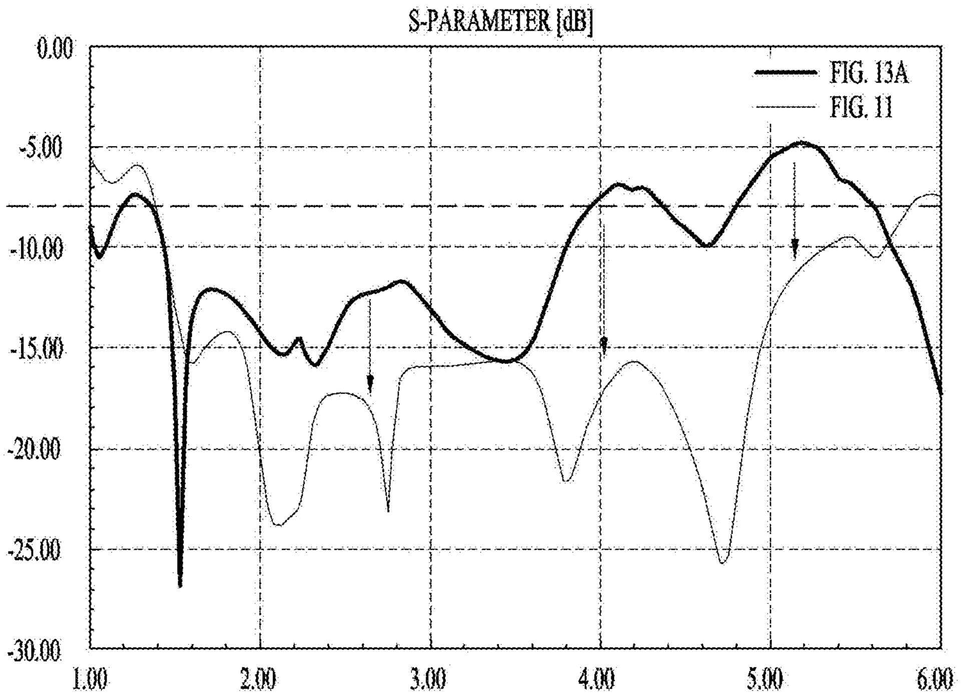
FIG. 13C shows a comparison between reflection coefficients of the antenna assemblies of FIGS. 11 and 13A.

Meanwhile, the antenna assembly according to the present specification may be configured to have a CPW antenna structure implemented on a single layer. In this regard, FIG. 13A illustrates an antenna assembly having a CPW folded dipole structure according to other embodiments. FIG. 13B shows a comparison between electric field distributions of the antenna assemblies of FIGS. 11 and 13A. FIG. 13C shows a comparison between reflection coefficients of the antenna assemblies of FIGS. 11 and 13A.

Referring to FIG. 13A, an antenna assembly 1000*a* having a CPW folded dipole structure is configured to include a first conductive pattern 1110*a*. The antenna assembly 1000*a* may further include the second conductive pattern 1120 of FIG. 11 to operate as a radiator in the third frequency band.

The first conductive pattern 1110*a* of the antenna assembly 1000*a* may be configured to include a plurality of conductive parts. The first conductive pattern 1110*a* of the antenna assembly 1000*a* may be configured to include a first part 1111*a* to a fifth conductive part 1115*a*. A first end of the first part 1111*a* may be electrically connected to the feed pattern 1110*f*. A second end of the first part 1111*a* may be electrically connected to a first end of the second part 1112*a*. A second end of the second part 1112*a* may be electrically connected to a first end of the third part 1113*a*. A second end of the third part 1113*a* may be electrically connected to a first end of the fourth part 1114*a*. A second end of the fourth part 1114*a* may be electrically connected to a first end of the fifth part 1115*a*. In this regard, a meaning of "electrically connected" may include direct connection between respective conductive parts or coupling therebetween to be spaced apart from each other by a constant distance.

A second end of the fifth part 1115*a* may be electrically connected to the first portion 1111*g* of the ground conductive pattern 1110*g*. The second part 1112*a* and the fourth part 1114*a* may be arranged on opposite sides of the first conductive pattern 1110*a*. The first part 1111*a* and the third part 1113*a* may be arranged on opposite sides of the first conductive pattern 1110. The first part 1111*a* and the fifth part 1115 may be placed on a same side of as that of the first conductive pattern 1110*a*.

Referring to (a) of FIG. 13B, an electric field distribution on the antenna assembly 1000*a* having the CPW folded dipole structure of FIG. 13A at 4 GHz is shown. Referring to FIG. 13A and (a) of FIG. 13B, an electric field distribution on the conductive parts 1111*a* to 1111*d* of the first conductive pattern 1110*a* and a slot 1110*sa* disposed therein is shown as being higher than an electric field distribution on an outside region.

Referring to (b) of FIG. 13B, an electric field distribution on the antenna assembly 1000 of FIG. 11 at 4 GHz is shown. Referring to FIG. 11 and (b) of FIG. 13B, an electric field distribution on the conductive parts 1111*a* to 1111*d* of the first conductive pattern 1110 and a slot area SRb disposed therein is shown as being higher than an electric field distribution on an outside region. Particularly, an electric field distribution is shown as being high on the slot 1111*s* having an inverted triangle shape, the second conductive pattern 1120, and a region in which the feed pattern 1110*f* is disposed at a vertex of the third part 1113 having an inverted triangle shape in the first conductive pattern 1110. Accordingly, a radiation mode may be further generated at 2.5 GHz or higher through the inverted triangle shape of the slot 1110*s* of FIG. 11 and the coupling with the feed pattern 1110*f* at the vertex.

Referring to FIGS. 11, 13A, and 13C, it may be understood that the antenna assembly 1000*a* having the CPW folded dipole structure has reflection coefficient characteristics degraded in a frequency band of 2 GHz or higher or 2.5 GHz or higher compared to those of the antenna assembly 1000. Particularly, it may be understood that the antenna assembly 1000*a* having the CPW folded dipole structure has a reflection coefficient value of −8 dB or higher in a frequency band of 4 GHz or higher, and thus, has degraded impedance matching characteristics. On the other hand, the antenna assembly 1000 having a slot structure with an inverted triangle shape may generate an additional radiation mode in a frequency band of 2 GHz or higher through the inverted triangle structure and coupling with a feed pattern at a vertex. Accordingly, the antenna assembly 1000 having a slot structure with a shape of an inverted triangle may be designed to have a broadband antenna structure with improved impedance matching characteristics in a frequency band of 2 GHz or higher.

The antenna 1100 of the antenna assembly 1000 of FIGS. 11 and 13A according to the present specification may be configured to further include an additional conductive pattern in addition to the first conductive pattern 1110 and the second conductive pattern 1120. In relation to this, FIGS. 14A and 14B illustrate front views of a structure of an antenna assembly according to an embodiment of the present specification.

Figure 14A:
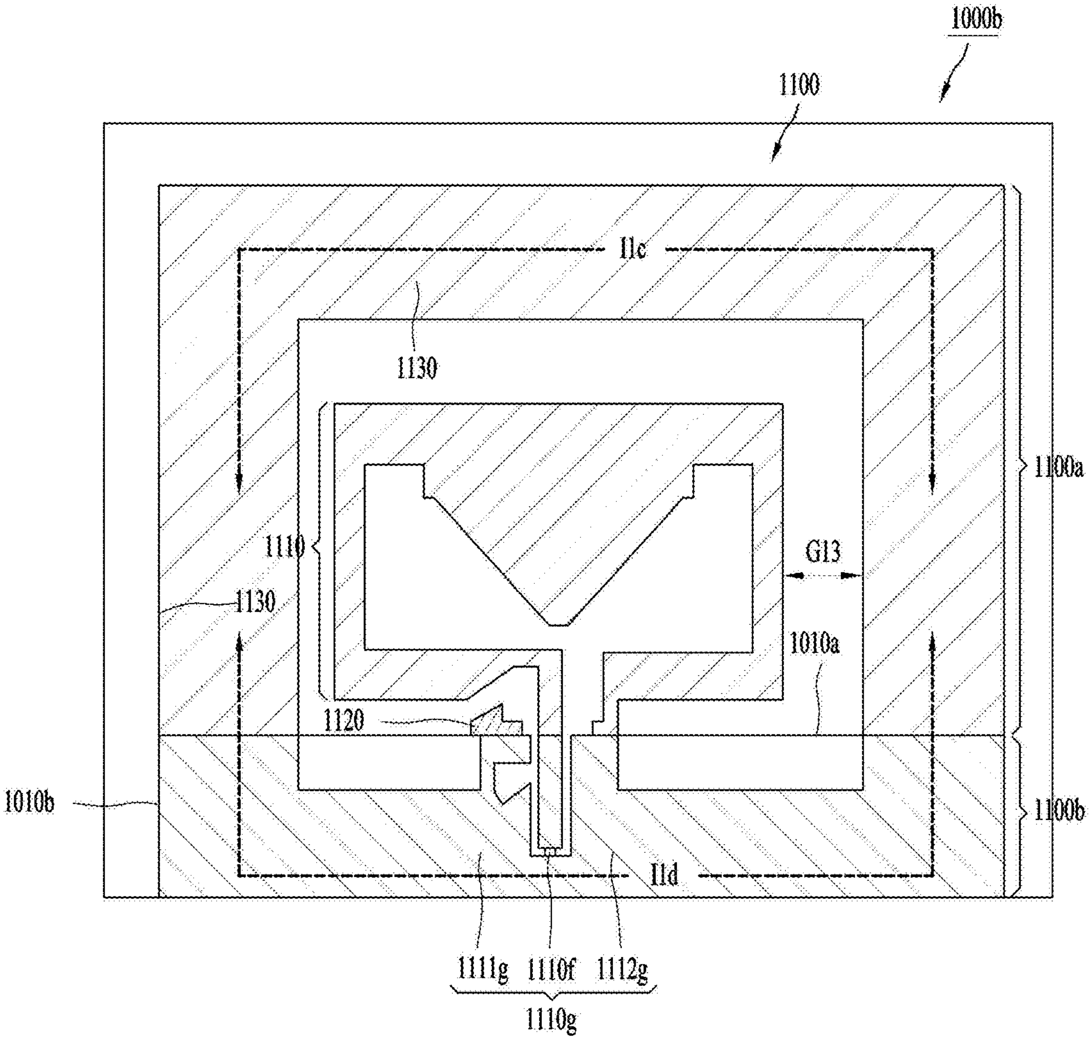
FIGS. 14A and 14B are front views of a structure of an antenna assembly according to an embodiment of the present specification.

Referring to FIG. 14A, the antenna assembly 1000 may include the first area 1100*a* configured as a radiator region and the second area 1100*b* configured as a feed region and a ground region. The first area 1100*a* may be implemented as the transparent dielectric substrate 1010*a*. The second area 1100*b* may be implemented as the second dielectric substrate 1010*b* which is an opaque substrate.

Figure 14B:
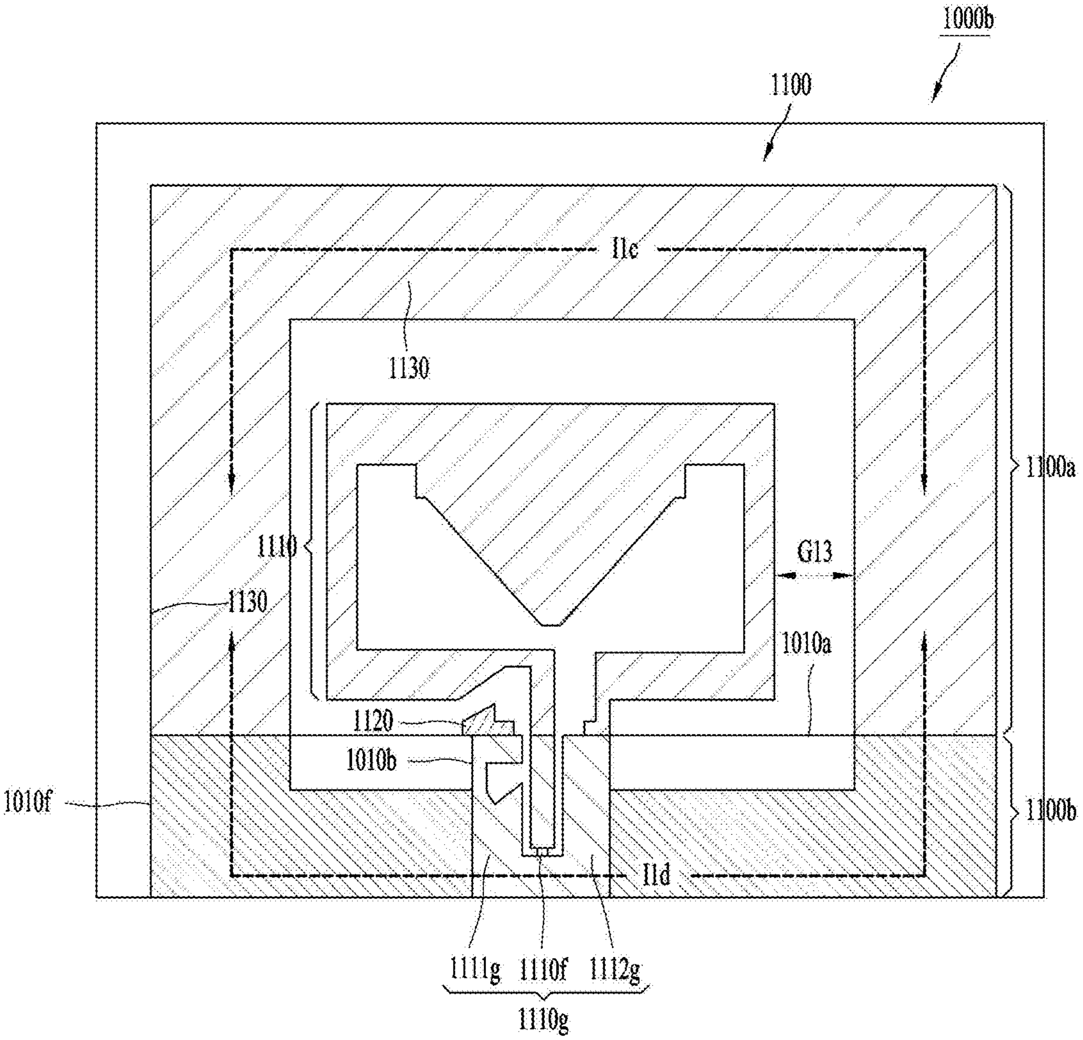

Referring to FIG. 14B, the antenna assembly 1000 may include the first area 1100*a* configured as a radiator region and the second area 1100*b* configured as a feed region and a ground region. The first area 1100*a* may be implemented as the transparent dielectric substrate 1010*a*. The second area 1100*b* may be implemented as the second dielectric substrate 1010*b* which is an opaque substrate, and an FPCB 1010*f*. The FPCB 1010*f* may be disposed on one side and another side of the second dielectric substrate 1010*b*. The second dielectric substrate 1010*b* may be arranged on one surface of the FPCB 1010*f* so that the feed pattern 1100*f* of the second dielectric substrate 1010*b* may be connected to the first conductive pattern 1110 of the antenna module 1100. The ground conductive pattern 1100*g* of the second dielectric substrate 1010*b* may be connected to the first and second conductive patterns 1110 and 1120.

Referring to FIGS. 14A and 14B, the antenna assembly 1000 may be configured to include the first conductive pattern 1110, the second conductive pattern 1120, and the third conductive pattern 1130. The third conductive pattern 1130 may be configured to surround the first conductive pattern 1110 and the second conductive pattern 1120.

The third conductive pattern 1130 having a ground ring structure proposed in the present specification may include the first area 1100*a* and the second area 1100*b*. The first area 1100*a* may horizontally extend from the second dielectric substrate 1010*b* which is an FPCB area to be configured as ground. The second area 1100*b* may be configured as a transparent metal mesh region surrounding a radiator in a transparent antenna region. The first area 1100*a* and the second area 1100*b* may be electrically connected each other through a bonding portion, i.e., an area in which the first area 1100*a* and the second area 1100*b* are combined with each other.

The third conductive pattern 1130 having the ground ring structure may be disposed to surround the first conductive pattern 1110, which is a radiator, to be spaced apart therefrom by a distance greater than λgh/4 of a wavelength corresponding to a highest frequency at which an antenna operates. A pattern width of the third conductive pattern 1130 is designed to be smaller than λgh/2, but this may be adjusted depending on antenna performance.

Referring to FIGS. 11, 14A, and 14B, a third current I1*c* supplied in the third conductive pattern 1130 may be supplied in parallel with the first current I1*a* in a first mode flowing through the first conductive pattern 1110. The third current I1*c* supplied in one side of the third conductive pattern 1130 may be supplied in a same direction as that of the first current I1*a* in the first mode supplied in one side of the first conductive pattern 1110. In addition, a third current I1*c* supplied in another side of the third conductive pattern 1130 may be supplied in a direction opposite to that of the first current I1*a* in the first mode flowing through another side of the first conductive pattern 1110.

A fourth current I1*d* supplied in the second area 1100*b* may be supplied in parallel with the second current I1*b* in the first mode flowing through the first conductive pattern 1110. In addition, the fourth current I1*d* supplied in one side of the second area 1100*b* may be supplied in a same direction as that of the second current I1*b* in the first mode flowing in one side of the first conductive pattern 1110. In addition, the fourth current I1*d* supplied in another side of the second area 1100*b* may be supplied in a direction opposite to that of the second current I1*b* in the first mode supplied in another side of the first conductive pattern 1110.

Referring to FIGS. 14A and 14B, a first end of the third conductive pattern 1120 may be electrically connected to a third point of the ground conductive pattern 1110*g*. A second end of the third conductive pattern 1120 may be electrically connected to a fourth point of the ground conductive pattern 1110*g*. The first conductive pattern 1110 may be disposed to be surrounded by the third conductive pattern 1130.

In relation to this, the third conductive pattern 1130 may be electrically connected to the ground conductive pattern 1110*g*. The third conductive pattern 1130 may be electrically connected to an FPCB including the ground conductive pattern 1110*g*. Therefore, a structure of the antenna assembly of FIGS. 14A and 14B may be referred to as a ground ring conductive pattern.

In this regard, the third conductive pattern 1130 may be disposed to surround the first conductive pattern 1110 to be apart from the first conductive pattern 1110 by a certain distance or more in consideration of an operating frequency of an antenna. A gap G13 between the first conductive pattern 1110 and the third conductive pattern 1130 may be set to λgh/4 or more. In this regard, λgh corresponds to a guided wavelength corresponding to a highest frequency of an operating frequency band of the antenna.

Dimensions of the third conductive pattern 1130 may also be set in consideration of an operating frequency of the antenna. A thickness of the third conductive pattern 1130, i.e., a width in one axial direction may be set to λgh/4 or more. When the third conductive pattern 1130 is implemented as a ground ring, a surrounding ground path is defined. A field dispersion phenomenon is reduced due to the surrounding ground path, and an effect of converging a radiation pattern of the antenna may be obtained. The third conductive pattern 1130 having the ground ring structure is disposed to completely surround the first and second conductive patterns 1110 and 1120 which are radiators. Accordingly, when an antenna assembly having the first to third conductive patterns 1110 to 1130 is attached to a glass panel of a vehicle having an inclination angle, radiation performance at low elevation may be improved. As the radiation performance at low elevation is improved, antenna transmission and reception performance from the vehicle toward a direction of a ground surface may be improved.

Meanwhile, conductive patterns in the antenna assembly 1000 according to the present specification may be implemented to have a metal mesh shape of FIG. 7B. In this regard, referring to FIGS. 7B and 11A, the first conductive pattern 1110 and the third conductive pattern 1120 may be disposed on the transparent dielectric substrate 1010*a* to have a metal mesh shape 1020*a* including a plurality of opening areas. The first conductive pattern 1110 and the second conductive pattern 1120 may be configured to have a CPW structure which is a single layer structure on the transparent dielectric substrate 1010*a*.

The antenna assembly 1000 may include the plurality of dummy mesh grid patterns 1020*b* in an outer portion of the conductive patterns 1110 and 1120 on the transparent dielectric substrate 1010*a*. The dummy metal grid patterns 1020*b* may be disposed not to be connected to the feed pattern 110*f* and the ground conductive pattern 1110*g*. The plurality of dummy mesh grid patterns 1020*b* may be disposed to be separate from each other.

Referring to FIGS. 7B and 14, the first conductive pattern 1110, the second conductive pattern 1120, and the third conductive pattern 1130 may be configured to have a metal mesh shape 1020*a* having a plurality of opening areas on the transparent dielectric substrate 1010*a*. The first conductive pattern 1110, the second conductive pattern 1120, and the third conductive pattern 1130 may be configured as a CPW structure which is a single layer structure on the transparent dielectric substrate 1010*a*.

The antenna assembly 1000 may include a plurality of dummy mesh grid patterns 1020*b* in an outer portion of the conductive patterns 1110, 1120 and 1130 on the transparent dielectric substrate 1010*a*. The plurality of dummy metal grid patterns 1020*b* may be disposed not to be connected to the feed pattern 110*f* and the ground conductive pattern 1110*g*. The plurality of dummy mesh grid patterns 1020*b* may be disposed to be separate from each other.

Figure 15A:
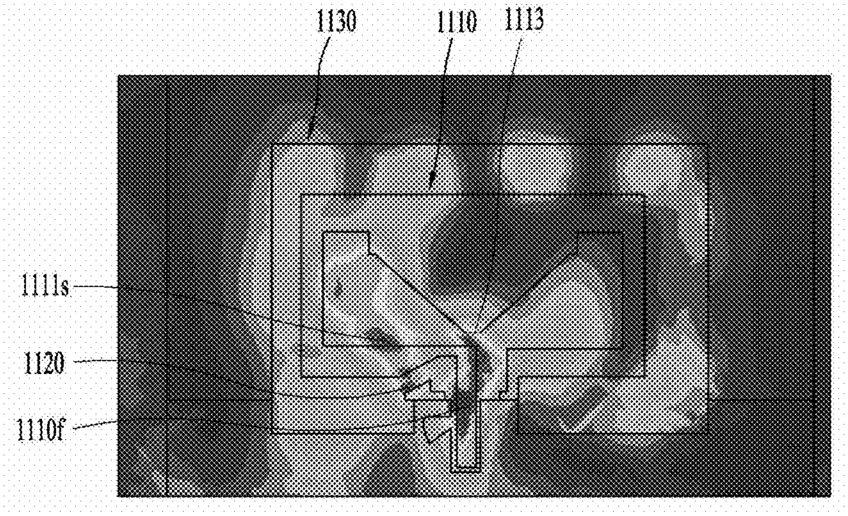
FIG. 15A shows an electric field distribution generated on the antenna assembly of FIG. 14A.
Figure 15B:
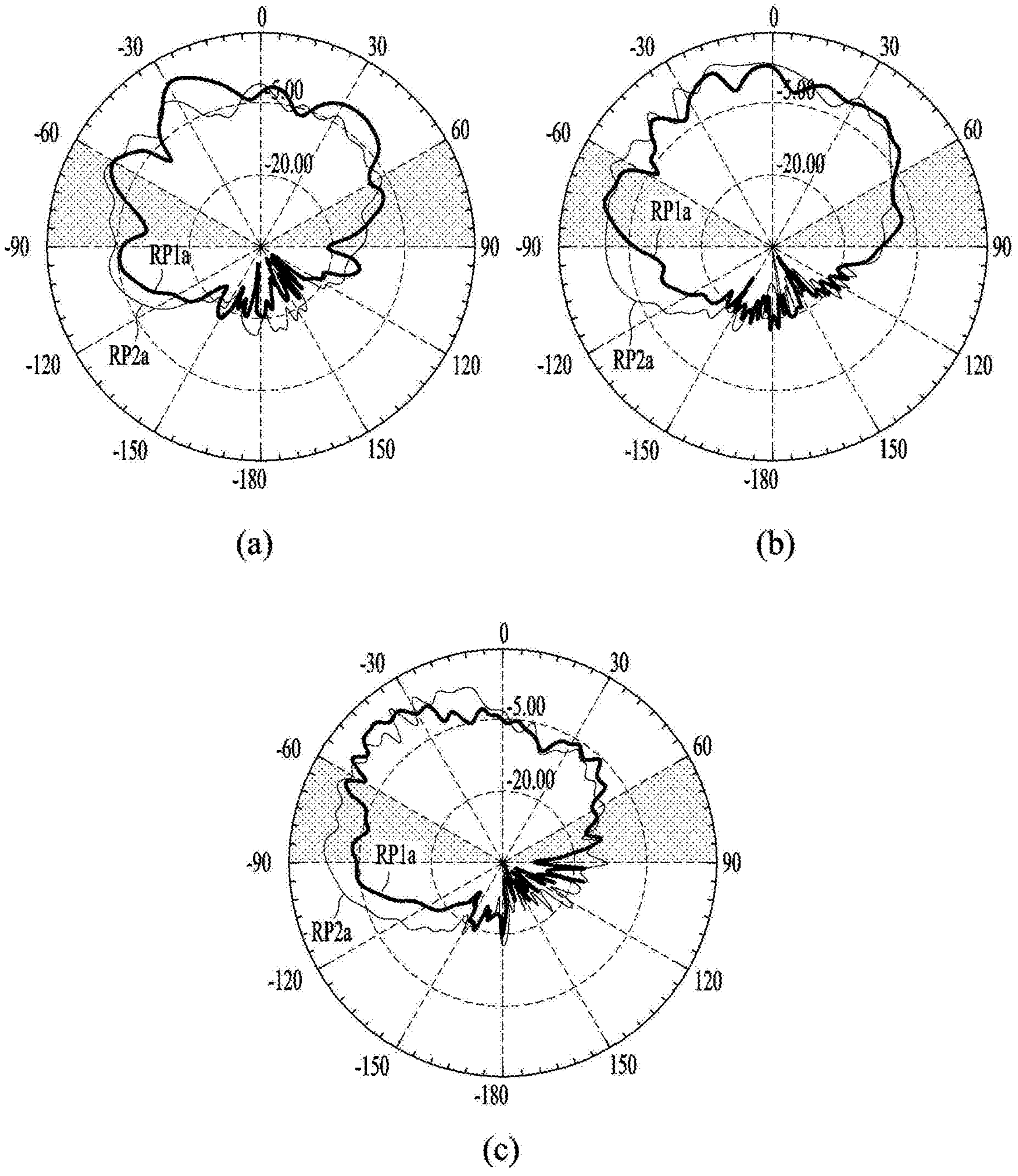
FIG. 15B shows a comparison between radiation patterns of the antenna assemblies of FIGS. 11 and 14A according to frequency bands.
Figure 16A:
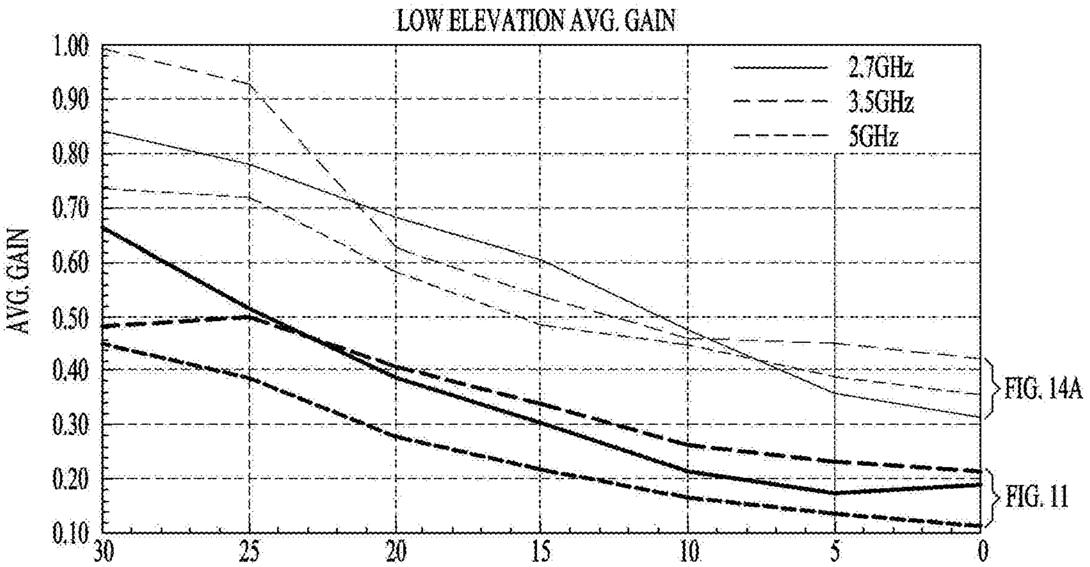
FIG. 16A shows antenna average gains for each frequency according to each angle in a low elevation region with respect to the antenna assemblies of FIGS. 11 and 14A
Figure 16B:
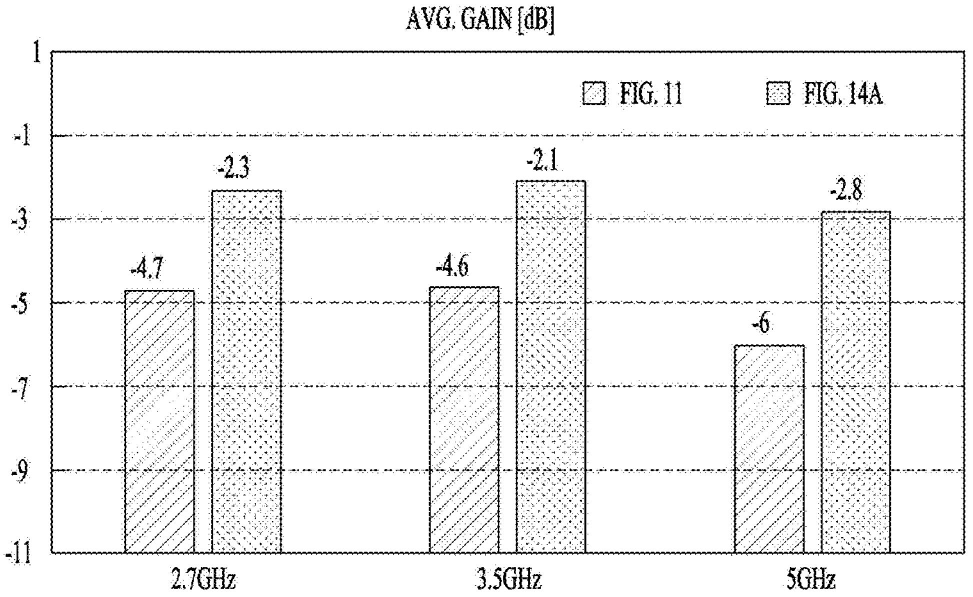
FIG. 16B is a bar graph showing average antenna gains for each frequency with respect to the antenna assemblies of FIGS. 11 and 14A.

As described above, the antenna assembly defines a surrounding ground path by the third conductive pattern 1130 configured as a ground ring structure. A field dispersion phenomenon is reduced due to the surrounding ground path, and an effect of converging a radiation pattern of an antenna may be obtained. In relation to this, FIG. 15A shows an electric field distribution generated on the antenna assembly of FIG. 14A. FIG. 15B a shows comparison between radiation patterns by the antenna assemblies of FIGS. 11 and 14A according to frequency bands. FIG. 16A shows antenna average gains for each frequency according to each angle in a low elevation region with respect to the antenna assemblies of FIGS. 11 and 14A. FIG. 16B is a bar graph showing average antenna gains for each frequency with respect to the antenna assemblies of FIGS. 11 and 14A.

Referring to FIGS. 11 and 13B, an electric field distribution on the first conductive pattern 1110, the slot 1111*s* disposed therein, and the second conductive pattern 1120 is generated to be higher than that in other areas. Referring to FIGS. 14A, 14B and 15A, an antenna assembly further including the third conductive pattern 1130 has a higher electric field distribution on the first conductive pattern 1110, the slot 1111*s* disposed therein, and the second conductive pattern 1120 than an electric field distribution on other regions.

Meanwhile, an electric field distribution on the third conductive pattern 1130 is generated at a level similar to that of an electric field distribution on the first conductive pattern 1110. Referring to FIGS. 12A, 14A, and 14B, the first and second current I1*a* and I1*b* supplied in the third conductive pattern 1110 may be supplied in parallel with the third and fourth currents I1*c* and I1*d* supplied in the third conductive pattern 1130. Additionally, a difference between the first and second currents I1*a* and I1*b* supplied in the first conductive pattern 1110 and the third and fourth currents I1*c* and I1*d* supplied in the third conductive pattern 1130 may be configured to be less than a critical value.

Accordingly, the electric field distribution on the third conductive pattern 1130 is generated at a level similar to that on the first conductive pattern 1110. Therefore, a field dispersion phenomenon may be reduced by the third conductive pattern 1130 defining the surrounding ground path and having an electric field distribution at a similar level to that of the first conductive pattern 1110. An effect of reducing a field dispersion phenomenon and converging a radiation pattern of an antenna may be obtained by the third conductive pattern 1130.

Referring to FIG. 11 and (a) of FIG. 15B, a first radiation pattern RP1*a* of an antenna assembly having the first and second conductive patterns 1110 and 1120 and a second radiation pattern RP2*a* of an antenna assembly having the first to third conductive patterns 1110 to 1130 at 2.7 GHz are shown. A level of the second radiation pattern RP2*a* having a ground ring structure is configured to be higher in a low elevation region of about 30 degrees or less than that of the first radiation pattern RP1*a*.

Referring to FIG. 11 and (b) of FIG. 15B, a first radiation pattern RP1*b* of an antenna assembly having the first and second conductive patterns 1110 and 1120 and a second radiation pattern RP2*b* of an antenna assembly having the first to third conductive patterns 1110 to 1130 at 3.5 GHz are shown. A level of the second radiation pattern RP2*b* having the ground ring structure is configured to be higher than that of the first radiation pattern RP1*b* in a low elevation region of about 30 degrees or less.

Referring to FIG. 11 and (c) of FIG. 15B, a first radiation pattern RP1*c* of an antenna assembly having the first and second conductive patterns 1110 and 1120 and a second radiation pattern RP2*c* of an antenna assembly having the first to third conductive patterns 1110 to 1130 at 5 GHz are shown. A level of the second radiation pattern RP2*c* having the ground ring structure is configured to be higher than that of the first radiation pattern RP1*c* in a low elevation region of about 30 degrees or less.

Referring to FIGS. 11, 14A, 16A, and 16B, (i) the antenna assembly 1000 with a first structure having the first and second conductive patterns has an average antenna gain of −4.7 dB in a low elevation region of 0 to 30 degrees with respect to 2.7 GHZ. On the other hand, it may be understood that (ii) an antenna assembly 1000*b* with a second structure having a ground ring structure including the first to third conductive patterns has an antenna average gain of about −2.3 dB, showing an improvement by about 2.4 dB.

Referring to FIGS. 11, 14A, 16A, and 16B, (i) the antenna assembly 1000 with the first structure having the first and second conductive patterns has an average antenna gain of −4.6 dB in a low elevation region of 0 to 30 degrees with respect to 3.7 GHZ. On the other hand, it may be understood that (ii) the antenna assembly 1000*b* with the second structure having the ground ring structure including the first to third conductive patterns has an antenna average gain of about −2.1 dB, showing an improvement by about 2.5 dB.

Referring to FIGS. 11, 14A, 16A, and 16B, (i) the first structure having the first and second conductive patterns has an average antenna gain of −6.0 dB in a low elevation region of 0 to 30 degrees with respect to 5 GHz. On the other hand, it may be understood that (ii) the second structure having the ground ring structure including the first to third conductive patterns has an antenna average gain of about −2.8 dB, showing an improvement by about 3.2 dB. Accordingly, the third conductive pattern 1130 having a ground ring structure surrounding the first conductive pattern 1110 is implemented, thereby improving an antenna gain in a low elevation region in a high band by about 2 dB or more.

Referring to FIGS. 11, 14A, 16A, and 16B, when an operating frequency increases, an effect of antenna gain improvement by the third conductive pattern 1130 also is increased. When a frequency band is increased, a distance from an electric field peak area by the first and second conductive patterns 1110 and 1120 to an end of the third conductive pattern 1130 is increased in units of wavelengths. Accordingly, an electric field leakage effect by the first and second conductive patterns 1110 and 1120 may be further reduced in a high frequency band. As the third conductive pattern 1130 is disposed, gain flatness characteristic may be improved in a frequency band of 2.7 GHz to 5 GHz. In this regard, an antenna gain of the first structure having the first and second conductive patterns 1110 and 1120 is −6.0 dB to −4.7 dB, and a gain difference is approximately 1.3 dB. On the other hand, an antenna gain of the second structure having the first to third conductive patterns 1110 to 1130 is −2.8 dB to −2.3 dB and a gain difference is about 0.5 dB, showing a great improvement in gain flatness.

Figure 17A:
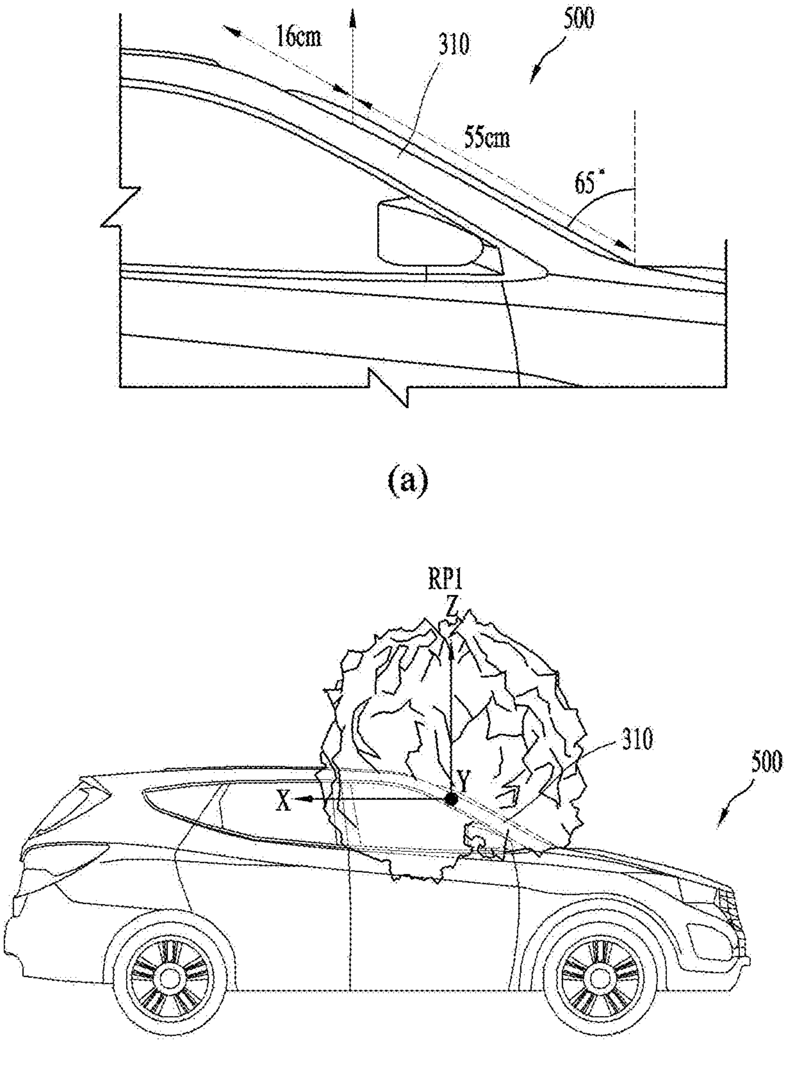
FIGS. 17A to 17C illustrate radiation patterns according to inclination angles of front glass, quarter glass, and rear glass of a vehicle and placement of the antenna assembly.
Figure 17B:
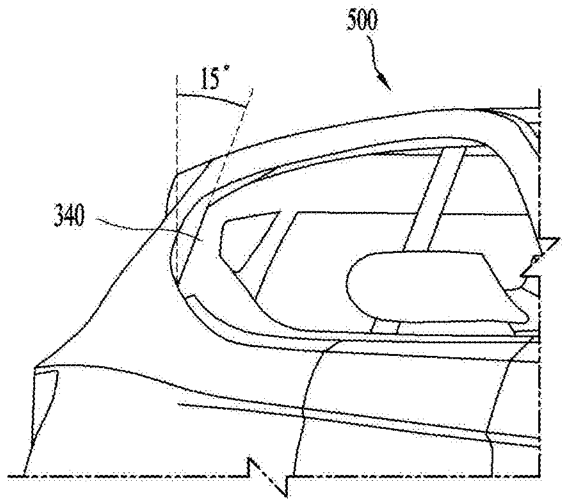
Figure 17B:
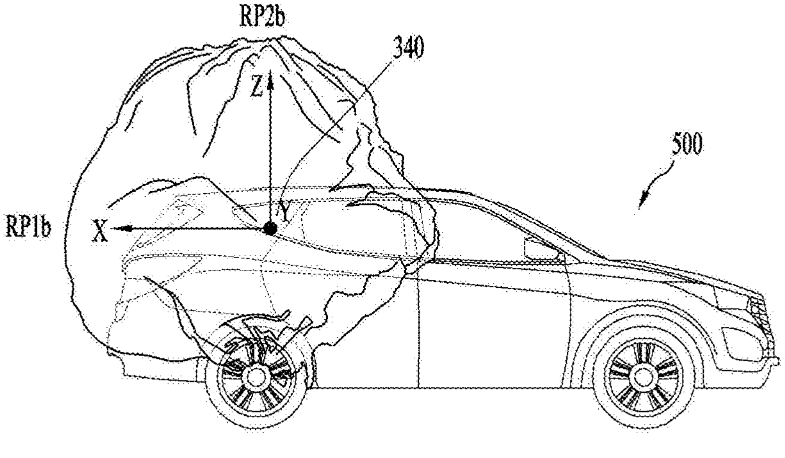
Figure 17C:
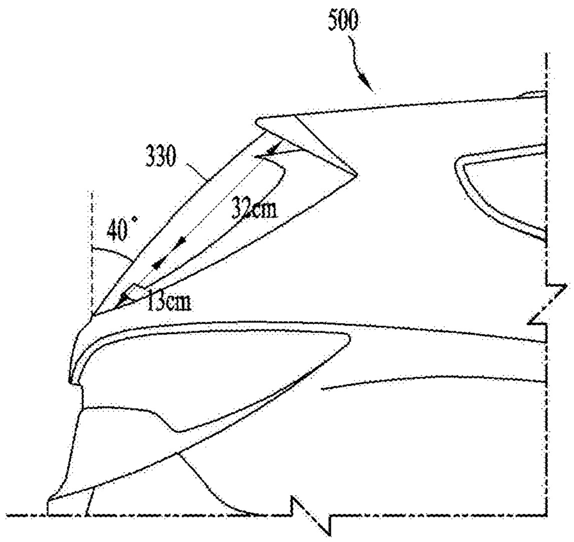
Figure 17C:
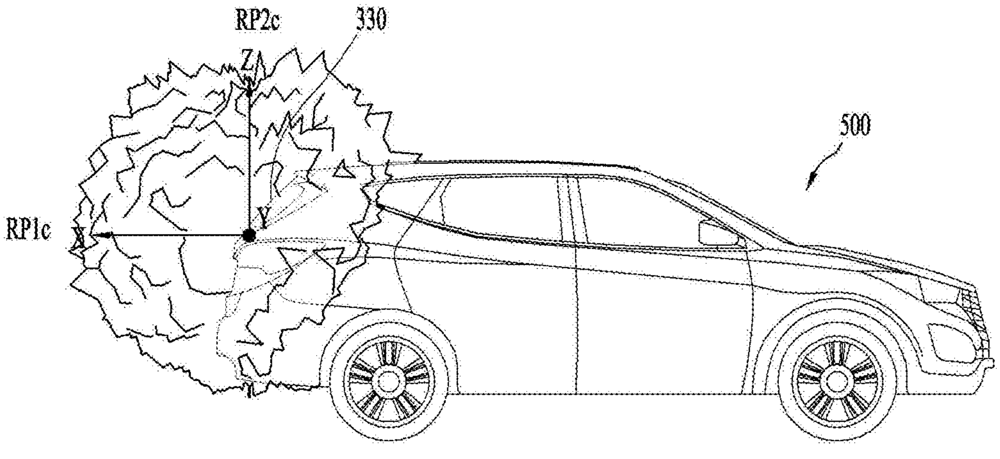

An antenna assembly according to the present specification may be placed in one or more areas among the front glass 310, the door glass 320, the rear glass 330, the quarter glass 340, and the upper glass 350 of a vehicle, as shown in FIG. 1. In this regard, FIGS. 17A to 17C illustrate radiation patterns according to inclination angles of front glass, quarter glass, and rear glass of a vehicle and placement of the antenna assembly. The antenna assembly 1000 including the first conductive pattern 1110 and the second conductive pattern 1120 as shown in FIG. 11 may be placed on the front glass 310, the quarter glass 340, and the rear glass 330.

Referring to FIG. 1 and (a) of FIG. 17A, the front glass 310 of the vehicle 500 may be disposed to be inclined at a first angle or more with respect to a vertical direction. For example, the front glass 310 may be disposed to be inclined at about 65 degrees with respect to a vertical direction. Referring to FIG. 1 and (b) of FIG. 17A, when the antenna assembly is placed on the front glass 310 of the vehicle 500, a peak area RP1 of a radiation pattern may be defined in a vertical direction.

Referring to FIG. 1 and (a) of FIG. 17B, the quarter glass 340 of the vehicle 500 may be disposed to be inclined at a second angle which is smaller than the first angle with respect to a vertical direction. For example, the quarter glass 340 may be disposed to be inclined at about 15 degrees with respect to a vertical direction. Referring to FIG. 1 and (b) of FIG. 17B, when the antenna assembly is placed on the front glass 340 of the vehicle 500, a peak area of a radiation pattern may include the first peak area RP1*b* in a horizontal direction and a second peak area RP2*b* in a vertical direction. The second peak area RP2*b* in the vertical direction may be in a lateral direction compared to the peak area RP1 of the radiation pattern when the antenna assembly is placed on the front glass 310 of (b) of FIG. 17A.

Referring to FIG. 1 and (b) of FIG. 17C, the rear glass 330 of the vehicle 500 may be disposed to be inclined at a third angle smaller than the first angle and greater than the second angle with respect to a vertical direction. For example, the rear glass 330 may be disposed to be inclined at about 40 degrees with respect to a vertical direction. Referring to FIG. 1 and (b) of FIG. 17C, when the antenna assembly is placed on the front glass 330 of the vehicle 500, a peak area of a radiation pattern may include the first peak area RP1*c* in a horizontal direction and the second peak area RP2*c* in a vertical direction. The second peak area RP2*c* in the vertical direction may be in a lateral direction compared to the peak area RP1 of the radiation pattern when the antenna assembly is placed on the front glass 310 of (b) of FIG. 17A.

Referring to FIGS. 17A to 17C, when the antenna assembly is placed on glass of the vehicle due to an influence of a conductive body of the vehicle and a ground surface, a radiation pattern in an upward direction (a vertical direction) may be generated to be dominant over radiation patterns in another direction (a horizontal direction). Particularly, when an inclination angle of a glass panel is increased, a radiation pattern of an antenna may be generated further upwardly (vertically). Additionally, a radiation pattern of the antenna may be generated further upwardly (vertically) in a frequency band of 1.7 to 3.5 GHz in a mid-band (MB) and a high-band (HB) than in a low-band (LB). Accordingly, an antenna gain may be reduced in a low elevation region of approximately 30 degrees relative to a horizontal surface.

An inclination of a glass panel has a great inclination angle in an order from the quarter glass 340, the rear glass 330, to the front glass 310. Accordingly, when the antenna assembly is disposed on a structure inclined at a predetermined angle or more, such as the rear glass 330 and the front glass 310, a radiation pattern in a horizontal direction may needs to be generated.

Figure 18A:
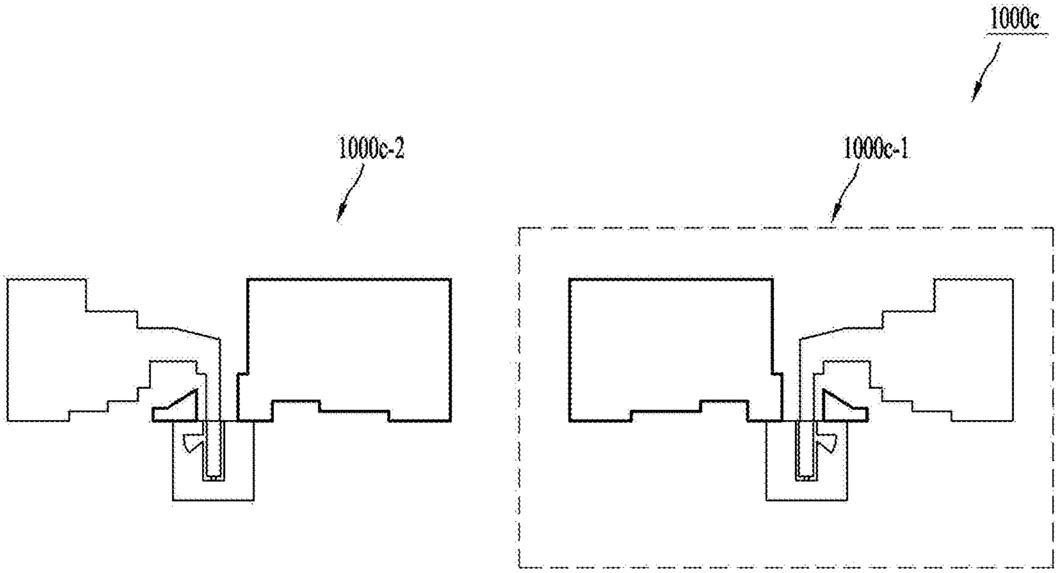
FIG. 18A illustrates an arbitrary antenna structure including a plurality of conductive patterns without a ground ring structure.

In this regard, radiation pattern characteristics and current distributions of the antenna assembly 1000*b* further including the third conductive pattern 1130 having a ground ring structure, as shown in FIGS. 14A and 14B, are to be described. In this regard, FIG. 18A illustrates an arbitrary antenna structure including a plurality of conductive patterns without a ground ring structure. Meanwhile, FIG. 18B illustrates a structure in which the antenna assembly of FIG. 14A is placed adjacent to the antenna structure of FIG. 18A.

Referring to FIG. 18A, an antenna structure 1000*c* may be configured to include a first radiation structure 1000*c*-1 and a second radiation structure 1000*c*-2. Each of the first radiation structure 1000*c*-1 and the second radiation structure 1000*c*-2 may include a plurality of conductive patterns to operate in the first frequency band to the third frequency band.

Figure 18B:
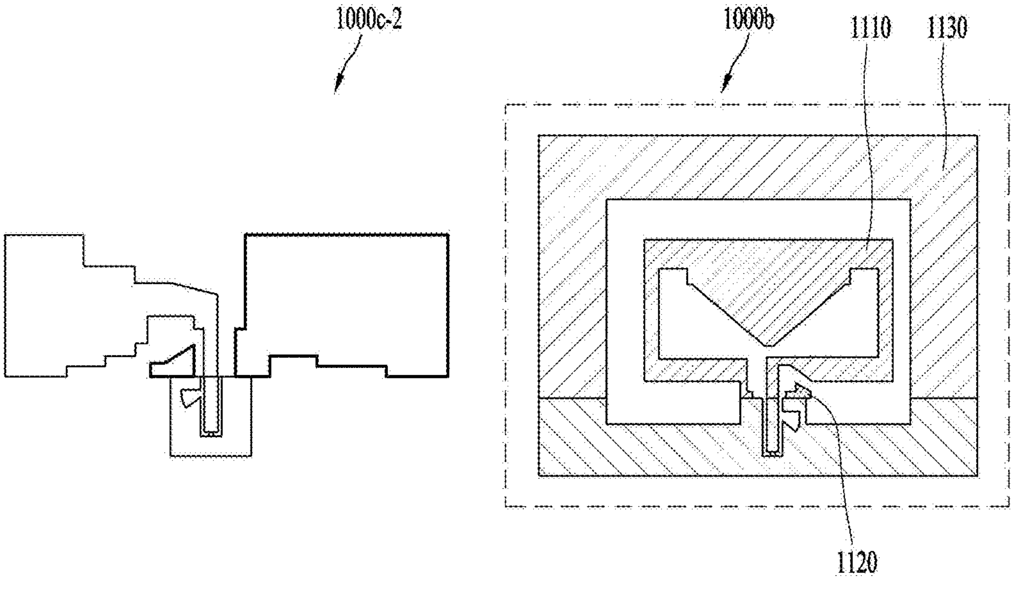
FIG. 18B illustrates a structure in which the antenna assembly of FIG. 14A is placed adjacent to the antenna structure of FIG. 18A.

Referring to FIG. 18B, the antenna assembly 1000*b* may be placed adjacent to the second radiation structure 1000*c*-2. The antenna assembly 1000*b* may include the third conductive pattern 1130 having a ground ring structure to surround the first and second conductive patterns 1110 and 1120.

Figure 19A:
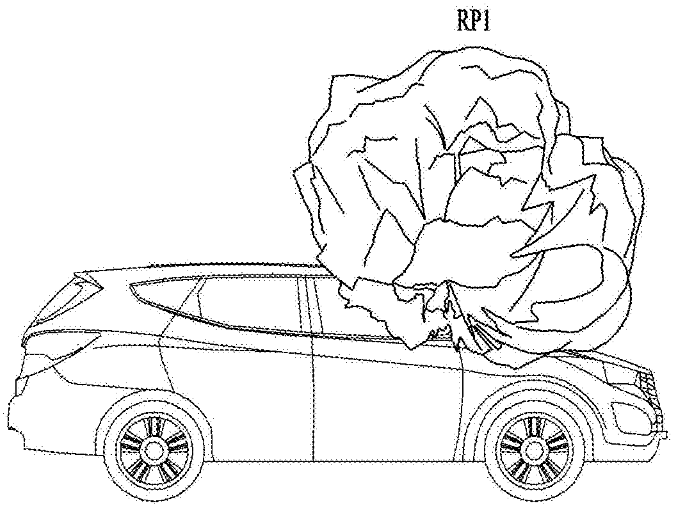
FIGS. 19A and 19B illustrate antenna radiation patterns when the antenna structures of FIGS. 18A and 18B are placed on front glass of a vehicle.
Figure 19B:
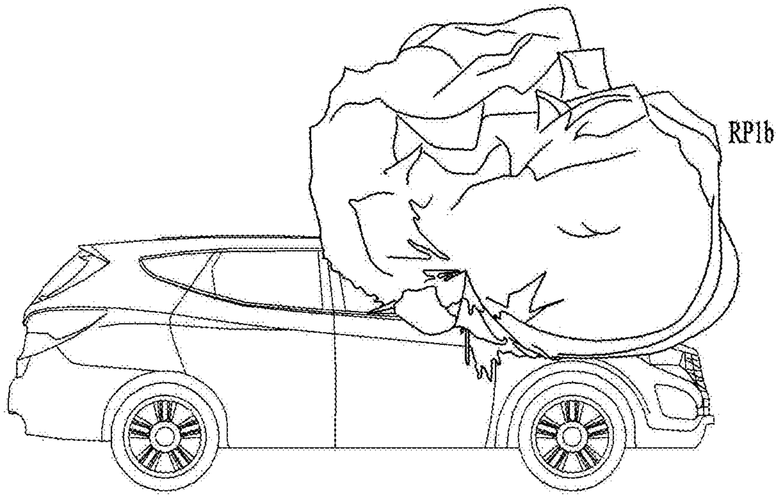
Figure 19C:
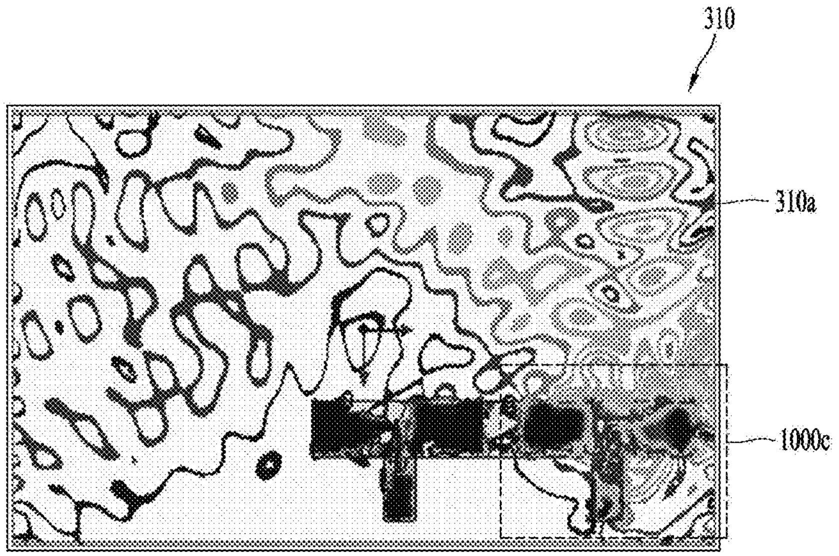
FIGS. 19C and 19D illustrates electric field distributions when the antenna structure of FIG. 18A and the antenna assembly of FIG. 18B are placed on glass of a vehicle.
Figure 19D:
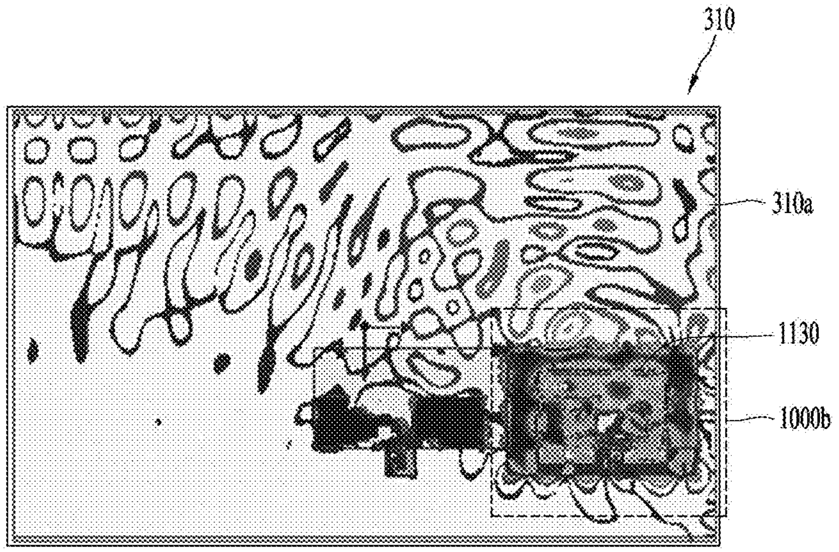

FIGS. 19A and 19B illustrate antenna radiation patterns when the antenna structures of FIGS. 18A and 18B are placed on front glass of a vehicle. FIGS. 19C and 19D illustrates electric field distributions when the antenna structure of FIG. 18A and the antenna assembly of FIG. 18B are placed on glass of a vehicle.

Referring to FIGS. 1, 18A, and 19A, the peak area RP1 of a radiation pattern of the antenna structure 1000*c* disposed on the front glass 310 may be defined in a vertical direction. Referring to FIGS. 18A and 19C, an electric field distribution generated in the antenna structure 1000*c* is shown as being higher in regions corresponding to conductive patterns than in other regions. A current path in the antenna structure 1000*c* may be a current path of conductive patterns corresponding to a radiator. Additionally, an electric field distribution generated on the conductive patterns is maintained at a high level even in the upper region 310*a* of the front glass 310, which is a region outside the antenna structure 1000*c*. Therefore, antenna efficiency may be decreased and a radiation pattern component in a vertical direction may be increased due to a current supplied in the upper area 310*a* of the front glass. Accordingly, as an inclination angle of the glass panel on which the antenna assembly 1000 is disposed is increased, a peak angle of the radiation pattern may be defined in the upward direction (a vertical direction).

Referring to FIGS. 1, 18B, and 19B, the antenna assembly 1000*b* further including the third conductive pattern 1130 having a ground ring structure may be placed on the front glass 310 of the vehicle. The peak area RP1*b* of the radiation pattern of the antenna assembly 1000*b* disposed on the front glass 310 may be a low elevation region. The low elevation region may be defined as being within a range of approximately 30 degrees with respect to a horizontal plane, but is not limited thereto. The antenna assembly 1000*b* further including the third conductive pattern 1130 having a ground ring structure may implement low elevation beam characteristics even in a region with a wide inclination angle such as the front glass 310 of a vehicle.

Referring to FIGS. 14A, 15A, and 19D, an electric field distribution on the first conductive pattern 1110, the slot 1111*s* disposed therein, and the second conductive pattern 1120 in the antenna assembly 1000*b* is generated to be higher than that on other regions. Meanwhile, an electric field distribution on the third conductive pattern 1130 is generated at a level similar to that of an electric field distribution on the first conductive pattern 1110.

A field dispersion phenomenon may be reduced by the third conductive pattern 1130 defining a surrounding ground path and having an electric field distribution at a similar level to that of the first conductive pattern 1110. An effect of reducing a field dispersion phenomenon and converging a radiation pattern of an antenna may be obtained by the third conductive pattern 1130. In this regard, in addition to radiators of the first and second conductive patterns 1110 and 1120, a current path is also defined in the third conductive pattern 1130 having the ground ring structure. An electric field distribution generated on the first and second conductive patterns 1110 and 1120 is decreased to a critical level or less on the upper region 310*a* of the front glass 310, which is a region outside the antenna assembly 1000. Accordingly, since unnecessary current components are not generated in the upper region 310*a* of the front glass, antenna efficiency may be increased and radiation pattern components in a vertical direction may be reduced. Accordingly, an electric field is concentrated inside the antenna assembly 1000*b*, and a radiation pattern in an upward direction (a vertical direction) may be suppressed by ground extended around the feed pattern 1110*f*.

Figure 20A:
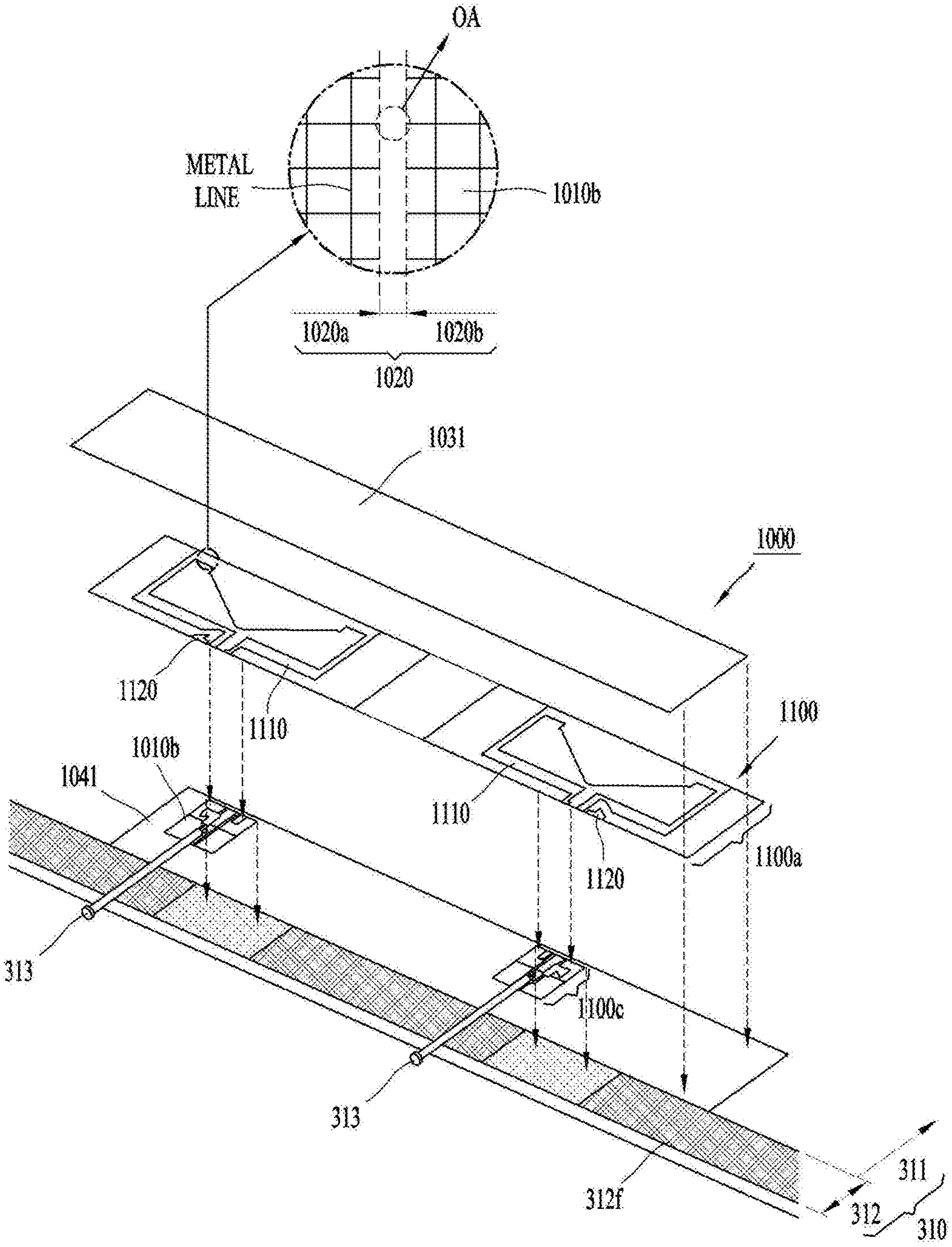
FIG. 20A illustrates a structure of an antenna assembly having a transparent antenna structure according to another aspect of the present specification.
Figure 20B:
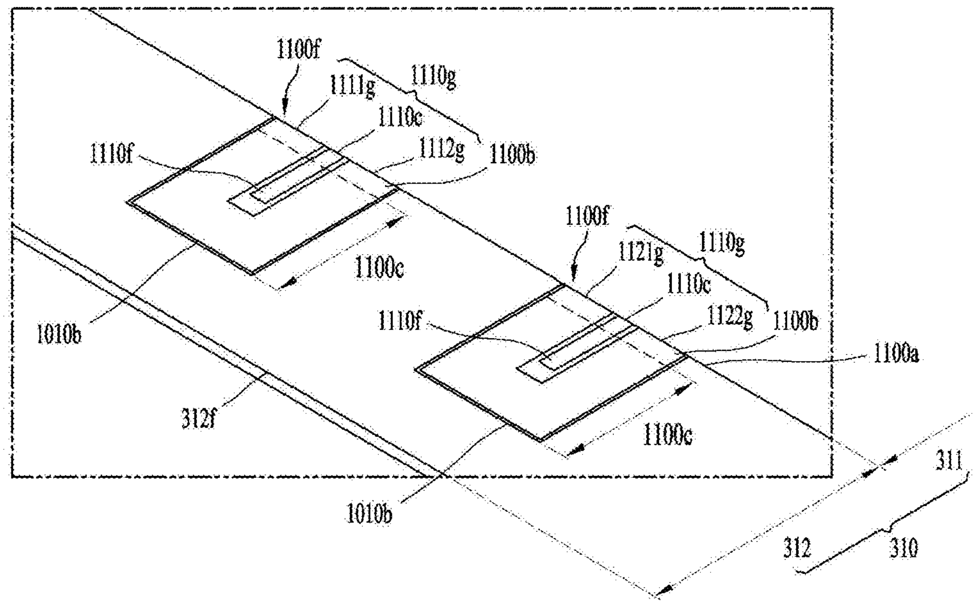
FIG. 20B illustrates a structure in which a second dielectric substrate of the antenna assembly of FIG. 20A is placed on an opaque region of a glass panel.

An antenna assembly having a transparent antenna structure according to one aspect of the present specification has been described. Hereinafter, an antenna assembly having a transparent antenna structure according to another aspect of the present specification is to be described. In relation to this, FIG. 20A illustrates a structure of an antenna assembly having a transparent antenna structure according to another aspect of the present specification. FIG. 20B illustrates a structure in which a second dielectric substrate of the antenna assembly of FIG. 20A is placed on an opaque region of a glass panel.

Referring to FIGS. 1, 11, 14A, 20A and 20B, the vehicle may be configured to include the glass panel 310 and the antenna assembly 1000. The glass panel 310 may be configured to include the transparent region 311 and the opaque region 312. The antenna assembly 1000 may be disposed on the glass panel 310. The antenna assembly 1000 may be configured to include the first dielectric substrate 1010*a*, the first area 1100*a*, the second dielectric substrate 1010*b*, and a third area 1100*c*.

The first area 1100*a* may be configured to include the antenna element 1100 on one side surface of the first transparent dielectric substrate 1010*a*. The second area 1100*b* may include first connection patterns 1110*c* connected to the antenna element 1100. The second area 1100*b* may be disposed on the opaque region 312 of the glass panel 310. The second dielectric substrate 1010*b* may be disposed on the opaque region 312 of the glass panel 310. The third area 1100*c* may be configured to include the ground conductive pattern 1110*g* and the feed pattern 1110*f* on one side surface of the second dielectric substrate 1010*b*. The antenna element 1100 may be configured to include the first conductive pattern 1110 and the second conductive pattern 1120. Since the antenna element 1100 includes a plurality of conductive patterns, the antenna element 1100 may be referred to as the antenna module 1100.

The first conductive pattern 1110 may include a closed loop trace to radiate a wireless signal in a particular frequency band. The first conductive pattern 1110 implemented as the closed loop trace may include a plurality of conductive parts. The plurality of conductive parts implemented as the closed loop trace may be configured to include the first part 1111 to the fifth part 1115. The first part 1111 to the fourth part 1114 constitute different sides of a rectangle, and the first part 1111 and the fifth part 1115 may be arranged at both sides with respect to the feed pattern 1110*f*. The fifth part 1115 may be integrated into the first part 1111, and the first part 1111 to the fourth part 1114 may be disposed depending on the application.

A first end of the first part 1111 may be electrically connected to the feed pattern 1110*f*. A second end of the first part 1111 may be electrically connected to a first end of the second part 1112. A second end of the second part 1112 may be electrically connected to a first end of the third part 1113. A second end of the third part 1113 may be electrically connected to a first end of the fourth part 1114. A second end of the fourth part 1114 may be electrically connected to a first end of the fifth part 1115. In this regard, a meaning of "electrically connected" may include direct connection between respective conductive parts or coupling therebetween to be spaced apart from each other by a constant distance.

A second end of the fifth part 1115 may be electrically connected to the first portion 1111*g* of the ground conductive pattern 1110*g*. The second part 1112 and the fourth part 1114 may be arranged on opposite sides of the first conductive pattern 1110. The first part 1111 and the third part 1113 may be arranged on opposite sides of the first conductive pattern 1110. The first part 1111 and the fifth part 1115 may be placed on a same side of as that of the first conductive pattern 1110.

The second conductive pattern 1120 may be electrically connected to the second portion 1112*g* of the ground conductive pattern 1110*g*. The antenna 1100 may be configured to include the slot 1110*s* in the first conductive pattern 1110 together with the first conductive pattern 1110 and the second conductive pattern 1120. The slot 1110*s* may be disposed inside the first conductive pattern 1110. The slot 1110*s* may be disposed to be surrounded by the first conductive pattern 1110. The slot 1110*s* may be configured to include the first slot area 1111*s* and the second slot area 1112*s*.

The second conductive pattern 1120 may be arranged between the first part 1111 of the first conductive pattern 1110 and the ground conductive pattern 1110*g*. The second conductive pattern 1120 may be arranged between the first part 1111 of the first conductive pattern 1110 and the second portion 1112*g* of the ground conductive pattern 1110*g*.

The first gap G1 and the second gap G2 may be disposed in the first slot area 1111*s*. The first gap G1 in the first slot area 1110*s* may be disposed between a first point on an inner side of the first part 1111 near the first end of the second part 1112 and a first point on an inner side of the third part 1113 near the second end of the second part 1112. The second gap G2 in the first slot area 1110*s* may be disposed between a second point on the inner side of the first part 1111 connected to the feed pattern 1110*f* and a second point on the inner side of the third part 1113 near an intermediate point of the third part 1113. A distance of the second gap G2 may be configured to be shorter than a distance of the first gap G1. Accordingly, since a height of the slot area 1110*s* in the first conductive pattern 1110 may be changed to be optimized at different frequencies, the antenna 1100 may perform broadband operation.

Meanwhile, an antenna assembly according to the specification may be configured to include a first transparent dielectric substrate, on which a transparent electrode layer is formed, and a second dielectric substrate. In this regard, FIG. 20C illustrates the flow of processes in which the antenna assembly according to the embodiment is manufactured by being coupled to a glass panel.

Figure 20C:
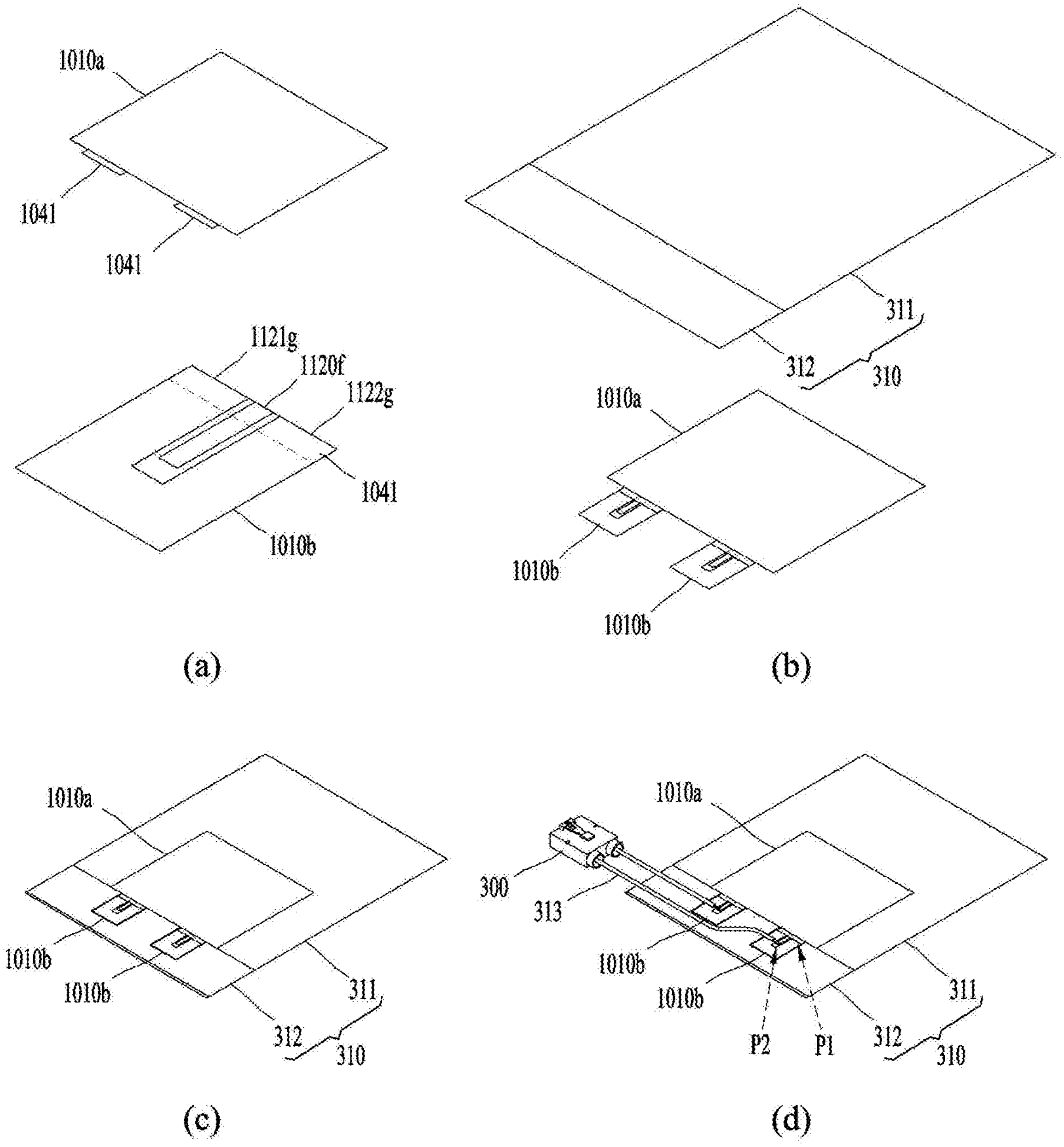
FIG. 20C illustrates a flow of processes in which the antenna assembly according to an embodiment is manufactured by being coupled to a glass panel.

Referring to (a) of FIG. 20C, the first transparent dielectric substrate 1000*a* on which the transparent electrode layer is formed may be manufactured. In addition, the second dielectric substrate 1000*b* that includes the feeding pattern 1120*f* and the ground patterns 1121*g* and 1122*g* formed on both sides of the feeding pattern **1120*f* may be manufactured. The second dielectric substrate 1000*b* may be implemented as an FPCB, but is not limited thereto. Adhesion regions corresponding to the adhesive layers 1041 may be formed on the first transparent dielectric substrate 1000*a* and the second dielectric substrate 1000*b***, respectively.

Referring to (b) of FIG. 20C, the glass panel 310 with the transparent region 311 and the opaque region 312 may be manufactured. In addition, the antenna assembly 1000 may be manufactured by coupling at least one second dielectric substrate **1010*b* to the lower region of the first transparent dielectric substrate 1000*a*. The first transparent dielectric substrate 1000*a* and the second dielectric substrate 1000*b* may be coupled through ACF bonding or low-temperature soldering to be implemented as the transparent antenna assembly. Through this, the conductive pattern formed on the first transparent dielectric substrate 1000*a* can be electrically connected to the conductive pattern formed on the second dielectric substrate 1000*b*. When a plurality of antenna elements are implemented on the glass panel 310, the feeding structure 1100*f* made of the second dielectric substrate 1000*b*** may also be implemented as a plurality of feeding structures.

Referring to (c) of FIG. 20C, the transparent antenna assembly 1000 may be attached to the glass panel 310. In this regard, the first transparent dielectric substrate **1000*a* on which the transparent electrode layer is formed may be disposed in the transparent region 311 of the glass panel 310. Meanwhile, the second dielectric substrate 1000*b*, which is the opaque substrate, may be disposed in the opaque region 312 of the glass panel 310**.

Referring to (d) of FIG. 20C, the first transparent dielectric substrate **1000*a* and the second dielectric substrate 1000*b* may be bonded at a first position P1. The connector part 313, such as a Fakra cable, may be bonded to the second dielectric substrate 1000*b* at a second position P2. The transparent antenna assembly 1000 may be coupled to the telematics control unit (TCU) 300 through the connector part 313. To this end, the second conductive pattern formed on the second dielectric substrate 1000*b* may be electrically connected to a connector of one end of the connector part 313. A connector of another end of the connector part 313 may be electrically connected to the telematics control unit (TCU) 300**.

Figure 21A:
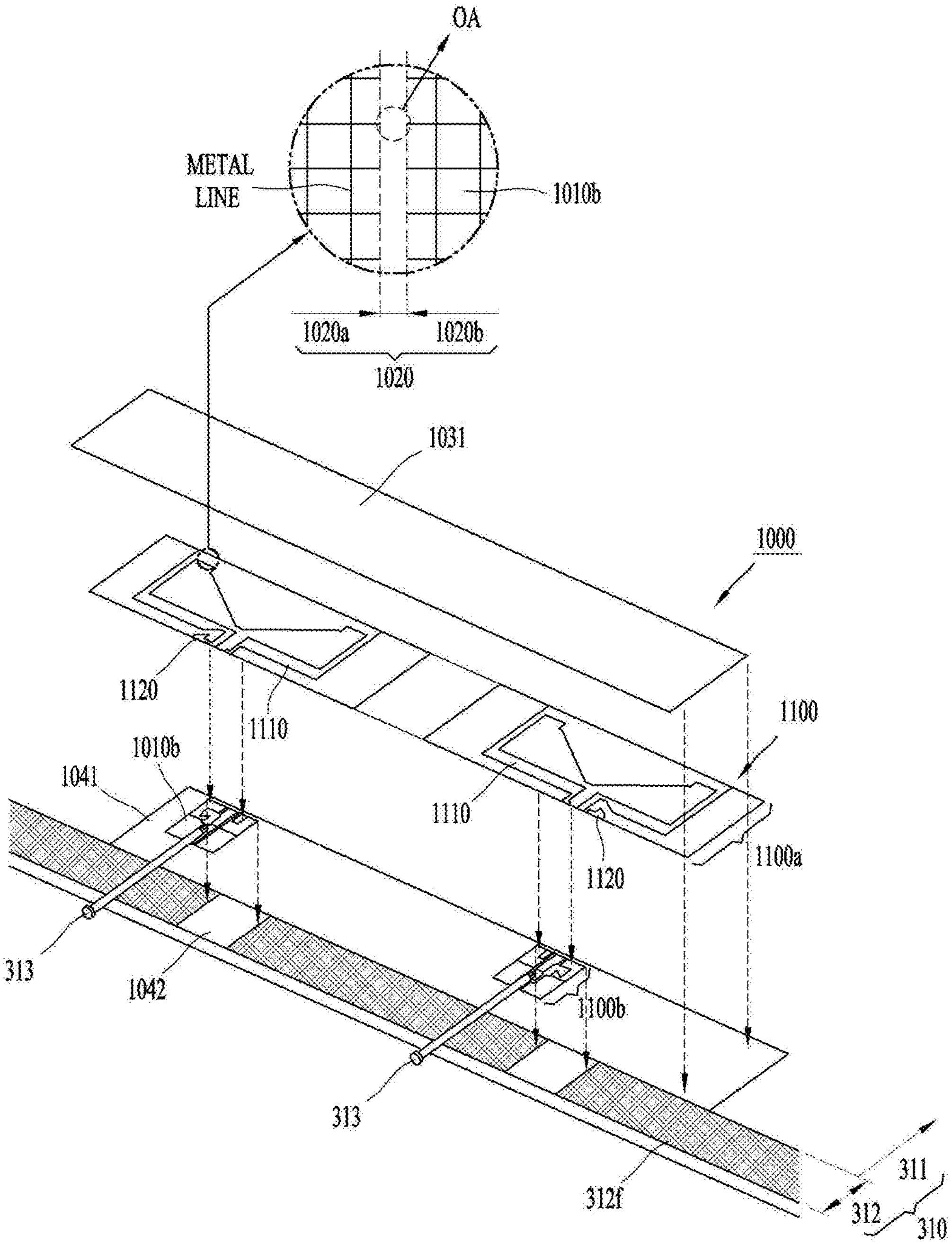
FIG. 21A illustrates the structure of an antenna assembly with a transparent antenna structure according to still another aspect of the specification.
Figure 21B:
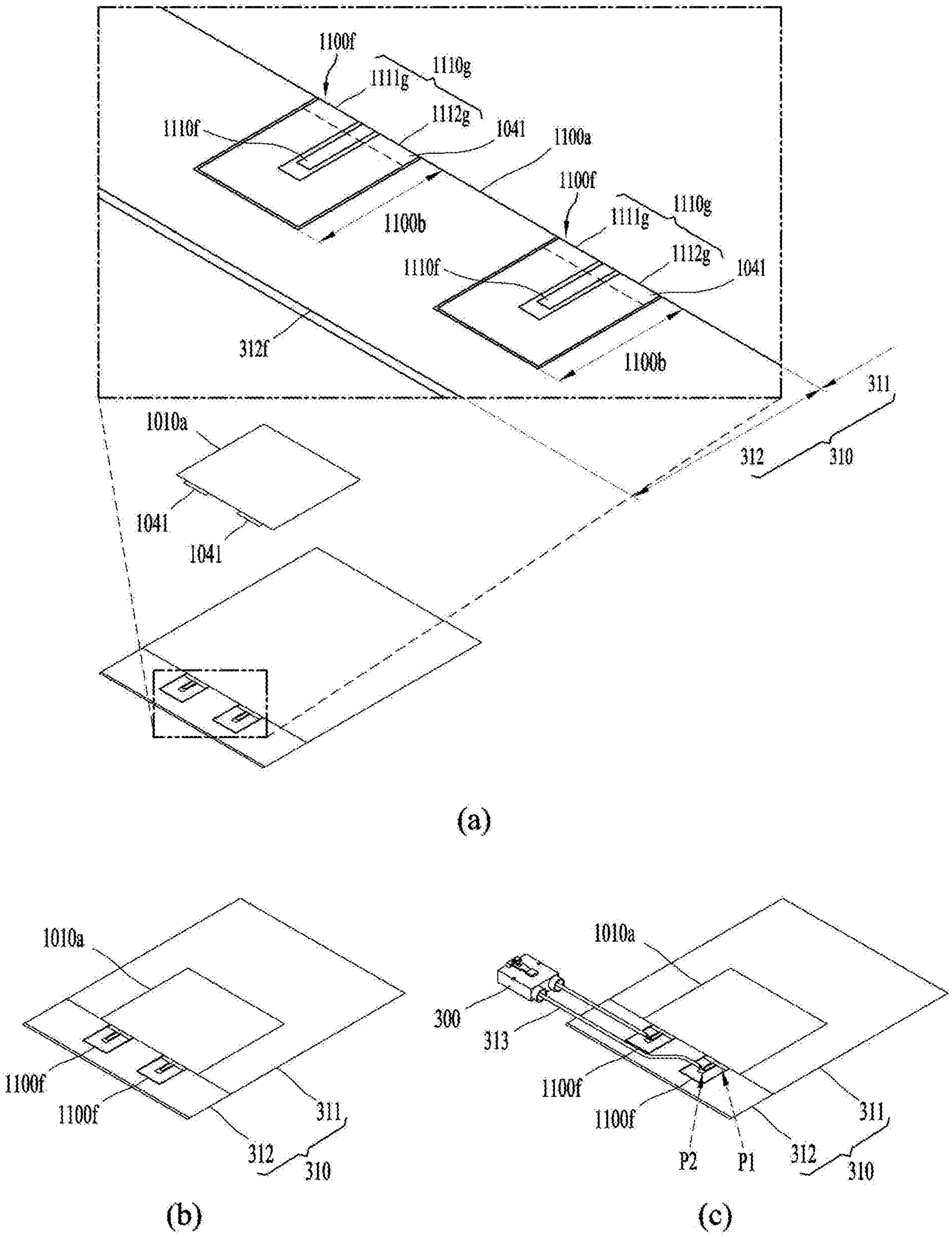
FIG. 21B is a process flowchart of a structure in which a feeding structure of the antenna assembly of FIG. 21A is disposed in an opaque region of a glass panel

Hereinafter, an antenna assembly with a transparent antenna structure according to still another aspect of the specification will be described. In this regard, FIG. 21A illustrates the structure of an antenna assembly with a transparent antenna structure according to still another aspect of the specification. FIG. 21B is a process flowchart of a structure in which a feeding structure of the antenna assembly of FIG. 21A is disposed in an opaque region of a glass panel. In this regard, a feeding structure **1100*f* may be disposed in a region where a frit pattern 312*f*** has been removed.

Referring to FIGS. 1, 11, 14A, 21A, and 21B, the vehicle may be configured to include the glass panel 310 and the antenna assembly 1000. The glass panel 310 may be configured to include the transparent region 311 and the opaque region 312. One side surface of the opaque region 312 may include the ground conductive pattern **1110*g* and the feed pattern 1110*f***.

The antenna assembly 1000 may be disposed on the glass panel 310. The antenna assembly 1000 may be configured to include the first transparent dielectric substrate **1010*a*, the first area 1100*a*, and the second area 1100*b***.

The first area **1100*a* may be configured to include the antenna element 1100 on one side surface of the first transparent dielectric substrate 1010*a*. The second area 1100*b* may include the first connection patterns 1110*c* connected to the antenna element 1100. The second area 1100*b* may be disposed on the opaque region 312 of the glass panel 310**.

As illustrates in FIG. 11, the antenna element 1100 may be configured to include the first conductive pattern 1110 and the second conductive pattern 1120. As shown in FIG. 14A, the antenna assembly 1100 may be configured to include the first conductive pattern 1110, the second conductive pattern 1120, and the third conductive pattern 1130. Since the antenna element 1100 includes a plurality of conductive patterns, the antenna element 1100 may be referred to as the antenna module 1100.

The first conductive pattern 1110 may include a closed loop trace to radiate a wireless signal in a particular frequency band. The first conductive pattern 1110 implemented as the closed loop trace may include a plurality of conductive parts. The plurality of conductive parts implemented as the closed loop trace may be configured to include the first part 1111 to the fifth part 1115. The first part 1111 to the fourth part 1114 constitute different sides of a rectangle, and the first part 1111 and the fifth part 1115 may be arranged at both sides with respect to the feed pattern **1110*f*. The fifth part 1115 may be integrated into the first part 1111, and the first part 1111 to the fourth part 1114** may be disposed depending on the application.

A first end of the first part 1111 may be electrically connected to the feed pattern **1110*f*. A second end of the first part 1111 may be electrically connected to a first end of the second part 1112. A second end of the second part 1112 may be electrically connected to a first end of the third part 1113. A second end of the third part 1113 may be electrically connected to a first end of the fourth part 1114. A second end of the fourth part 1114 may be electrically connected to a first end of the fifth part 1115**. In this regard, a meaning of "electrically connected" may include direct connection between respective conductive parts or coupling therebetween to be spaced apart from each other by a constant distance.

A second end of the fifth part 1115 may be electrically connected to the first portion **1111*g* of the ground conductive pattern 1110*g*. The second part 1112 and the fourth part 1114 may be arranged on opposite sides of the first conductive pattern 1110. The first part 1111 and the third part 1113 may be arranged on opposite sides of the first conductive pattern 1110. The first part 1111 and the fifth part 1115 may be placed on a same side of as that of the first conductive pattern 1110**.

The second conductive pattern 1120 may be electrically connected to a second portion **1112*g* of the ground conductive pattern 1110*g*. The antenna 1100 may be configured to include the slot 1110*s* in the first conductive pattern 1110 together with the first conductive pattern 1110 and the second conductive pattern 1120. The slot 1110*s* may be disposed inside the first conductive pattern 1110. The slot 1110*s* may be disposed to be surrounded by the first conductive pattern 1110. The slot 1110*s* may be configured to include the first slot area 1111*s* and the second slot area 1112*s***.

The second conductive pattern 1120 may be arranged between the first part 1111 of the first conductive pattern 1110 and the ground conductive pattern **1110*g*. The second conductive pattern 1120 may be arranged between the first part 1111 of the first conductive pattern 1110 and the second portion 1112***g* of the ground conductive pattern 1110*g*.

The first gap G1 and the second gap G2 may be disposed in the first slot area 1111*s*. The first gap G1 in the first slot area 1110*s* may be disposed between a first point on an inner side of the first part 1111 near the first end of the second part 1112 and a first point on an inner side of the third part 1113 near the second end of the second part 1112. The second gap G2 in the first slot area 1110*s* may be disposed between a second point on the inner side of the first part 1111 connected to the feed pattern 1110*f* and a second point on the inner side of the third part 1113 near an intermediate point of the third part 1113. A distance of the second gap G2 may be configured to be shorter than a distance of the first gap G1. Accordingly, since a height of the slot area 1110*s* in the first conductive pattern 1110 may be changed to be optimized at different frequencies, the antenna 1100 may perform broadband operation.

The antenna assembly of FIG. 21B may have a structural difference, compared to the antenna assembly of FIG. 20C, in that the opaque substrate is not manufactured separately but is manufactured integrally with the glass panel 310. The antenna assembly of FIG. 21B is implemented in such a way that the feeding structure implemented as the opaque substrate is directly printed on the glass panel 310 rather than being separately manufactured as an FPCB.

Referring to (a) of FIG. 21B, the first transparent dielectric substrate 1000*a* on which the transparent electrode layer is formed may be manufactured. In addition, the glass panel 310 with the transparent region 311 and the opaque region 312 may be manufactured. In the process of manufacturing of the glass panel of the vehicle, metal wires/pads for connection of the connectors may be implemented (fired). Like heating wires implemented on the vehicle glass, a transparent antenna mounting portion may be implemented in a metal form on the glass panel 310. In this regard, the second conductive pattern may be implemented in the region where the adhesive layer 1041 is formed for electrical connection to the first conductive pattern of the first transparent dielectric substrate 1000*a*.

In this regard, the second dielectric substrate 1000*b* on which the second conductive pattern is formed may be manufactured integrally with the glass panel 310. The second dielectric substrate 1000*b* may be formed integrally with the glass panel 310 in the opaque region 312 of the glass panel 310. The frit pattern 312 may be removed from the opaque region 312 where the second dielectric substrate 1000*b* is formed. The second conductive pattern may be implemented by forming the feeding pattern 1120*f* and the ground patterns 1121*g* and 1122*g* on both sides of the feeding pattern 1120*f* on the second dielectric substrate 1000*b*.

Referring to (b) of FIG. 21B, the transparent antenna assembly 1000 may be attached to the glass panel 310. In this regard, the first transparent dielectric substrate 1000*a* on which the transparent electrode layer is formed may be disposed in the transparent region 311 of the glass panel 310. The antenna assembly 1000 may be manufactured by coupling at least one second dielectric substrate 1000*b* to the lower region of the first transparent dielectric substrate 1000*a*. The first transparent dielectric substrate 1000*a* and the second dielectric substrate 1000*b* may be coupled through ACF bonding or low-temperature soldering to be implemented as a transparent antenna assembly. Through this, the first conductive pattern formed on the first transparent dielectric substrate 1000*a* can be electrically connected to the second conductive pattern formed on the second dielectric substrate 1000*b*. When a plurality of antenna elements are implemented on the glass panel 310, the feeding structure 1100*f* made of the second dielectric substrate 1000*b* may also be implemented as a plurality of feeding structures.

Referring to (c) of FIG. 21B, the first transparent dielectric substrate 1000*a* and the second dielectric substrate 1000*b* may be bonded at a first position P1. The connector part 313, such as a Fakra cable, may be bonded to the second dielectric substrate 1000*b* at a second position P2. The transparent antenna assembly 1000 may be coupled to the telematics control unit (TCU) 300 through the connector part 313. To this end, the second conductive pattern formed on the second dielectric substrate 1000*b* may be electrically connected to a connector of one end of the connector part 313. A connector of another end of the connector part 313 may be electrically connected to the telematics control unit (TCU) 300.

Figure 22:
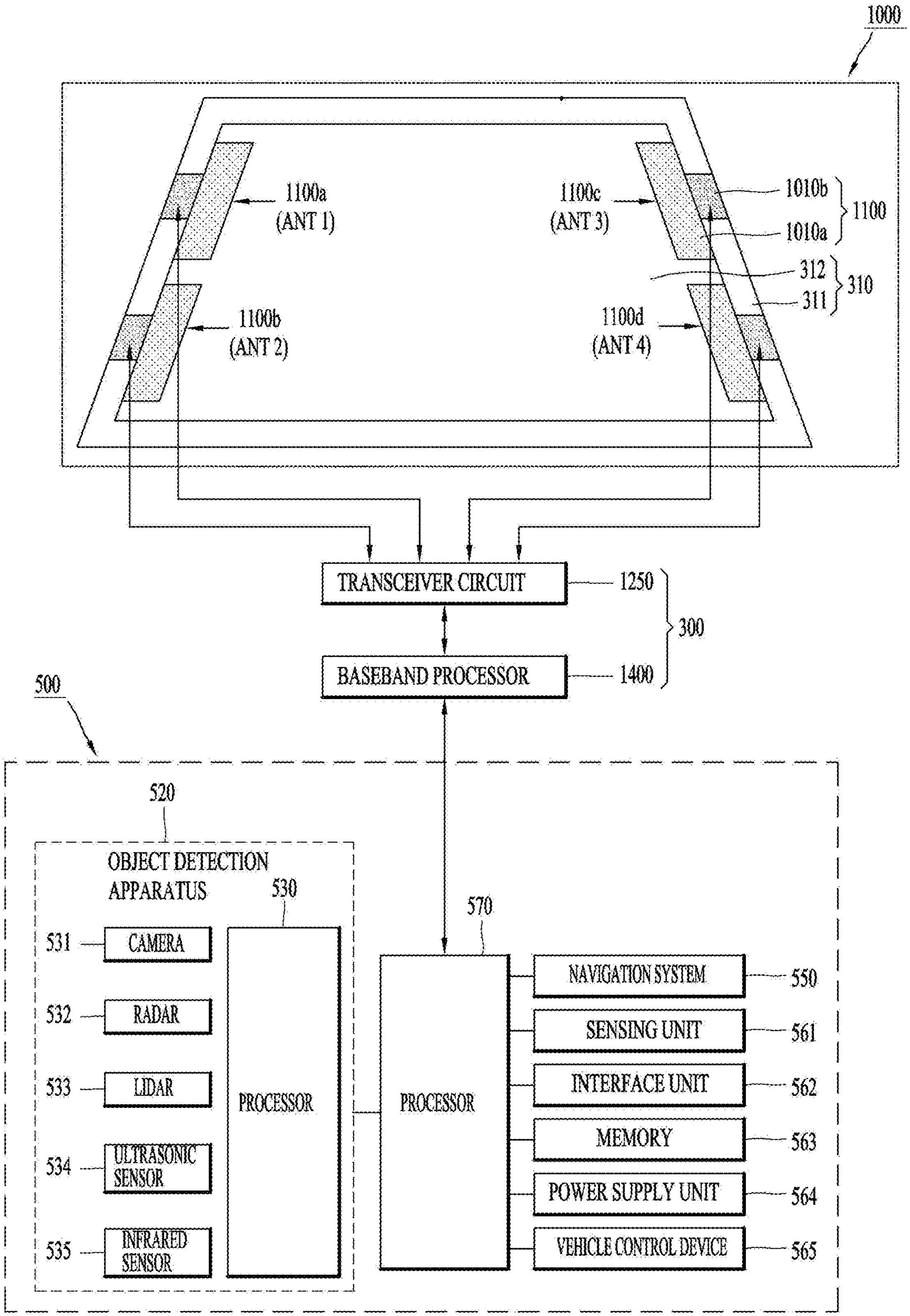
FIG. 22 illustrates an example of a configuration in which a plurality of antenna modules disposed at different positions of a vehicle according to the present specification are coupled with other parts of the vehicle.

Hereinafter, a vehicle having an antenna module according to one example will be described in detail. In this regard, FIG. 22 illustrates an example of a configuration in which a plurality of antenna modules disposed at different positions of a vehicle are coupled with other parts of the vehicle.

Referring to FIGS. 1 to 22, the vehicle 500 may include a conductive vehicle body operating as an electrical ground. The vehicle 500 may include a plurality of antennas 1100*a* to 1100*d* that may be disposed at different positions on the glass panel 310. The antenna assembly 1000 may be configured such that the plurality of antennas 1100*a* to 1100*d* include a communication module 300. The communication module 300 may include a transceiver circuit 1250 and a processor 1400. The communication module 300 may correspond to the TCU of the vehicle or may constitute at least a portion of the TCU.

The vehicle 500 may include an object detection device 520 and a navigation system 550. The vehicle 500 may further include a separate processor 570 in addition to the processor 1400 included in the communication module 300. The processor 1400 and the separate processor 570 may be physically or functionally separated and implemented on one substrate. The processor 1400 may be implemented as a TCU, and the processor 570 may be implemented as an electronic control unit (ECU).

In the case where the vehicle 500 is an autonomous vehicle, the processor 570 may be an autonomous driving control unit (ADCU) integrated with an ECU. Based on information detected through a camera 531, radar 532, and/or lidar 533, the processor 570 may search for a path and control the speed of the vehicle 500 to be accelerated or decelerated. To this end, the processor 570 may interoperate with a processor 530 corresponding to an MCU in the object detection device 520 and/or the communication module 300 corresponding to the TCU.

The vehicle 500 may include the first transparent dielectric substrate 1010*a* and the second dielectric substrate 1010*b* disposed on the glass panel 310. The first transparent dielectric substrate 1010*a* may be formed inside the glass panel 310 of the vehicle or may be attached to the surface of the glass panel 310. The first transparent dielectric substrate 1010*a* may be configured such that conductive patterns in the metal mesh grid shape are formed. The vehicle 500 may include an antenna module 1100 which is formed in a metal mesh shape on one side of the dielectric substrate 1010 to radiate radio signals.

The antenna assembly 1000 may include a first antenna module 1100*a* to a fourth antenna module 1100*d* to perform MIMO. The first antenna module 1100*a*, the second antenna module 1100*b*, the third antenna module 1100*c*, and the fourth antenna module 1100*d* may be disposed on the upper left, lower left, upper right, and lower right sides of the glass panel 310, respectively. The first antenna module 1100*a* to the fourth antenna module 1100*d* may be referred to as a first antenna ANT1 to a fourth antenna ANT4, respectively. The first antenna ANT1 to the fourth antenna ANT4 may be referred to as the first antenna module ANT1 to the fourth antenna module ANT4, respectively.

As described above, the vehicle 500 may include the telematics control unit (TCU) 300, which is the communication module. The TCU 300 may control signals to be received and transmitted through at least one of the first to fourth antenna modules 1100*a* to 1100*d*. The TCU 300 may include a transceiver circuit 1250 and a processor 1400.

Accordingly, the vehicle may further include a transceiver circuit 1250 and a processor 1400. A portion of the transceiver circuit 1250 may be disposed in units of antenna modules or in combination thereof. The transceiver circuit 1250 may control a radio signal of at least one of first to third frequency bands to be radiated through the antenna modules ANT1 to ANT4. The first to third frequency bands may be low band (LB), mid band (MB), and high band (HB) for 4G/5G wireless communications, but are not limited thereto.

The processor 1400 may be operably coupled to the transceiver circuit 1250 and may be configured as a modem operating in a baseband. The processor 1400 may receive or transmit a signal through at least one of the first antenna module ANT1 and the second antenna module ANT2. The processor 1400 may perform a diversity operation or MIMO using the first antenna module ANT1 and the second antenna module ANT2 such that a signal is transmitted to the inside of the vehicle.

Antenna modules may be disposed in different regions of one side surface and another side surface of the glass panel 310. The antenna modules may perform MIMO by simultaneously receiving signals from the front of the vehicle. In this regard, to perform 4×4 MIMO, the antenna modules may further include a third antenna module ANT3 and a fourth antenna module ANT4 in addition to the first antenna module ANT1 and the second antenna module ANT2.

The processor 1400 may select an antenna module to perform communication with an entity communicating with the vehicle based on a driving path of the vehicle and a communication path with the entity. The processor 1400 may perform MIMO by using the first antenna module ANT1 and the second antenna module ANT2 based on a direction that the vehicle travels. Alternatively, the processor 1400 may perform MIMO through the third antenna module ANT2 and the fourth antenna module ANT4 based on the direction that the vehicle travels.

The processor 1400 may perform MIMO in a first band through at least two of the first antenna ANT1 to the fourth antenna ANT4. The processor 1400 may perform MIMO in at least one of a second band and a third band through at least two of the first antenna ANT1 to the fourth antenna ANT4.

Accordingly, when signal transmission/reception performance of the vehicle in any one band deteriorates, signal transmission/reception in the vehicle may be performed in other bands. For example, the vehicle may preferentially perform communication connection in the first band, which is the low band, for wide communication coverage and connection reliability, and then perform communication connection in the second and third bands.

The processor 1400 may control the transceiver circuit 1250 to perform carrier aggregation (CA) or dual connectivity (DC) through at least one of the first antenna ANT1 to the fourth antenna ANT4. In this regard, communication capacity can be expanded through the aggregation of the second band and the third band, which are wider than the first band. In addition, communication reliability can be improved through the DC with neighboring vehicles or entities by using the plurality of antenna elements disposed in the different regions of the vehicle.

The foregoing description has been given of the broadband transparent antenna assembly that may be arranged on the vehicle glass and the vehicle equipped therewith. Hereinafter, the technical effects of a broadband transparent antenna assembly that may be disposed on vehicle glass and a vehicle equipped therewith will be described.

According to the present specification, an antenna assembly that may be disposed on vehicle glass may be implemented to operate in a plurality of operating modes to perform broadband operation.

According to the present specification, antenna efficiency of a broadband transparent antenna assembly may be improved by optimizing shapes of conductive patterns that may be disposed in a limited space of vehicle glass.

According to the present specification, a conductive pattern operating as ground may be disposed to surround conductive patterns operating as radiators, thereby improving an antenna radiation pattern in a low elevation region.

According to the present specification, since an antenna assembly is implemented using a transparent material so that an antenna region is not identifiable on vehicle glass, the antenna assembly may be optimally configured in a transparent region and an opaque region of the vehicle glass.

According to the present specification, a difference in visibility between a region in which a transparent material antenna that may be placed on a vehicle window is disposed and other regions may be minimized through optimization with frit patterns for each metal mesh region.

According to the present specification, a height difference that occurs when an opaque substrate is bonded to a transparent electrode part may be removed to resolve deterioration in visibility and mass productivity caused by a height difference during the bonding.

According to the present specification, invisibility of a vehicle transparent antenna and an antenna assembly including the same may be secured without a feed loss and antenna performance deterioration caused by an increase in a length of a transmission line due to a separate impedance matching portion.

According to the present specification, both invisibility of a shape of an antenna pattern and a transmission line and invisibility of an antenna assembly including a transparent electrode part and an opaque substrate part and attached to vehicle glass may be secured According to the present specification, a broadband antenna structure made of a transparent material and capable of being implemented on a single plane to have various shapes may be provided through a plurality of conductive patterns having a metal mesh shape, a CPW feeding portion, and a conversion structure therebetween.

According to the present specification, a broadband antenna structure made of a transparent material and capable of reducing a feed loss and enhancing antenna efficiency while operating in a broadband may be provided through a transparent region and a frit region of vehicle glass. Further scope of applicability of the disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

In relation to the aforementioned disclosure, the design and operations of an antenna assembly having transparent antennas and a vehicle controlling the same can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. An antenna assembly comprising:

a transparent dielectric substrate;

a first area comprising an antenna on one side of the transparent dielectric substrate; and a second area comprising a ground conductive pattern and a feed pattern, wherein the antenna comprises:

a first conductive pattern comprising a closed loop trace comprising a first part, a second part, a third part, a fourth part, and a fifth part, wherein a first end of the first part is electrically connected to the feed pattern, a second end of the first part is electrically connected to a first end of the second part, a second end of the second part is electrically connected to a first end of the third part, a second end of the third part is electrically connected to a first end of the fourth part, a second end of the fourth part is electrically connected to a first end of the fifth part, a second end of the fifth part is electrically connected to a first portion of the ground conductive pattern, and wherein the second part and the fourth part are disposed on opposite sides of the closed loop trace, the first part and the third part are disposed on opposite sides of the closed loop trace, and the first part and the fifth part are disposed at a same side of the closed loop trace;

a second conductive pattern electrically connected to a second portion of the ground conductive pattern; and a slot surrounded by the first conductive pattern and comprising a first slot area and a second slot area, wherein the second conductive pattern is disposed between the first part of the first conductive pattern and the ground conductive pattern, wherein a first gap in the first slot area is defined between a first point of an inner side of the first part near the first end of the second part and a first point of an inner side of the third part near the second end of the second part, wherein a second gap in the first slot area is defined between a second point of the inner side of an end of the first part connected to the feed pattern and a second point of the inner side of the third part near an intermediate point along the third part, and wherein a distance of the second gap is less than the first gap.

2. The antenna assembly of claim 1, wherein the first conductive pattern is configured to operate in a folded dipole antenna mode in a first frequency band.

3. The antenna assembly of claim 2, wherein the first slot area is configured to operate in a slot antenna mode in a second frequency band, and the second frequency band is wider than the first frequency band.

4. The antenna assembly of claim 3, wherein the second conductive pattern is configured to operate in a third frequency band, and the third frequency band is wider than the second frequency band.

5. The antenna assembly of claim 1, wherein a first pattern thickness of the third part corresponding to the first point of the inner side of the third part near the second end of the second part is less than a second pattern thickness of the third part corresponding to the second point of inner side of the third part.

6. The antenna assembly of claim 1, wherein the second gap is λgl/20 or less, wherein λgl is a guided wavelength corresponding to a lowest frequency of an operating frequency band.

7. The antenna assembly of claim 1, wherein a length of the third part is equal to λgl/2.

8. The antenna assembly of claim 1, wherein a shape of the inner side of the third part adjacent to the slot is configured as an isosceles triangle.

9. The antenna assembly of claim 1, wherein a shape of the inner side of the third part adjacent to the slot is configured as an inverted triangle.

10. The antenna assembly of claim 1, wherein a length of the slot between the first part and the third part gradually increases from the second gap toward the first gap.

11. The antenna assembly of claim 1, wherein:

a third gap in the first slot area is defined between a first point of an inner side of the second part near the first end of the second part and a first vertex of the third part near the intermediate point of the third part, a fourth gap in the first slot area is defined between a second point of the inner side of the second part near the second end of the second part and second vertex of the third part near the first end of the third part, and the fourth gap is less than the third gap.

12. The antenna assembly of claim 11, wherein a length of the slot between the second part and the third part gradually increases from the fourth gap toward the third gap.

13. The antenna assembly of claim 11, wherein;

a fifth gap in the second slot area is defined between a first point of an inner side of the fifth part near the second end of the fourth part and a third point of the inner side of the third part near the first end of the fourth part, a sixth gap in the second slot area is defined between a second point of an inner side of the fifth part near the second end of the fifth part connected to the first portion of the ground conductive pattern and a fourth point of the inner side of the third part near the intermediate point of the third part, and the sixth gap is less than the fifth gap.

14. The antenna assembly of claim 13, wherein a length of the slot between the third part and the fifth part gradually increases from the sixth gap toward the fifth gap.

15. The antenna assembly of claim 1, wherein:

a seventh gap in the second slot area is defined between a first point of an inner side of the fourth part near the second end of the third part and a third vertex of the third part near the second end of the third part, and an eighth gap in the second slot area is defined between a second point of the inner side of the fourth part near the second end of the fifth part and a fourth vertex of the third part near the intermediate point of the third part, and the eighth gap is less than the seventh gap.

16. The antenna assembly of claim 15, wherein a length of the slot between the fourth part and the third part gradually increases from the seventh gap toward the eighth gap.

17. The antenna assembly of claim 1, wherein:

the first conductive pattern and the second conductive pattern are configured to have a metal mesh shape comprising a plurality of opening areas on the transparent dielectric substrate, and the first conductive pattern, and the second conductive pattern have a coplanar waveguide (CPW) structure on the transparent dielectric substrate.

18. The antenna assembly of claim 1, wherein:

the antenna comprises a plurality of dummy mesh grid patterns at an outer portion of conductive patterns on the transparent dielectric substrate, the plurality of dummy mesh grid patterns are not connected to the feed pattern or the ground conductive pattern, and the plurality of dummy mesh grid patterns are separate from each other.

19. A glass panel assembly comprising:

a transparent region;

an opaque region formed outside the transparent region; and an antenna assembly comprising:

a transparent first dielectric substrate;

a first area comprising an antenna element on one side of the first dielectric substrate and disposed in the transparent region;

a second area comprising first connection patterns connected to the antenna element and disposed in the opaque region;

a second dielectric substrate disposed in the opaque region; and a third area comprising a ground conductive pattern and a feed pattern on one side of the second dielectric substrate, wherein the antenna element comprises:

a first conductive pattern comprising a closed loop trace comprising a first part, a second part, a third part, a fourth part, and a fifth part, wherein a first end of the first part is electrically connected to the feed pattern, a second end of the first part is electrically connected to a first end of the second part, a second end of the second part is electrically connected to a first end of the third part, a second end of the third part is electrically connected to a first end of the fourth part, a second end of the fourth part is electrically connected to a first end of the fifth part, a second end of the fifth part is electrically connected to a first portion of the ground conductive pattern, and wherein the second part and the fourth part are disposed on opposite sides of the closed loop trace, the first part and the third part are disposed on opposite sides of the closed loop trace, and the first part and the fifth part are disposed at a same side of the closed loop trace;

a second conductive pattern electrically connected to a second portion of the ground conductive pattern; and a slot surrounded by the first conductive pattern and comprising a first slot area and a second slot area, wherein the second conductive pattern is disposed between the first part of the first conductive pattern and the ground conductive pattern, wherein a first gap in the first slot area is defined between a first point of an inner side of the first part near the first end of the second part and a first point of an inner side of the third part near the second end of the second part, wherein a second gap in the first slot area is defined between a second point of the inner side of an end of the first part connected to the feed pattern and a second point of the inner side of the third part near an intermediate point along the third part, and wherein the second gap is less than the first gap.

20. A glass panel assembly comprising:

a transparent region;

an opaque region formed outside the transparent region, and comprising a ground conductive pattern and a feed pattern; and an antenna assembly comprising:

a transparent first dielectric substrate;

a first area comprising an antenna element on one side of the first dielectric substrate and disposed in the transparent region; and a second area comprising first connection patterns connected to the antenna element and disposed in the opaque region, wherein the antenna element comprises:

a first conductive pattern comprising a closed loop trace comprising a first part, a second part, a third part, a fourth part, and a fifth part, wherein a first end of the first part is electrically connected to the feed pattern, a second end of the first part is electrically connected to a first end of the second part, a second end of the second part is electrically connected to a first end of the third part, a second end of the third part is electrically connected to a first end of the fourth part, a second end of the fourth part is electrically connected to a first end of the fifth part, a second end of the fifth part is electrically connected to a first portion of the ground conductive pattern, and wherein the second part and the fourth part are disposed on opposite sides of the closed loop trace, the first part and the third part are disposed on opposite sides of the closed loop trace, and the first part and the fifth part are disposed at a same side of the closed loop trace;

a second conductive pattern electrically connected to a second portion of the ground conductive pattern; and a slot surrounded by the first conductive pattern and comprising a first slot area and a second slot area, wherein the second conductive pattern is disposed between the first part of the first conductive pattern and the ground conductive pattern, wherein a first gap in the first slot area is defined between a first point of an inner side of the first part near the first end of the second part and a first point of an inner side of the third part near the second end of the second part, wherein a second gap in the first slot area is defined between a second point of the inner side of an end of the first part connected to the feed pattern and a second point of the inner side of the third part near an intermediate point along the third part, and wherein the second gap is less than the first gap.

* * * * *